US012453911B2

United States Patent
Kroloff et al.

(10) Patent No.: US 12,453,911 B2
(45) Date of Patent: *Oct. 28, 2025

(54) GOLF CLUB HEADS AND METHODS TO MANUFACTURE GOLF CLUB HEADS

(71) Applicant: PARSONS XTREME GOLF, LLC, Scottsdale, AZ (US)

(72) Inventors: Caleb S. Kroloff, Phoenix, AZ (US); Bradley D. Schweigert, Cave Creek, AZ (US); Michael R. Nicolette, Scottsdale, AZ (US)

(73) Assignee: PARSONS XTREME GOLF, LLC, Scottsdale, AZ (US)

( * ) Notice: Subject to any disclaimer, the term of this patent is extended or adjusted under 35 U.S.C. 154(b) by 125 days.

This patent is subject to a terminal disclaimer.

(21) Appl. No.: 18/385,960

(22) Filed: Nov. 1, 2023

(65) Prior Publication Data
US 2024/0082661 A1   Mar. 14, 2024

Related U.S. Application Data

(63) Continuation of application No. 18/115,100, filed on Feb. 28, 2023, now Pat. No. 11,839,799, which is a
(Continued)

(51) Int. Cl.
*A63B 53/04* (2015.01)
*A63B 60/54* (2015.01)

(52) U.S. Cl.
CPC ...... *A63B 53/0475* (2013.01); *A63B 53/0445* (2020.08); *A63B 53/0416* (2020.08);
(Continued)

(58) Field of Classification Search
CPC ............ A63B 53/0445; A63B 53/0475; A63B 53/0416; A63B 53/0466; A63B 2053/0479; A63B 60/54
(Continued)

(56) References Cited

U.S. PATENT DOCUMENTS

| 1,133,129 A | 3/1915 | Govan |
| 1,269,745 A | 6/1918 | Robertson |

(Continued)

FOREIGN PATENT DOCUMENTS

| CN | 1302216 A | 7/2001 |
| CN | 1608696 A | 4/2005 |

(Continued)

OTHER PUBLICATIONS

Translation and original of Document ID: JP-H08777-A, and titled "Golf Club Head", with an inventor named Sekiguchi Hajime, pp. 1-9, published Jan. 9, 1996. (Year: 1996).*

(Continued)

*Primary Examiner* — Sebastiano Passaniti

(57) ABSTRACT

Embodiments of golf club heads, golf clubs, and methods to manufacture golf club heads and golf clubs are generally described herein. A golf club head includes a face portion having an outer face portion surrounding a face opening and a face insert portion coupled to the outer face portion to close the face opening. A front groove and a back groove are located at a front surface and a back surface of the face portion, respectively. The front and back grooves define an inner area portion for striking a golf ball. The front and back grooves are configured to enhance deflection and rebounding of the inner area portion during impact with the golf ball. The front groove has a groove length that is the same or about the same as a groove length of the back groove. Other examples and embodiments may be described and claimed.

20 Claims, 28 Drawing Sheets

Related U.S. Application Data continuation-in-part of application No. 17/841,893, filed on Jun. 16, 2022, now Pat. No. 11,806,590, which is a continuation of application No. 17/685,546, filed on Mar. 3, 2022, now Pat. No. 11,400,352, which is a continuation-in-part of application No. 17/528,402, filed on Nov. 17, 2021, now Pat. No. 11,426,641, which is a continuation of application No. 16/566,597, filed on Sep. 10, 2019, now Pat. No. 11,207,575, which is a continuation of application No. 16/272,269, filed on Feb. 11, 2019, now Pat. No. 10,449,428, said application No. 17/685,546 is a continuation-in-part of application No. 17/682,476, filed on Feb. 28, 2022, now Pat. No. 12,194,349, which is a continuation of application No. 17/099,362, filed on Nov. 16, 2020, now Pat. No. 11,291,890, which is a continuation of application No. 16/820,136, filed on Mar. 16, 2020, now Pat. No. 10,874,919, which is a continuation of application No. 16/590,105, filed on Oct. 1, 2019, now Pat. No. 10,632,349, said application No. 18/115,100 is a continuation-in-part of application No. 17/198,770, filed on Mar. 11, 2021, now Pat. No. 11,707,651, which is a continuation of application No. 16/807,591, filed on Mar. 3, 2020, now Pat. No. 10,960,274, said application No. 18/115,100 is a continuation-in-part of application No. 17/528,436, filed on Nov. 17, 2021, now abandoned.

(60) Provisional application No. 63/316,154, filed on Mar. 3, 2022, provisional application No. 63/276,981, filed on Nov. 8, 2021, provisional application No. 63/117,182, filed on Nov. 23, 2020, provisional application No. 62/957,757, filed on Jan. 6, 2020, provisional application No. 62/908,467, filed on Sep. 30, 2019, provisional application No. 62/903,467, filed on Sep. 20, 2019, provisional application No. 62/897,015, filed on Sep. 6, 2019, provisional application No. 62/877,934, filed on Jul. 24, 2019, provisional application No. 62/877,915, filed on Jul. 24, 2019, provisional application No. 62/873,773, filed on Jul. 12, 2019, provisional application No. 62/865,532, filed on Jun. 24, 2019, provisional application No. 62/837,592, filed on Apr. 23, 2019, provisional application No. 62/826,310, filed on Mar. 29, 2019, provisional application No. 62/820,728, filed on Mar. 19, 2019, provisional application No. 62/816,418, filed on Mar. 11, 2019, provisional application No. 62/814,959, filed on Mar. 7, 2019, provisional application No. 62/792,191, filed on Jan. 14, 2019, provisional application No. 62/787,554, filed on Jan. 2, 2019.

(52) U.S. Cl.
CPC ... *A63B 53/0466* (2013.01); *A63B 2053/0479* (2013.01); *A63B 60/54* (2015.10); *A63B 2209/00* (2013.01)

(58) Field of Classification Search
USPC .................................................. 473/330–331
See application file for complete search history.

(56) References Cited

U.S. PATENT DOCUMENTS

| | | |
|---|---|---|
| 1,306,029 A | 6/1919 | Robertson |
| 1,534,600 A | 4/1925 | Mattern |
| 1,538,312 A | 5/1925 | Neish |
| 2,034,936 A | 3/1936 | Barnhart |
| 3,652,094 A | 3/1972 | Glover |
| 4,085,934 A | 4/1978 | Churchward |
| 4,502,687 A | 3/1985 | Kochevar |
| 4,545,580 A | 10/1985 | Tomita et al. |
| 4,591,160 A | 5/1986 | Piragino |
| 4,614,627 A | 9/1986 | Curtis et al. |
| 4,803,023 A | 2/1989 | Enomoto et al. |
| 4,824,116 A | 4/1989 | Nagamoto et al. |
| 4,883,623 A | 11/1989 | Nagamoto et al. |
| 4,988,104 A | 1/1991 | Shiotani et al. |
| 5,090,702 A | 2/1992 | Viste |
| 5,106,094 A | 4/1992 | Desbiolles et al. |
| 5,213,328 A | 5/1993 | Long et al. |
| 5,219,408 A | 6/1993 | Sun |
| 5,244,211 A | 9/1993 | Lukasiewicz |
| 5,282,624 A | 2/1994 | Viste |
| 5,306,450 A | 4/1994 | Okumoto et al. |
| 5,351,958 A | 10/1994 | Helmstetter |
| 5,419,559 A | 5/1995 | Melanson et al. |
| 5,421,577 A | 6/1995 | Kobayashi |
| 5,451,056 A | 9/1995 | Manning |
| 5,467,983 A | 11/1995 | Chen |
| 5,485,998 A | 1/1996 | Kobayashi |
| 5,518,243 A | 5/1996 | Redman |
| 5,624,331 A | 4/1997 | Lo et al. |
| 5,637,045 A | 6/1997 | Igarashi |
| 5,649,873 A | 7/1997 | Fuller |
| 5,676,605 A | 10/1997 | Kobayashi |
| D386,550 S | 11/1997 | Wright et al. |
| D386,551 S | 11/1997 | Solheim et al. |
| D387,405 S | 12/1997 | Solheim et al. |
| 5,766,092 A | 6/1998 | Mimeur et al. |
| 5,769,735 A | 6/1998 | Hosokawa |
| 5,785,610 A | 7/1998 | Birmingham |
| 5,788,584 A | 8/1998 | Parente et al. |
| 5,797,807 A | 8/1998 | Moore |
| 5,830,084 A * | 11/1998 | Kosmatka ............. A63B 60/00 473/324 |
| 5,971,868 A | 10/1999 | Kosmatka |
| 5,997,415 A | 12/1999 | Wood |
| 6,042,486 A | 3/2000 | Gallagher |
| 6,077,171 A | 6/2000 | Yoneyama |
| 6,146,287 A | 11/2000 | Rugge et al. |
| 6,162,133 A | 12/2000 | Peterson |
| 6,165,081 A | 12/2000 | Chou |
| 6,203,449 B1 | 3/2001 | Kenmi |
| 6,231,458 B1 | 5/2001 | Cameron et al. |
| 6,280,349 B1 | 8/2001 | Cook |
| 6,306,048 B1 | 10/2001 | McCabe et al. |
| 6,368,234 B1 | 4/2002 | Galloway |
| 6,379,262 B1 | 4/2002 | Boone |
| 6,386,990 B1 | 5/2002 | Reyes et al. |
| 6,409,612 B1 | 6/2002 | Evans et al. |
| 6,413,169 B1 | 7/2002 | Kosmatka |
| 6,435,977 B1 | 8/2002 | Helmstetter et al. |
| 6,454,665 B2 | 9/2002 | Antonious |
| 6,471,604 B2 | 10/2002 | Hocknell et al. |
| 6,506,127 B2 | 1/2003 | Helmstetter et al. |
| 6,595,057 B2 | 7/2003 | Bissonnette et al. |
| 6,607,451 B2 | 8/2003 | Kosmatka et al. |
| 6,638,182 B2 | 10/2003 | Kosmatka |
| 6,641,491 B1 | 11/2003 | Schillaci |
| 6,695,714 B1 | 2/2004 | Bliss et al. |
| 6,729,971 B2 | 5/2004 | Caldwell |
| 6,746,343 B2 | 6/2004 | Yoneyama |
| 6,780,123 B2 | 8/2004 | Hasebe |
| 6,800,040 B2 | 10/2004 | Galloway et al. |
| 6,811,496 B2 | 11/2004 | Wahl et al. |
| 6,830,519 B2 | 12/2004 | Reed et al. |
| 6,835,144 B2 | 12/2004 | Best |
| 6,840,872 B2 | 1/2005 | Yoneyama |
| 6,852,038 B2 | 2/2005 | Yabu |
| 6,857,973 B2 | 2/2005 | Wieland et al. |
| 6,863,626 B2 | 3/2005 | Evans et al. |
| 6,904,663 B2 | 6/2005 | Willett et al. |
| 6,932,719 B2 | 8/2005 | Yabu |
| 6,979,270 B1 | 12/2005 | Allen |

(56) References Cited

U.S. PATENT DOCUMENTS

| | | |
|---|---|---|
| 6,984,180 B2 | 1/2006 | Hasebe |
| 6,986,715 B2 | 1/2006 | Mahaffey |
| 6,991,560 B2 | 1/2006 | Tseng |
| 6,997,821 B2 | 2/2006 | Galloway et al. |
| 7,014,570 B2 | 3/2006 | Evans et al. |
| 7,041,003 B2 | 5/2006 | Bissonnette et al. |
| 7,066,833 B2 * | 6/2006 | Yamamoto .............. A63B 60/00 473/331 |
| 7,082,665 B2 | 8/2006 | Deshmukh et al. |
| 7,083,530 B2 | 8/2006 | Wahl et al. |
| 7,101,289 B2 | 9/2006 | Gibbs et al. |
| 7,121,956 B2 | 10/2006 | Lo |
| 7,125,344 B2 | 10/2006 | Hocknell et al. |
| 7,137,903 B2 | 11/2006 | Best et al. |
| 7,137,907 B2 | 11/2006 | Gibbs et al. |
| 7,153,220 B2 | 12/2006 | Lo |
| 7,169,062 B2 | 1/2007 | Chen |
| 7,182,698 B2 | 2/2007 | Tseng |
| 7,186,190 B1 | 3/2007 | Beach et al. |
| 7,214,142 B2 | 5/2007 | Meyer et al. |
| 7,220,189 B2 | 5/2007 | Wieland et al. |
| 7,223,180 B2 | 5/2007 | Willett et al. |
| 7,258,625 B2 | 8/2007 | Kawaguchi et al. |
| 7,258,626 B2 | 8/2007 | Gibbs et al. |
| 7,338,388 B2 | 3/2008 | Schweigert et al. |
| 7,347,794 B2 | 3/2008 | Schweigert |
| 7,367,897 B2 | 5/2008 | Poynor |
| 7,387,579 B2 | 6/2008 | Lin et al. |
| 7,419,441 B2 | 9/2008 | Hoffman et al. |
| 7,422,528 B2 | 9/2008 | Gibbs et al. |
| 7,435,190 B2 | 10/2008 | Sugimoto |
| 7,442,132 B2 | 10/2008 | Nishio |
| 7,448,960 B2 | 11/2008 | Gibbs et al. |
| 7,448,964 B2 | 11/2008 | Schweigert et al. |
| 7,494,426 B2 | 2/2009 | Nishio et al. |
| 7,524,249 B2 | 4/2009 | Breier et al. |
| 7,527,565 B1 | 5/2009 | Ehlers et al. |
| 7,572,193 B2 | 8/2009 | Yokota |
| 7,575,524 B2 | 8/2009 | Willett et al. |
| 7,582,024 B2 | 9/2009 | Shear |
| 7,584,531 B2 | 9/2009 | Schweigert et al. |
| 7,594,862 B2 | 9/2009 | Gilbert |
| 7,611,424 B2 | 11/2009 | Nagai et al. |
| 7,618,331 B2 | 11/2009 | Hirano |
| 7,641,568 B2 | 1/2010 | Hoffman et al. |
| 7,658,686 B2 | 2/2010 | Soracco |
| 7,713,140 B2 | 5/2010 | Gibbs et al. |
| 7,731,603 B2 | 6/2010 | Beach et al. |
| 7,744,484 B1 | 6/2010 | Chao |
| 7,785,212 B2 | 8/2010 | Lukasiewicz et al. |
| 7,794,333 B2 | 9/2010 | Wallans et al. |
| 7,798,203 B2 | 9/2010 | Schweigert et al. |
| 7,806,781 B2 | 10/2010 | Imamoto |
| 7,811,178 B2 | 10/2010 | Davis |
| 7,846,041 B2 | 12/2010 | Beach et al. |
| 7,871,339 B2 | 1/2011 | Sanchez et al. |
| 7,927,229 B2 | 4/2011 | Jertson et al. |
| 7,935,000 B2 | 5/2011 | Stites |
| 8,007,369 B2 | 8/2011 | Soracco |
| 8,012,038 B1 | 9/2011 | Beach et al. |
| 8,012,040 B2 | 9/2011 | Takechi |
| 8,012,041 B2 | 9/2011 | Gibbs et al. |
| 8,016,691 B2 | 9/2011 | Stites |
| 8,070,623 B2 | 12/2011 | Stites et al. |
| 8,088,025 B2 | 1/2012 | Wahl et al. |
| 8,096,896 B2 | 1/2012 | Schiell et al. |
| 8,187,116 B2 | 5/2012 | Boyd et al. |
| 8,192,303 B2 | 6/2012 | Ban |
| 8,197,357 B1 | 6/2012 | Rice et al. |
| 8,202,175 B2 | 6/2012 | Ban |
| 8,221,264 B2 | 7/2012 | Cole et al. |
| 8,226,498 B2 | 7/2012 | Stites et al. |
| 8,235,843 B1 | 8/2012 | Rice et al. |
| 8,257,196 B1 | 9/2012 | Abbott et al. |
| 8,262,506 B2 | 9/2012 | Watson et al. |
| 8,287,402 B2 | 10/2012 | Shiell et al. |
| 8,353,783 B2 | 1/2013 | Soracco |
| 8,353,787 B2 | 1/2013 | Meyer et al. |
| 8,371,957 B2 | 2/2013 | Schweigert et al. |
| 8,376,876 B2 | 2/2013 | Gibbs et al. |
| 8,403,769 B2 | 3/2013 | Stites |
| 8,414,422 B2 | 4/2013 | Peralta et al. |
| 8,430,763 B2 | 4/2013 | Beach et al. |
| 8,439,769 B2 | 5/2013 | Rice et al. |
| 8,444,506 B2 | 5/2013 | Watson et al. |
| 8,449,406 B1 | 5/2013 | Frame et al. |
| 8,469,834 B2 | 6/2013 | Wada et al. |
| 8,480,512 B2 | 7/2013 | Oldknow et al. |
| 8,485,919 B2 | 7/2013 | Rice et al. |
| 8,540,590 B2 | 9/2013 | Tsukada et al. |
| 8,545,343 B2 | 10/2013 | Boyd et al. |
| 8,568,248 B2 | 10/2013 | DeShiell et al. |
| 8,602,912 B2 | 12/2013 | Stites |
| 8,628,431 B2 | 1/2014 | Schweigert et al. |
| 8,651,975 B2 | 2/2014 | Soracco |
| 8,657,701 B2 | 2/2014 | Boyd et al. |
| 8,663,026 B2 | 3/2014 | Blowers et al. |
| 8,696,489 B2 | 4/2014 | Gibbs et al. |
| 8,734,265 B2 | 5/2014 | Soracco |
| 8,784,232 B2 | 7/2014 | Jertson et al. |
| 8,790,196 B2 | 7/2014 | Solheim et al. |
| 8,814,724 B2 | 8/2014 | Kato |
| 8,826,512 B2 | 9/2014 | Schweigert |
| 8,845,454 B2 | 9/2014 | Boyd et al. |
| 8,858,362 B1 | 10/2014 | Leposky et al. |
| 8,888,607 B2 | 11/2014 | Harbert et al. |
| 8,900,069 B2 | 12/2014 | Beach et al. |
| 8,900,072 B1 | 12/2014 | Willett et al. |
| 8,915,794 B2 | 12/2014 | Stites |
| 8,979,671 B1 | 3/2015 | Demille et al. |
| 9,022,880 B2 | 5/2015 | Kawaguchi et al. |
| 9,033,819 B2 | 5/2015 | Wahl et al. |
| 9,033,820 B2 | 5/2015 | Kato |
| 9,089,746 B2 | 7/2015 | Schweigert |
| 9,101,808 B2 | 8/2015 | Stites et al. |
| 9,101,809 B2 | 8/2015 | Gibbs et al. |
| 9,168,436 B2 | 10/2015 | Slaughter et al. |
| 9,199,138 B2 | 12/2015 | Willett et al. |
| 9,199,140 B1 | 12/2015 | Schweigert et al. |
| 9,199,143 B1 | 12/2015 | Parsons et al. |
| 9,242,152 B2 | 1/2016 | Cole et al. |
| 9,327,173 B2 | 5/2016 | Mizutani |
| 9,352,197 B2 | 5/2016 | Parsons et al. |
| 9,393,471 B2 | 7/2016 | Beno et al. |
| 9,399,157 B2 | 7/2016 | Greensmith et al. |
| 9,399,158 B2 | 7/2016 | Parsons et al. |
| 9,403,069 B2 | 8/2016 | Boyd et al. |
| 9,421,433 B2 * | 8/2016 | Martens ................. A63B 60/52 |
| 9,452,325 B2 | 9/2016 | DeShiell et al. |
| 9,468,821 B2 | 10/2016 | Parsons et al. |
| 9,492,722 B2 | 11/2016 | Taylor et al. |
| 9,533,201 B2 | 1/2017 | Parsons et al. |
| 9,550,096 B2 | 1/2017 | Parsons et al. |
| 9,573,027 B2 | 2/2017 | Nivanh et al. |
| 9,610,481 B2 | 4/2017 | Parsons et al. |
| 9,630,070 B2 | 4/2017 | Parsons et al. |
| 9,649,542 B2 | 5/2017 | Nicolette |
| 9,669,270 B2 | 6/2017 | Schweigert et al. |
| 9,675,853 B2 | 6/2017 | Parsons et al. |
| 9,682,295 B1 | 6/2017 | Dawson et al. |
| 9,700,764 B2 | 7/2017 | Carter |
| 9,717,959 B2 | 8/2017 | Stites |
| 9,782,643 B2 | 10/2017 | Parsons et al. |
| 9,795,842 B1 | 10/2017 | Parsons et al. |
| 9,814,952 B2 | 11/2017 | Parsons et al. |
| 9,814,954 B2 | 11/2017 | Westrum et al. |
| 9,821,201 B1 | 11/2017 | Parsons et al. |
| 9,833,667 B1 | 12/2017 | Parsons et al. |
| 9,839,817 B1 | 12/2017 | Johnson et al. |
| 9,839,821 B2 | 12/2017 | DeShiell et al. |
| 9,844,710 B2 | 12/2017 | Parsons et al. |
| 9,861,867 B2 | 1/2018 | Parsons et al. |
| 9,937,388 B2 | 4/2018 | Cardani et al. |
| 9,981,160 B2 | 5/2018 | Parsons et al. |

(56) References Cited

U.S. PATENT DOCUMENTS

| | | |
|---|---|---|
| 9,993,704 B2 | 6/2018 | Hebreo et al. |
| 10,065,082 B2 | 9/2018 | James et al. |
| 10,150,020 B2 | 12/2018 | Cole et al. |
| 10,213,659 B2 | 2/2019 | Parsons et al. |
| 10,328,319 B2 | 6/2019 | Nakamura |
| 10,376,754 B2 | 8/2019 | Parsons et al. |
| 10,413,787 B2 | 9/2019 | Parsons et al. |
| 10,449,428 B2 | 10/2019 | Parsons et al. |
| 10,478,684 B2 | 11/2019 | Parsons et al. |
| 10,512,829 B2 | 12/2019 | Parsons et al. |
| 10,583,336 B2 | 3/2020 | Parsons et al. |
| 10,596,425 B2 | 3/2020 | Parsons et al. |
| 10,632,349 B2 | 4/2020 | Parsons et al. |
| 10,716,978 B2 | 7/2020 | Parsons et al. |
| 10,722,765 B2 | 7/2020 | Schweigert et al. |
| 10,729,948 B2 | 8/2020 | Parsons et al. |
| 10,729,949 B2 | 8/2020 | Parsons et al. |
| 10,828,538 B2 | 11/2020 | Parsons et al. |
| 10,874,921 B2 | 12/2020 | Parsons et al. |
| 10,905,920 B2 | 2/2021 | Parsons et al. |
| 10,905,925 B2 | 2/2021 | Morales et al. |
| 10,933,286 B2 | 3/2021 | Parsons et al. |
| 10,960,274 B2 | 3/2021 | Parsons et al. |
| 10,967,231 B2 | 4/2021 | Parsons et al. |
| 11,117,028 B2 | 9/2021 | Parsons et al. |
| 11,154,755 B2 | 10/2021 | Parsons et al. |
| 11,167,187 B2 | 11/2021 | Parsons et al. |
| 11,192,003 B2 | 12/2021 | Parsons et al. |
| 11,266,888 B2 | 3/2022 | Kroloff et al. |
| 11,344,775 B2 | 5/2022 | Parsons et al. |
| 11,369,847 B2 | 6/2022 | Parsons et al. |
| 11,400,352 B1 | 8/2022 | Parsons et al. |
| 11,458,372 B2 | 10/2022 | Parsons et al. |
| 11,484,756 B2 | 11/2022 | Parsons et al. |
| 11,541,288 B2 | 1/2023 | Parsons et al. |
| 11,565,157 B2 | 1/2023 | Parsons et al. |
| 11,565,158 B1 | 1/2023 | Parsons et al. |
| 11,617,925 B2 | 4/2023 | Parsons et al. |
| 11,839,799 B2 * | 12/2023 | Kroloff ............. A63B 53/0466 |
| 2002/0019265 A1 | 2/2002 | Allen |
| 2003/0027662 A1 | 2/2003 | Werner et al. |
| 2003/0148818 A1 | 8/2003 | Myrhum et al. |
| 2004/0087388 A1 | 5/2004 | Beach et al. |
| 2004/0099538 A1 * | 5/2004 | Chao ........................ B23H 9/00 |
| | | 205/705 |
| 2004/0192468 A1 | 9/2004 | Onoda et al. |
| 2004/0266550 A1 | 12/2004 | Gilbert et al. |
| 2005/0096154 A1 | 5/2005 | Chen |
| 2005/0250596 A1 | 11/2005 | Chuang |
| 2006/0052181 A1 | 3/2006 | Serrano et al. |
| 2006/0100031 A1 | 5/2006 | Lan |
| 2006/0229141 A1 | 10/2006 | Galloway |
| 2007/0129161 A1 | 6/2007 | Matsunaga et al. |
| 2008/0004129 A1 | 1/2008 | Lin et al. |
| 2008/0004133 A1 | 1/2008 | Schweigert |
| 2008/0022502 A1 | 1/2008 | Tseng |
| 2010/0029405 A1 * | 2/2010 | Gilbert ................... A63B 53/04 |
| | | 473/331 |
| 2010/0144461 A1 | 6/2010 | Ban |
| 2010/0331102 A1 | 12/2010 | Golden et al. |
| 2012/0064994 A1 | 3/2012 | Wada et al. |
| 2012/0149495 A1 * | 6/2012 | Wada ................ A63B 53/0466 |
| | | 473/349 |
| 2013/0303305 A1 * | 11/2013 | Myrhum .................... B21J 5/06 |
| | | 72/340 |
| 2015/0126305 A1 | 5/2015 | Stokke et al. |
| 2015/0290503 A1 | 10/2015 | Su |
| 2016/0038799 A1 | 2/2016 | De La et al. |
| 2018/0296887 A1 | 10/2018 | Motokawa |
| 2019/0143182 A1 * | 5/2019 | Knuth ................ A63B 53/0466 |
| | | 473/342 |
| 2021/0236888 A1 | 8/2021 | Lee et al. |
| 2022/0072393 A1 | 3/2022 | Parsons et al. |

FOREIGN PATENT DOCUMENTS

| | | |
|---|---|---|
| CN | 1572343 A | 2/2007 |
| CN | 102143783 A | 8/2011 |
| CN | 203108126 U | 8/2013 |
| CN | 203790537 U | 8/2014 |
| DE | 29715997 U1 | 2/1998 |
| EP | 1955740 A1 | 8/2008 |
| GB | 2249031 A | 4/1992 |
| JP | S62200359 A | 9/1987 |
| JP | H0241003 A | 2/1990 |
| JP | H10277187 A | 10/1998 |
| JP | H119742 A | 1/1999 |
| JP | 2002143356 A | 5/2002 |
| JP | 2002535056 A | 10/2002 |
| JP | 2005287679 A | 10/2005 |
| JP | 2006087783 A | 4/2006 |
| JP | 2006223331 A | 8/2006 |
| JP | 2007044445 A | 2/2007 |
| JP | 2007136068 A | 6/2007 |
| JP | 2008161597 A | 7/2008 |
| JP | 2008173314 A | 7/2008 |
| JP | 3158662 U | 4/2010 |
| JP | 2010069106 A | 4/2010 |
| JP | 2013027587 A | 2/2013 |
| JP | 2013043091 A | 3/2013 |
| JP | 2013188400 A | 9/2013 |
| JP | 2013544178 A | 11/2015 |

OTHER PUBLICATIONS

Translation and original of Document ID: JP-2000254261-A, and titled "Club Head", with an inventor named Mori Sadaki et al., pp. 1-9, published Sep. 19, 2000. (Year: 2000).*

* cited by examiner

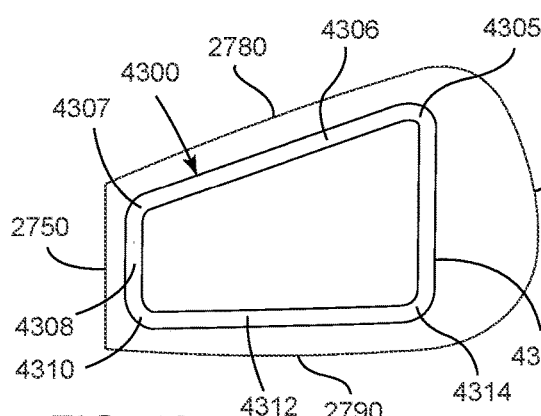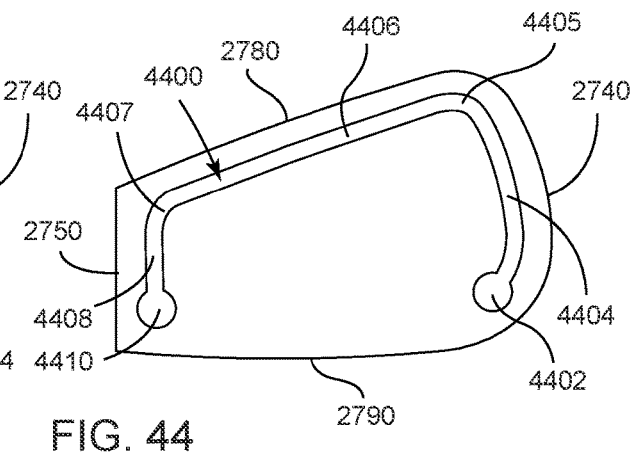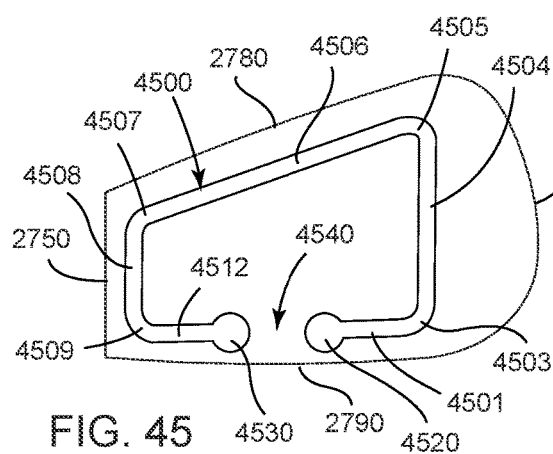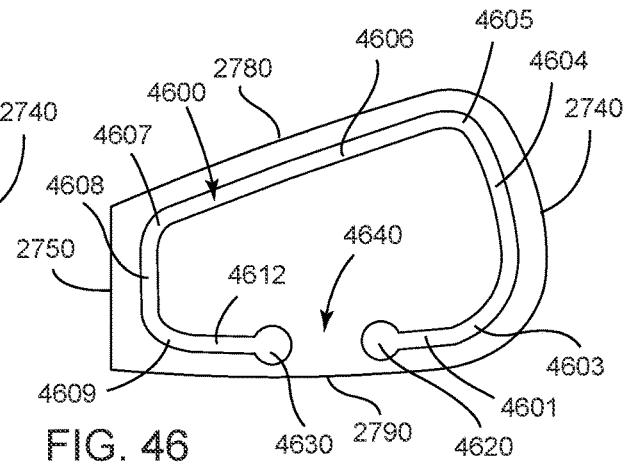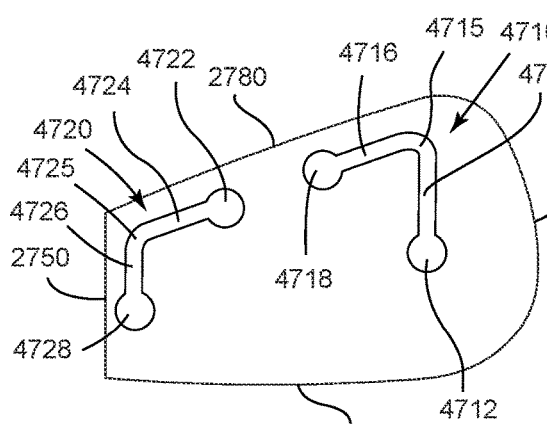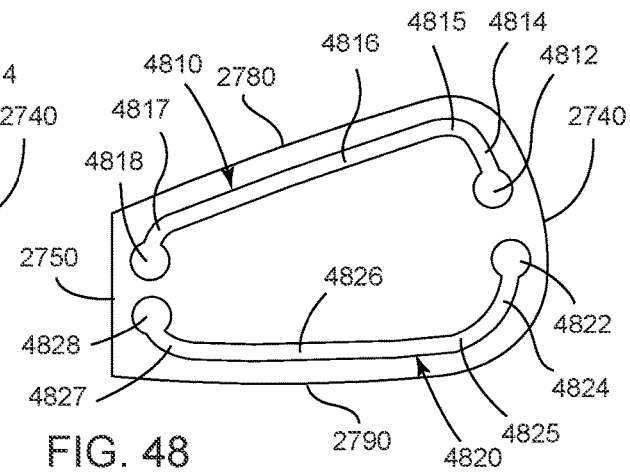

GOLF CLUB HEADS AND METHODS TO MANUFACTURE GOLF CLUB HEADS

CROSS REFERENCE

This application is a continuation of U.S. application Ser. No. 18/115,100, filed Feb. 28, 2023, which claims the benefit of U.S. Provisional Application No. 63/316,154, filed Mar. 3, 2022.

U.S. application Ser. No. 18/115,100, filed Feb. 28, 2023, is a continuation-in-part of U.S. application Ser. No. 17/841,893, filed Jun. 16, 2022, now U.S. Pat. No. 11,806,590, which is a continuation of U.S. application Ser. No. 17/685,546, filed Mar. 3, 2022, now U.S. Pat. No. 11,400,352, which claims the benefit of U.S. Provisional Application No. 63/276,981, filed Nov. 8, 2021.

U.S. application Ser. No. 17/685,546, filed Mar. 3, 2022, now U.S. Pat. No. 11,400,352, is a continuation-in-part of application Ser. No. 17/528,402, filed Nov. 17, 2021, now U.S. Pat. No. 11,426,641, which is a continuation of application Ser. No. 16/566,597, filed Sep. 10, 2019, now U.S. Pat. No. 11,207,575, which is a continuation of application Ser. No. 16/272,269, filed Feb. 11, 2019, now U.S. Pat. No. 10,449,428, which claims the benefit of U.S. Provisional Application No. 62/787,554, filed Jan. 2, 2019; and U.S. Provisional Application No. 62/792,191, filed Jan. 14, 2019.

U.S. application Ser. No. 17/685,546, filed Mar. 3, 2022, now U.S. Pat. No. 11,400,352, is a continuation-in-part of application Ser. No. 17/682,476, filed Feb. 28, 2022, which is a continuation of U.S. application Ser. No. 17/099,362, filed Nov. 16, 2020, now U.S. Pat. No. 11,291,890, which is a continuation of application Ser. No. 16/820,136, filed Mar. 16, 2020, now U.S. Pat. No. 10,874,919, which is a continuation of application Ser. No. 16/590,105, filed Oct. 1, 2019, now U.S. Pat. No. 10,632,349, which claims the benefit of U.S. Provisional Application No. 62/908,467, filed Sep. 30, 2019, U.S. Provisional Application No. 62/903,467, filed Sep. 20, 2019, U.S. Provisional Application No. 62/877,934, filed Jul. 24, 2019, U.S. Provisional Application No. 62/877,915, filed Jul. 24, 2019, U.S. Provisional Application No. 62/865,532, filed Jun. 24, 2019, U.S. Provisional Application No. 62/826,310, filed Mar. 29, 2019, and U.S. Provisional Application No. 62/814,959, filed Mar. 7, 2019.

U.S. application Ser. No. 18/115,100, filed Feb. 28, 2023, is a continuation-in-part of application Ser. No. 17/198,770, filed Mar. 11, 2021, now U.S. Pat. No. 11,707,651, which is a continuation of application Ser. No. 16/807,591, filed Mar. 3, 2020, now U.S. Pat. No. 10,960,274, which claims the benefit of U.S. Provisional Application No. 62/837,592, filed Apr. 23, 2019, U.S. Provisional Application No. 62/873,773, filed Jul. 12, 2019, U.S. Provisional Application No. 62/897,015, filed Sep. 6, 2019, U.S. Provisional Application No. 62/820,728, filed Mar. 19, 2019, U.S. Provisional Application No. 62/816,418, filed Mar. 11, 2019, and U.S. Provisional Application No. 62/957,757, filed Jan. 6, 2020.

U.S. application Ser. No. 18/115,100, filed Feb. 28, 2023, is a continuation-in-part of application Ser. No. 17/528,436, filed Nov. 17, 2021, which claims the benefit of U.S. Provisional Application No. 63/117,182, filed Nov. 23, 2020.

The disclosures of the above-referenced applications are incorporated by reference herein in their entirety.

COPYRIGHT AUTHORIZATION

The present disclosure may be subject to copyright protection. The copyright owner has no objection to the facsimile reproduction by anyone of the present disclosure and its related documents, as they appear in the Patent and Trademark Office patent files or records, but otherwise reserves all applicable copyrights.

FIELD

The present disclosure generally relates to golf equipment, and more particularly, to golf club heads and methods to manufacturing golf club heads.

BACKGROUND

Various materials (e.g., steel-based materials, titanium-based materials, tungsten-based materials, etc.) may be used to manufacture golf club heads. By using multiple materials to manufacture golf club heads, the position of the center of gravity (CG) and/or the moment of inertia (MOI) of the golf club heads may be optimized to produce certain trajectory and spin rate of a golf ball.

DESCRIPTION OF THE DRAWINGS

FIGS. 43, 44, 45, 46, 47, 48, 49, 50, 51, 52, 53, 54, 55, 56, 57, 58, 59, 60, 61, 62, 63, 64, 65, and 66 are face portions according to several embodiments of the apparatus, methods, and articles of manufacture described herein.

Figure 1:
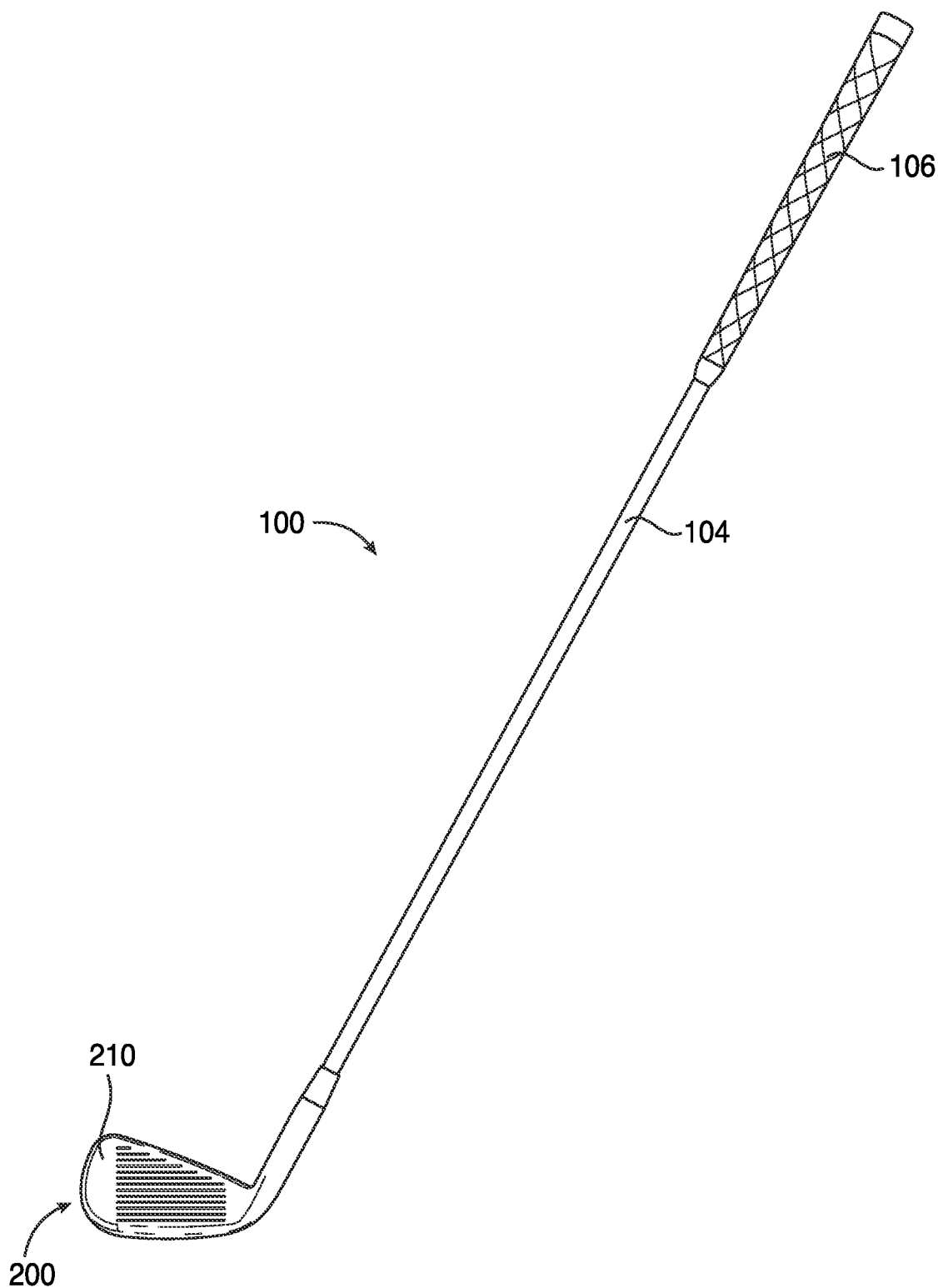
FIG. 1 depicts a golf club head having a golf club according to any embodiment of the apparatus, methods, and articles of manufacture described herein.
Figure 2:
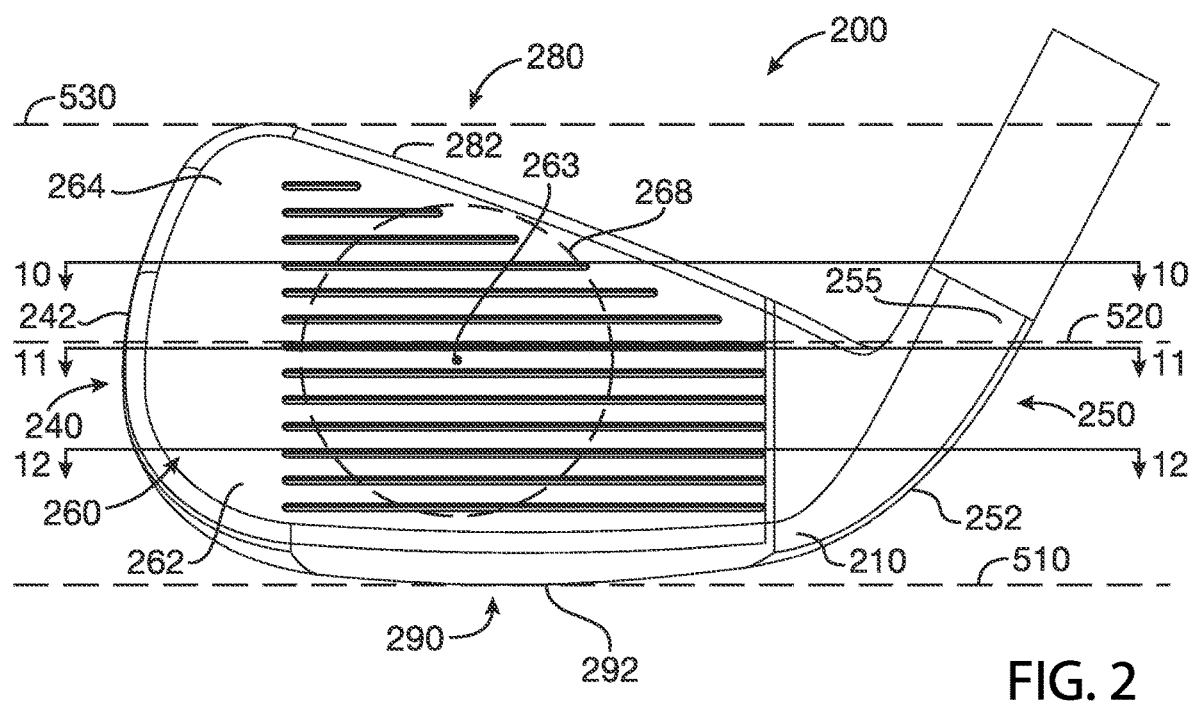
FIGS. 2, 3, 4, 5, 6, 7, 8, 9, 10, 11, and 12 depict a perspective front view, a perspective back view, a perspective cross-sectional view (along line 4-4 of FIG. 3), a perspective cross-sectional view (along line 5-5 of FIG. 3), a perspective cross-sectional view (along line 6-6 of FIG. 3), a perspective front view illustrated without a face portion, another perspective front view illustrated without a face portion, another perspective front view illustrated without a face portion, a perspective cross-sectional view (along line 10-10 of FIG. 2), a perspective cross-sectional view (along line 11-11 of FIG. 2), and a perspective cross-sectional view (along line 12-12 of FIG. 2), respectively, of a golf club head according to an embodiment of the apparatus, methods, and articles of manufacture described herein.
Figure 3:
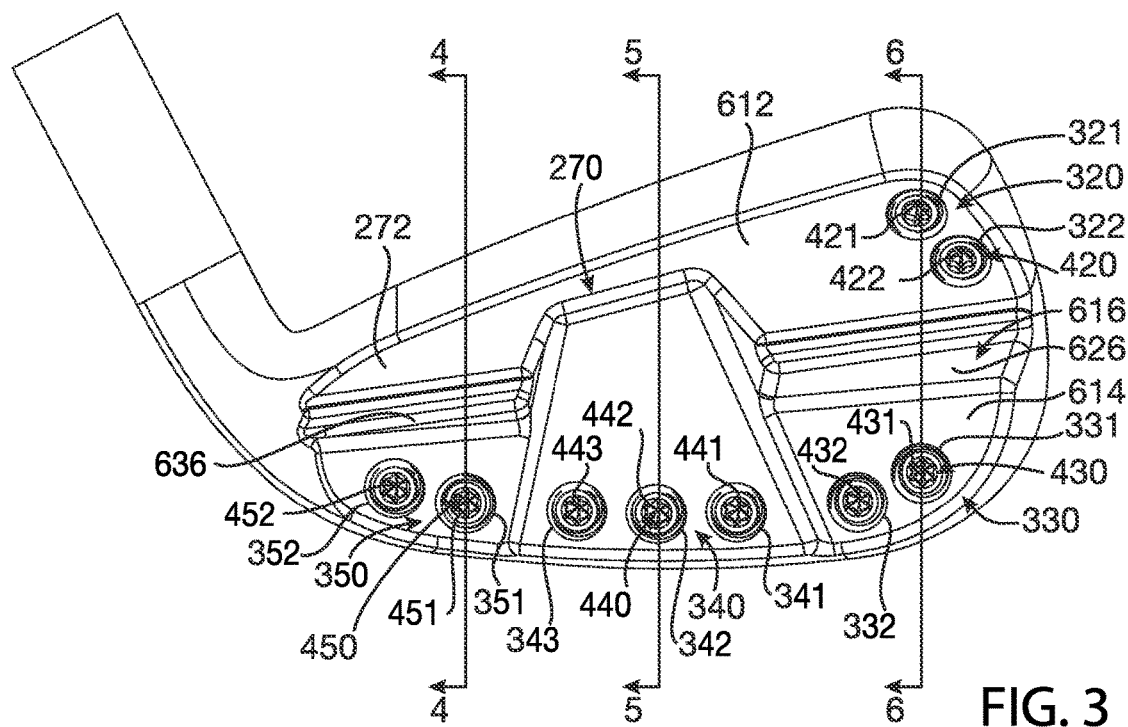
Figure 4:
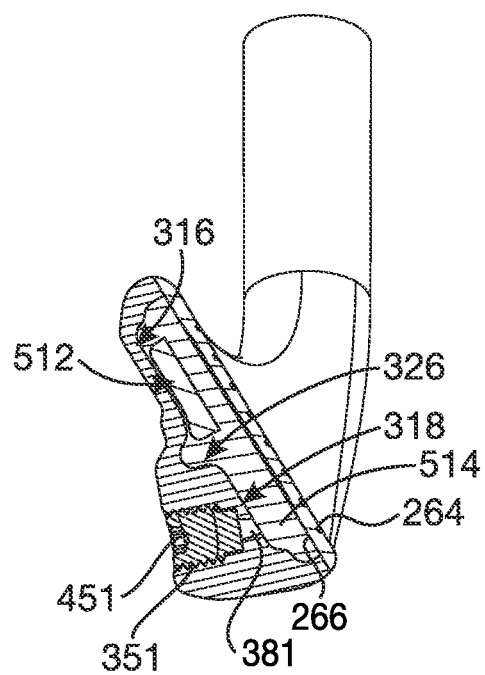
Figure 5:
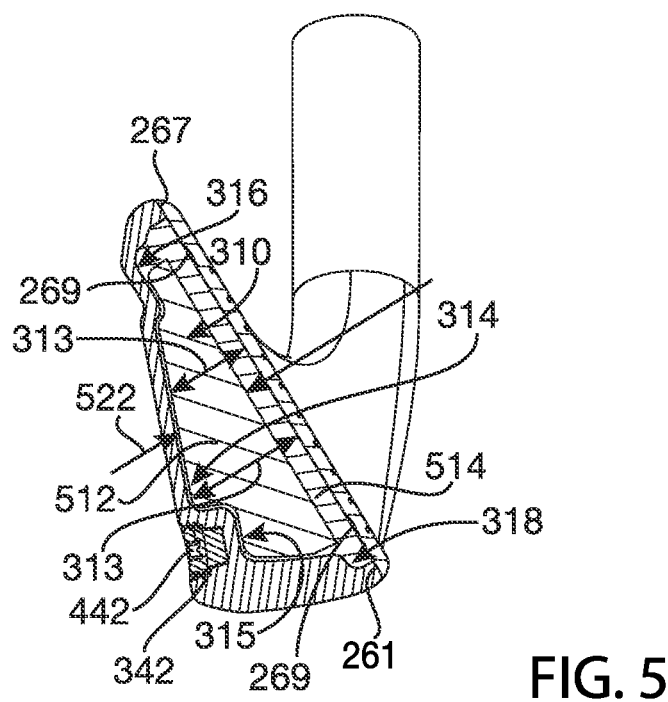
Figure 6:
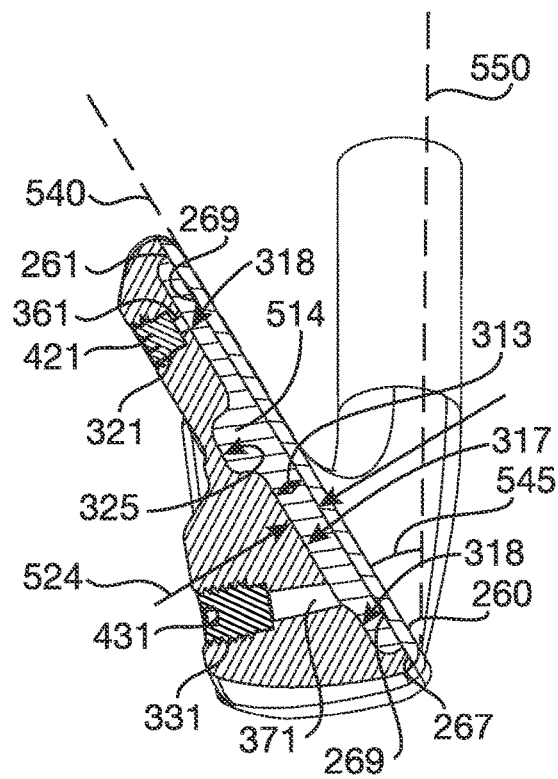
Figure 7:
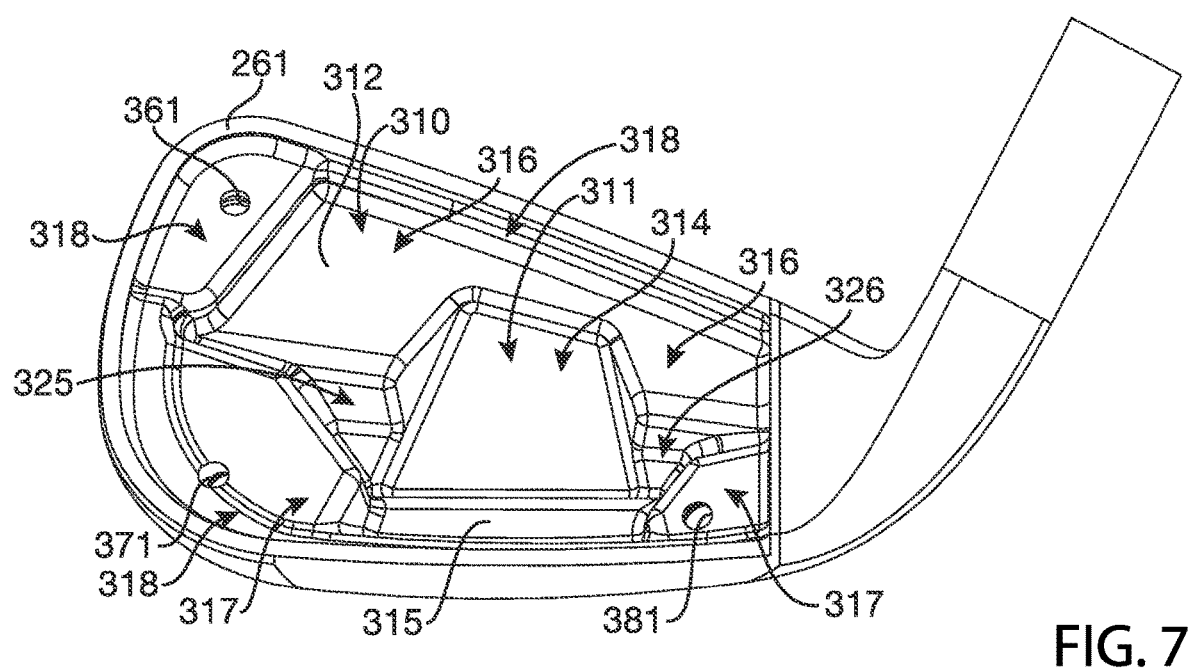
Figure 8:
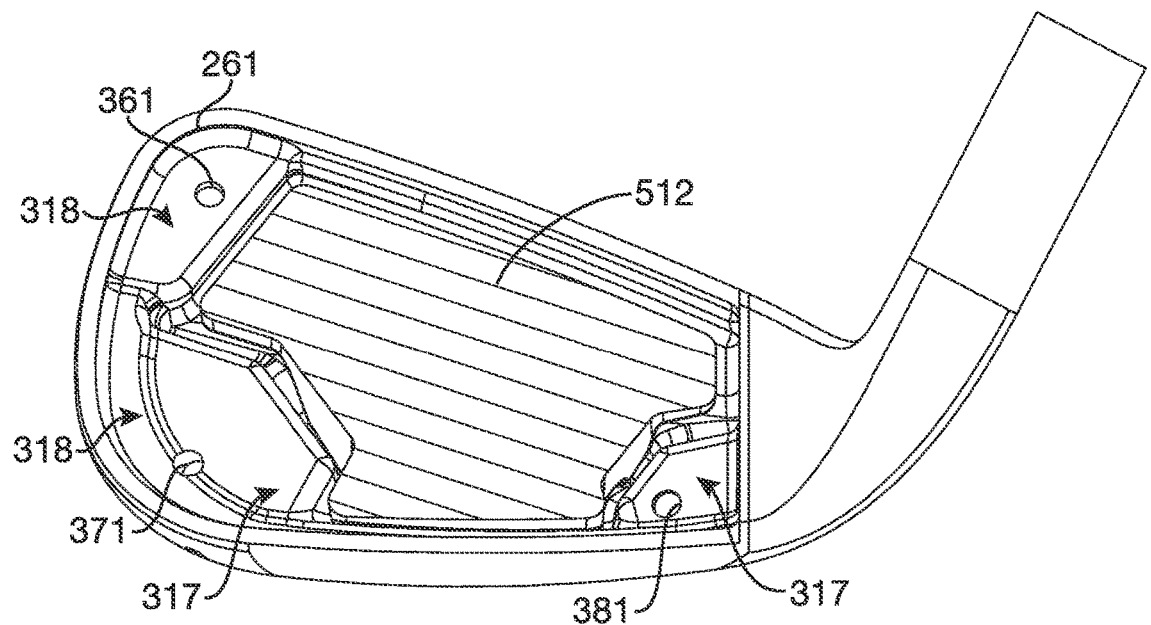
Figure 9:
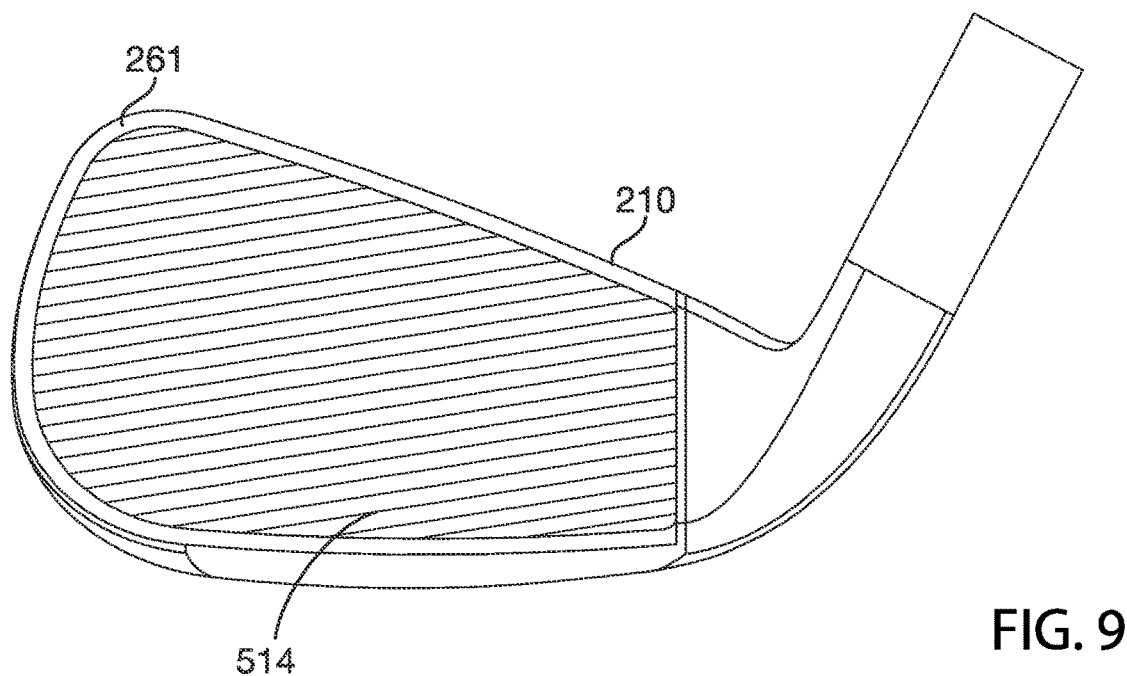
Figure 10:
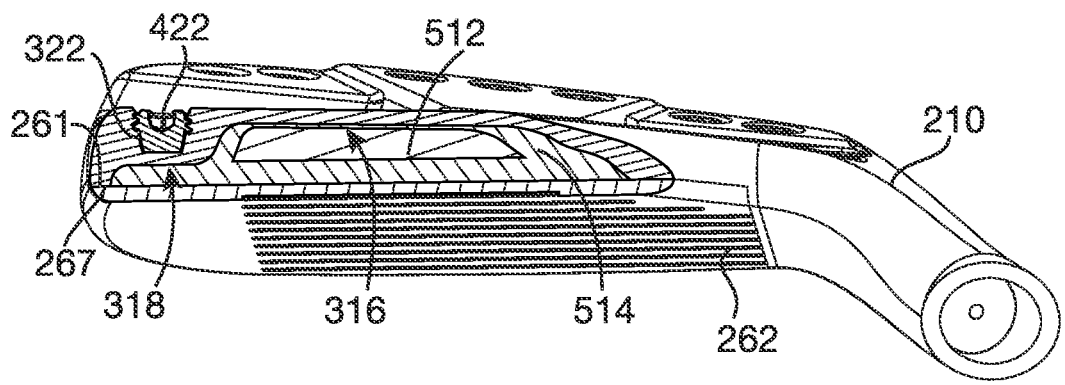
Figure 11:
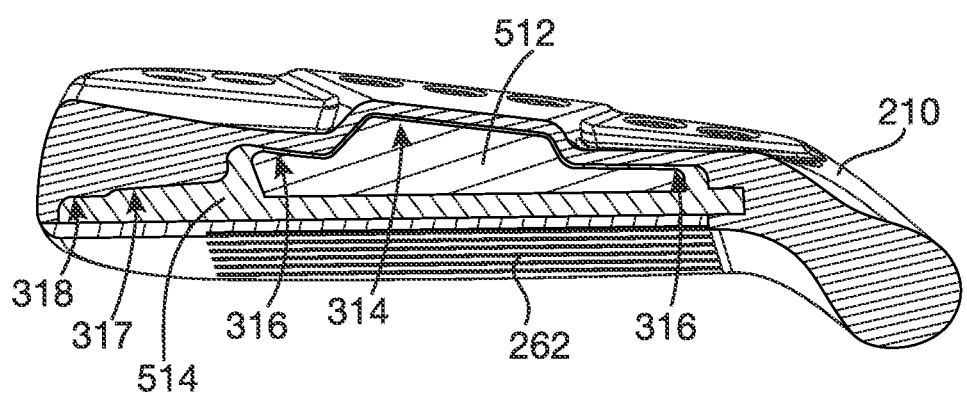
Figure 12:
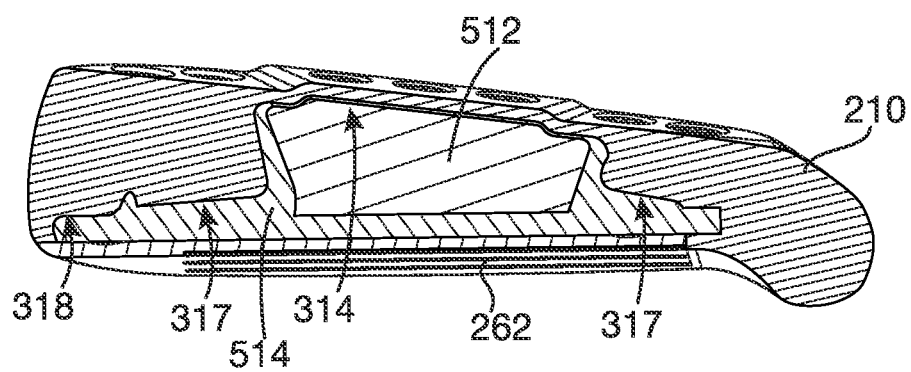

For simplicity and clarity of illustration, the drawing figures illustrate the general manner of construction, and descriptions and details of well-known features and techniques may be omitted to avoid unnecessarily obscuring the present disclosure. Additionally, elements in the drawing figures may not be depicted to scale. For example, the dimensions of some of the elements in the figures may be exaggerated relative to other elements to help improve understanding of embodiments of the present disclosure.

DESCRIPTION

The following U.S. Patents and Patent Applications, which are collectively referred to herein as "the incorporated by reference patent documents," are incorporated by reference herein in their entirety: U.S. Pat. Nos. 8,961,336, 9,199,140, 9,199,143, 9,352,197, 9,399,158, 9,421,437, 9,427,634, 9,468,821, 9,533,201, 9,550,096, 9,555,295, 9,610,481, 9,630,070, 9,636,554, 9,649,542, 9,662,547, 9,669,270, 9,675,853, 9,782,643, 9,795,842, 9,795,843, 9,802,087, 9,814,945, 9,814,952, 9,821,200, 9,821,201, 9,833,667, 9,861,867, 9,878,220, 9,895,582, 9,895,583, 9,914,029, 9,981,160, 9,987,526, 9,999,814, 10010770, 10029158, 10029159, 10052532, 10099093, 10143899, 10159876, 10195101, 10213659, 10232234, 10232235, 10252123, 10265590, 10279233, 10286267, 10293220, 10293221, 10293229, 10335645, 10376754, 10384102, 10413787, 10420989, 10420990, 10441855, 10449428, 10478684, 10512829, 10532257, 10543407, 10583336, 10596424, 10596425, 10617917, 10617918, 10632349, 10653928, 10695623, 10695624, 10709942, 10716978, 10722764, 10722765, 10729948, 10729949, 10786712, 10814193, 10821334, 10843051, 10898766, 10898768, 10926142, 10960274, 10960275, 10967231, 10981037, 11103755, 11110328, 11117028, 11173356, 11266888, 1148475610821339, 10821340, 10828538, 10864414, 10874919, 10874921, 10905920, 10933286, 10940375, 11058932, 11097168, 11117030, 11141633, 11154755, 11167187, 11173359, 11192003, 11207575, 11235211; and U.S. Patent Publication Nos. 20170282026, 20170282027, 20170368429, 20180050243, 20180050244, 20180133567, 20180140910, 20180169488, 20180221727, 20180236325, 20190232125, 20190232126, 20190247727, 20200171363, 20210023422, 20210069557, 20210086044, 20210162278, 20210197037, 20210205672, 20210308537, 20220032138, and 20220040541.

In the example of FIGS. 1-14, a golf club 100 may include a golf club head 200, a shaft 104, and a grip 106. The golf club head 200 may be attached to one end of the shaft 104 and the grip 106 may be attached to the opposite end of the shaft 104. An individual can hold the grip 106 and swing the golf club head 200 with the shaft 104 to strike a golf ball (not illustrated). The golf club head 200 may include a body portion 210 having a toe portion 240 with a toe portion edge 242, a heel portion 250 with a heel portion edge 252 that may include a hosel portion 255 configured to receive a shaft (an example shaft 104 is illustrated in FIG. 1) with a grip (an example grip 106 is illustrated in FIG. 1) on one end and the golf club head 200 on the opposite end of the shaft to form a golf club (an example golf club 100 is illustrated in FIG. 1), a front portion 260 with a perimeter edge portion 261, a back portion 270 with a back wall portion 272, a top portion 280 with a top portion edge 282, and a sole portion 290 with a sole portion edge 292. The toe portion edge 242, the heel portion edge 252, the top portion edge 282, and the sole portion edge 292 may define a periphery of the body portion 210. The toe portion 240, the heel portion 250, the front portion 260, the back portion 270, the top portion 280, and/or the sole portion 290 may partially overlap each other. For example, a portion of the toe portion 240 may overlap portion(s) of the front portion 260, the back portion 270, the top portion 280, and/or the sole portion 290. In a similar manner, a portion of the heel portion 250 may overlap portion(s) of the front portion 260, the back portion 270, the top portion 280, and/or the sole portion 290. In another example, a portion of the back portion 270 may overlap portion(s) of the toe portion 240, the heel portion 250, the top portion 280, and/or the sole portion 290. The apparatus, methods, and articles of manufacture described herein are not limited in this regard.

The golf club head 200 may include a face portion 262 (i.e., the strike face), which may be integrally formed with the body portion 210 (e.g., a single unitary piece). In one example, as illustrated in FIGS. 2-13, the face portion 262 may be a separate piece coupled (e.g., adhesively, mechanically, by welding, and/or by soldering) to the front portion 260. The face portion 262 may include a front surface 264 and a back surface 266. In one example (not illustrated), the front portion 260 may include one or a plurality of recessed shoulders configured to receive the face portion 262 for attachment of the face portion 262 to the body portion 210. In another example, as illustrated in FIGS. 2-13, the back surface 266 may include a perimeter portion 267 that may be attached to a perimeter edge portion 261 of the body portion 210. The perimeter portion 267 of the face portion 262 may be attached to the perimeter edge portion 261 of the body portion 210 by one or more fasteners, one or more adhesive or bonding agents, and/or welding or soldering. In one example, as illustrated in FIGS. 2-13, the perimeter portion 267 of the face portion 262 may be welded to the perimeter edge portion 261 of the body portion 210 at one or more locations. Alternatively, the entire perimeter portion 267 of the face portion 262 may be welded to the entire perimeter edge portion 261 of the body portion 210 (i.e., a continuous weld). The face portion 262 may include a ball strike region 268 to strike a golf ball. In one example, the center of the ball strike region 268 may be a geometric center 263 of the face portion 262. In another example, the geometric center 263 of the face portion 262 may be offset from a center of the ball strike region 268. In one example, the geometric center 263 and one or more regions near and/or surrounding the geometric center within the ball strike region 268 may provide a generally optimum location (i.e., optimum ball distance, ball speed, ball spin characteristics, etc.) on the face portion 262 for striking a golf ball. In yet another example, any location at or near the geometric center 263 and within the ball strike region 268 may provide a generally optimum location on the face portion 262 for striking a golf ball. However, a ball may be struck with any portion of the face portion 262 within the ball strike region 268 or outside the ball strike region 268 for any of the golf club heads described herein resulting in certain ball flight characteristics different from an on-center hit that may be preferred by an individual. The configuration of the face portion 262 and the attachment of the face portion 262 (e.g., welding) to the body portion 210 may be similar in many respects to any of the golf club heads described herein and/or described in any of the incorporated by reference patent documents. The apparatus, methods, and articles of manufacture described herein are not limited in this regard.

The golf club head 200 may be associated with a ground plane 510, a horizontal midplane 520, and a top plane 530. In particular, the ground plane 510 may be a plane that is parallel or substantially parallel to the ground and is tangent to the lowest portion of the sole portion edge 292 when the golf club head 200 is at an address position (e.g., the golf club head 200 aligned to strike a golf ball). A top plane 530 may be a plane that is tangent to the upper most portion of top portion edge 282 when the golf club head 200 is at the address position. The ground and top planes 510 and 530, respectively, may be parallel or substantially parallel to each other. The horizontal midplane 520 may be vertically halfway between the ground and top planes 510 and 530, respectively. Further, the golf club head 200 may be associated with a loft plane 540 defining a loft angle 545 ($\alpha$) of the golf club head 200. The loft plane 540 may be a plane that is tangent to the face portion 262. The loft angle 545 may be defined by an angle between the loft plane 540 and a vertical plane 550 normal to the ground plane 510.

The body portion 210 may be a hollow body including an interior cavity 310 having inner walls 312. The interior cavity 310 may extend between the front portion 260, the back portion 270, the top portion 280, and the sole portion 290. In the example of FIGS. 2-13, the interior cavity 310 of the body portion 210 may be enclosed with and partially defined with the face portion 262. The configuration of the interior cavity 310 (e.g., height, width, volume, shape, etc.), the configuration of the interior cavity 310 relative to the body portion 210 (e.g., volume of the interior cavity 310 relative to the volume of body portion 210), the width and height variation of the interior cavity 310, and access to the interior cavity 310 from one or more ports on the body portion 210 may be similar to any of the golf club heads described herein and/or described in any of the incorporated by reference patent documents. The apparatus, methods, and articles of manufacture described herein are not limited in this regard.

The back wall portion 272 of the back portion 270 may include an upper back wall portion 612 and a lower back wall portion 614. The back wall portion 272 may include a ledge portion 616 that may extend between the toe portion edge 242 and the heel portion edge 252 in a continuous or discontinuous manner. The lower back wall portion 614 may be located farther back on the body portion 210 than the upper back wall portion 612, with the ledge portion 616 defining a transition portion between the upper back wall portion 612 and the lower back wall portion 614. Accordingly, the ledge portion 616 may extend transverse to the upper back wall portion 612 and the lower back wall portion 614. In one example, as illustrated in FIG. 2-13, the ledge portion 616 may include a first ledge portion 626 and a second ledge portion 636. The first ledge portion 626 may extend on the back wall portion from the toe portion edge 242 to a center portion of the back wall back wall portion 272. The second ledge portion 636 may extend from the center portion of the back wall portion 272 to the heel portion edge 252. As illustrated in FIGS. 2-13, the ledge portion 616 may provide for a relatively greater mass of the body portion 210 below the horizontal midplane 520, and the mass of the body portion 210 below the horizontal midplane 520 to be moved farther back on the body portion 210. The width of the ledge portion 616 may be greater than, equal to, or less than the width of the interior cavity at certain locations of the body portion 210. The configuration of the ledge portion 616 (e.g., width, segments, tapering, shape, etc.) and the properties of the ledge portion 616 relative to the width of the interior cavity may be similar to any ledge portion or similar structure of any of the golf club heads described herein and/or described in any of the incorporated by reference patent documents. The apparatus, methods, and articles of manufacture described herein are not limited in this regard.

The body portion 210 may include one or more ports, which may be exterior ports and/or interior ports (e.g., located inside the body portion 210). The inner walls 312 of the interior cavity 310 may include one or more ports (not illustrated). In one example, as illustrated in FIGS. 2-13, the back portion 270 may include one or more ports along or proximate to the periphery of the body portion 210. For example, the body portion 210 may include a first set of ports 320 (e.g., illustrated as ports 321 and 322) above the horizontal midplane 520, a second set of ports 330 (e.g., illustrated as ports 331 and 332) below the horizontal midplane 520, a third set of ports 340 (e.g., illustrated as ports 341, 342, and 343) below the horizontal midplane 520, and a fourth set of ports 350 (e.g., illustrated as ports 351 and 352) below the horizontal midplane 520. The locations, spacing relative to other ports, and any other configuration of each port of the first set of ports 320, the second set of ports 330, the third set of ports 340, and/or the fourth set of ports 350 may be similar in many respects to any of the ports described herein or described in any of the incorporated by reference patent documents. Further, any one or more of the ports of the first set of ports 320, the second set of ports 330, the third set of ports 340, and/or the fourth set of ports 350 may be connected to interior cavity 310 through which one or more filler materials may be injected into the interior cavity 310. In the example of FIGS. 2-13, the ports 321, 331, and 351 may be connected to the interior cavity 310 via openings 361, 371, and 381, respectively. The apparatus, methods, and articles of manufacture described herein are not limited in this regard.

The body portion 210 may include one or more mass portions (e.g., weight portion(s)), which may be integral mass portion(s) or separate mass portion(s) that may be coupled to the body portion 210. In the illustrated example as illustrated in FIGS. 2-13, the body portion 210 may include a first set of mass portions 420 (e.g., illustrated as mass portions 421 and 422), a second set of mass portions 430 (e.g., illustrated as mass portions 431 and 432), a third set of mass portions 440 (e.g., illustrated as mass portions 441, 442, and 443), and a fourth set of mass portions 450 (e.g., illustrated as mass portions 451 and 452). While the above example may describe a particular number or portions of mass portions, a set of mass portions may include a single mass portion, or a plurality of mass portions as described herein and in any of the incorporated by reference patent documents. For example, any one or a combination of adjacent sets of mass portions of the first set of mass portions 420 may be a single mass portion, the second set of mass portions 430 may be a single mass portion, the third set of mass portions 440 may be a single mass portion, and/or the fourth set of mass portions 450 may be a single mass portion. Further, the first set of mass portions 420, the second set of mass portions 430, the third set of mass portions 440, and/or the fourth set of mass portions 450 may be a portion of the physical structure of the body portion 210. The mass portions of the first set of mass portions 420, the second set of mass portions 430, the third set of mass portions 440, and/or the fourth set of mass portions 450 may be similar to any of the mass portions described in any of the incorporated by reference patent documents. The apparatus, methods, and articles of manufacture described herein are not limited in this regard.

The interior cavity 310 may be partially or entirely filled with one or more filler materials (i.e., a cavity filling material), which may include one or more similar or different types of materials. In one example, as illustrated in FIGS. 2-13, the interior cavity 310 may be filled with a first filler material 512 and a second filler material 514. In one example, the first filler material 512 may be a rubber or rubber compound, and the second filler material 514 may be an epoxy-type of material. In another example, the first filler material 512 and/or the second filler material 514 may be different polymer materials. The first filler material 512 and the second filler material 514 may be similar to any of the filler materials described herein or described in any of the incorporated by reference patent documents. The first filler material 512 and/or the second filler material 514 may be coupled to all or portions of the inner walls 312 of the interior cavity 310. In one example, the first filler material 512 and/or the second filler material 514 may have inherent adhesive or bonding properties to attach to all or portions of the inner walls 312. In another example, the first filler material 512 and/or the second filler material may be attached to all or portions of the inner walls 312 with one or more bonding agents or adhesives that may be mixed with the first filler material 512 and/or the second filler material 514, respectively. In another example, the first filler material 512 and/or the second filler material 514 may be attached to all or portions of the inner walls 312 with one or more bonding agents or adhesives that may be separate from the first filler material 512 and/or the second filler material 514, respectively. The amount (i.e., volume and/or mass) of the first filler material 512 and/or the second filler material 514 may be determined for each golf club head (i.e., having a certain loft angle) to (i) provide vibration dampening or sound dampening (e.g., consistent and/or pleasing sound and feel when the golf club head 200 strikes a golf ball as perceived by an individual using the golf club head 200), (ii) provide structural support for the face portion 262, and/or (iii) optimize ball travel distance, ball speed, ball launch angle, ball spin rate, ball peak height, ball landing angle and/or ball dispersion. Details regarding the filler materials 512 and 514, coupling of the filler materials 512 and 514 to the body portion 210 and each other, material compositions and/or physical properties of the filler materials 512 and 514, the mass and/or volume of each of the filler materials 512 and 514 in the interior cavity 310 may be provided in detail in any of the incorporated by reference patent documents, and in particular, in U.S. Pat. No. 10,632,349, which is incorporated by reference herein. The apparatus, methods, and articles of manufacture described herein are not limited in this regard.

In the example of FIGS. 2-13, a portion of the interior cavity 310 including a central portion 311 of the interior cavity 310, which may be a portion of the interior cavity 310 that may generally correspond to the ball strike region 268, may be include the first filler material 512 and the second filler material 514. The width 313 of the interior cavity 310 at the central portion 311 of the interior cavity 310 may be generally greater than the width 313 of the interior cavity 310 at other portions of the interior cavity 310. Accordingly, the region of the interior cavity 310 behind the ball strike region 268, i.e., the central portion 311, may include a relatively large volume of the first filler material 512 and/or the second filler material 514. Further, the configuration of the central portion 311 (i.e., size, shape, contour, volume, etc.) may depend on the loft angle 545. For example, a golf club head 200 with a relatively small loft angle may have a larger central portion 311 (i.e., larger volume, depth, height, etc.) than a golf club head 200 with a relatively large loft angle. Accordingly, as described herein, the amount of first filler material 512 and/or the second filler material 514 inside the interior cavity 310, and more specifically, in the central portion 311 may be determined based on the loft angle 545 to provide (i) provide vibration dampening or sound dampening (e.g., consistent and/or pleasing sound and feel when the golf club head 200 strikes a golf ball as perceived by an individual using the golf club head 200), (ii) provide structural support for the face portion 262, and/or (iii) optimize ball travel distance, ball speed, ball launch angle, ball spin rate, ball peak height, ball landing angle and/or ball dispersion. The apparatus, methods, and articles of manufacture described herein are not limited in this regard.

The contour of the interior cavity 310 or the shape of the inner walls 312 may be defined by a plurality of recessed portions that may be recessed relative to the perimeter edge portion 261. In the example of FIGS. 2-13, the interior cavity 310 may include a first recessed portion 314, a second recessed portion 315 that may have a generally smaller depth (i.e., defined by the interior cavity width 313 as viewed in cross section in FIGS. 5-40) relative to the first recessed portion 314, a third recessed portion 316 that may have a generally smaller depth than the second recessed portion 315, a fourth recessed portion 317 that may have a generally smaller depth than the third recessed portion 316, and a fifth recessed portion 318 that may have a generally smaller depth than the fourth recessed portion 317. The interior cavity 310 may have more or less recessed portions. The interior cavity 310 may include a first internal channel 325 that may extend from a location at the toe portion 240 to the central portion 311, and a second internal channel 326 that may extend from a location at the heel portion 250 to the central portion 311. The first recessed portion 314, the second recessed portion 315, the third recessed portion 316, the fourth recessed portion 317, the fifth recessed portion 318, the first internal channel 325, the second internal channel 326, and/or any transition regions therebetween may be described in detail in one or more of the incorporated by reference patent documents, and in particular, in U.S. Pat. No. 10,632,349, which is incorporated by reference herein. The apparatus, methods, and articles of manufacture described herein are not limited in this regard.

In one example, as illustrated in FIGS. 2-13, the first recessed portion 314, the second recessed portion 315, the third recessed portion 316, and the internal channels 325 and 326 may be filled with the first filler material 512, whereas the remaining portions of the interior cavity 310 may be filled with the second filler material 514. In another example, the first recessed portion 314, the second recessed portion 315, and the internal channels 325 and 326 may be filled with the first filler material 512, whereas the remaining portions of the interior cavity 310 may be filled with the second filler material 514. In another example, the first recessed portion 314, the second recessed portion 315, the internal channels 325 and 326, the third recessed portion 316 and the fifth recessed portion 318 may be filled with the first filler material 512, whereas the remaining portions of the interior cavity 310 may be filled with the second filler material 514. In yet another example, the entire interior cavity 310 may be filled with the first filler material 512 or the first filler material. The apparatus, methods, and articles of manufacture described herein are not limited in this regard.

A width 522 ($W_{F1}$) of the first filler material 512 and the width 524 ($W_{F2}$) of the second filler material 514 may vary from the toe portion 240 to the heel portion 250 and/or from the top portion 280 to the sole portion 290 and/or according to the shapes of the first recessed portion 314, the second recessed portion 315, the third recessed portion 316, the fourth recessed portion 317, and/or the fifth recessed portion 318 depending on the location inside the interior cavity 310. The width 522 of the first filler material 512 and the width 524 of the second filler material 514 as related to the physical properties, ball strike and trajectory characteristics, and configuration of the golf club head 200 (e.g., loft angle) may be provided in detail in any of the incorporated by reference patent documents, and in particular, in U.S. Pat. No. 10,632,349, which is incorporated by reference herein. The apparatus, methods, and articles of manufacture described herein are not limited in this regard.

Figure 13:
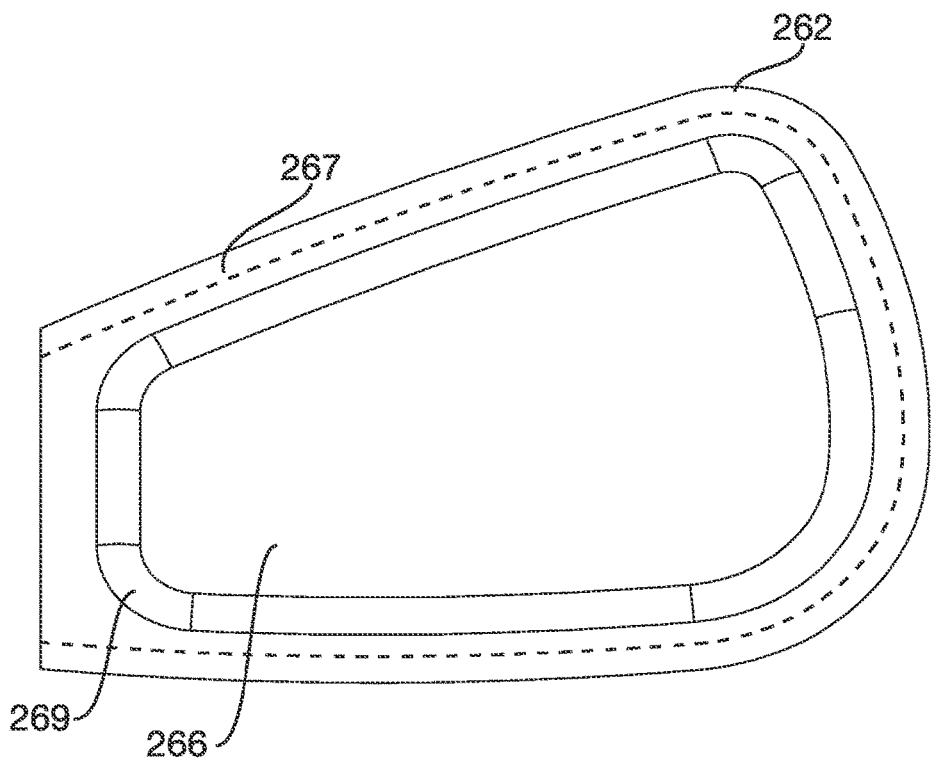
FIG. 13 depicts a back view of a face portion of a golf club head according to any embodiment of the apparatus, methods, and articles of manufacture described herein.

In one example, as illustrated in FIG. 13, the back surface 266 of the face portion 262 may include one or more grooves proximate to the perimeter portion 267 of the face portion 262. In one example, as illustrated in FIG. 13, a back groove 269 may be a continuous groove (i.e., defining a loop) extending in a path similar to the path of the perimeter portion 267 proximate to the perimeter portion 267. The back groove 269 may include a relatively thinner portion of the face portion 262. Accordingly, the back groove 269 may increase the flexibility of the face portion 262 so that when a golf ball strikes the face portion 262, the face portion 262 provides a greater rebound (i.e., a greater trampoline effect), and hence may provide a greater velocity for the golf ball. All or portions of the back groove 269 may be filled with the first filler material 512 and/or second filler material 514. In the example of the golf club head 200, all of the back groove 269 may be filled with the second filler material 514. Accordingly, the second filler material 514 may structurally support the relatively thinner portions of the face portion 262 defined by the back groove 269. In another example, a plurality of separate grooves (not illustrated) may be provided on the back surface 266 of the face portion 262 at certain locations proximate to the perimeter portion 267 to provide a certain rebound effect for the face portion 262. In yet another example, a continuous groove similar to the back groove 269 and/or a plurality of separate grooves (not illustrated) may be provided at certain locations between the perimeter portion 267 and the geometric center 263 on the back surface 266 of the face portion 262 to provide a certain rebound effect for the face portion 262. The face portion of any of the golf club heads described herein may include the back groove 269. The apparatus, methods, and articles of manufacture described herein are not limited in this regard.

As described herein, the face portion 262 may be relatively thin to provide increased bending and deflection of the face portion 262 during a golf ball strike. Further, the face portion 262 may include one or more grooves such as the back groove 269 on the back surface 266 of the face portion 262 as described herein to further increase the flexibility of the face portion 262. The second filler material 514 may be a polymer material with a relatively high strength and stiffness to provide structural support and stability for the face portion 262 to prevent failure of the face portion 262 during a golf ball strike or repeated golf ball strikes (i.e., face portion fatigue). As described herein, the second filler material 514 may be an epoxy-type of material. The second filler material 514 may also have a relatively high COR as described herein to provide a rebound effect for the face portion 262 after a golf ball strike. As further described herein, the first filler material 512 may be a rubber-type of compound with a lower strength and stiffness (i.e., softer or less rigid) than the second filler material 514 and a higher COR than the second filler material 514. Accordingly, the first filler material 512 may provide additional structural support for the face portion 262. Further, the relatively higher COR of the first filler material 512 may allow the first filler material 512 to store the energy from a golf ball strike and to release a substantial amount of the energy back to the golf ball (i.e., without losing much impact energy) by providing a relatively large rebound effect for the face portion 262. Additionally, the different material properties of the first filler material 512 and the second filler material 514 as described herein may provide sound and vibration dampening at different frequency ranges to provide a pleasant sound and feel for an individual. The apparatus, methods, and articles of manufacture described herein are not limited in this regard.

Figure 14:
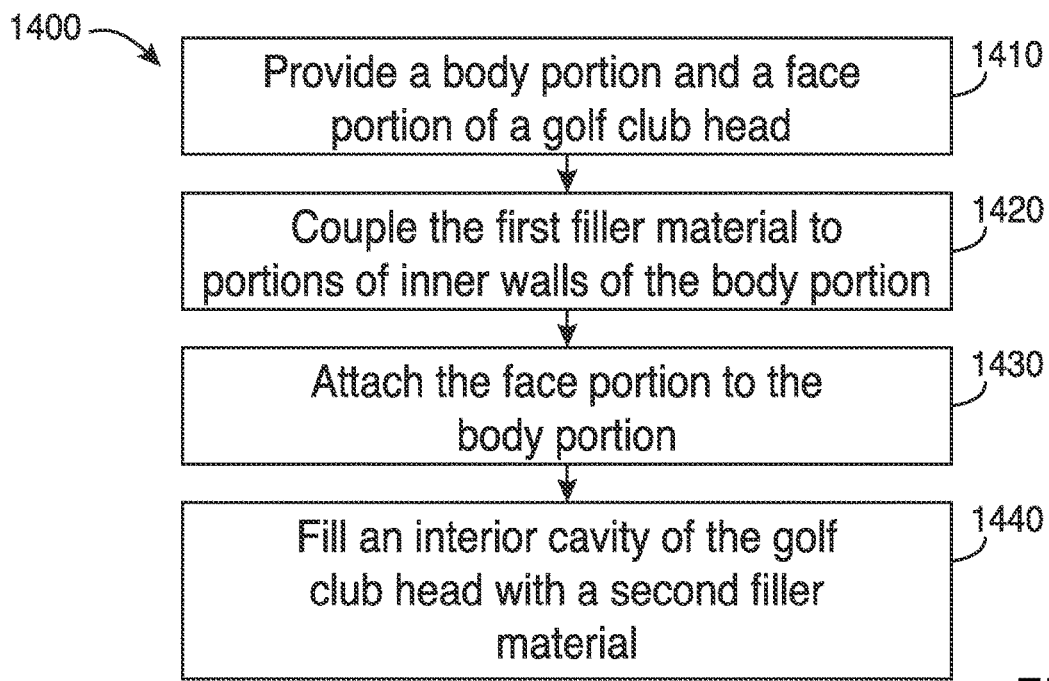
FIG. 14 depicts a manner in which an example golf club head described herein may be manufactured.

FIG. 14 depicts one manner by which the golf club head 200 or any of the golf club heads described herein may be manufactured. In the example of FIG. 14, the process 1400 may begin with providing a body portion 210 and a face portion 262 of a golf club head 200 (block 1410). The first filler material 512 may be coupled to the interior cavity 310 (block 1420). In one example, the first filler material 512 may be formed in one or more recessed portions as described herein (i.e., any of the recessed portions described herein) of the interior cavity 310 by injection molding. The first filler material 512 may then cure at ambient temperature or by one or more heating/cooling cycles depending on the material used for the first filler material 512. In another example, the first filler material 512 may be molded into the shape of one or more recessed portions as described herein and then coupled to the one or more recessed portions with a bonding agent as described herein. The face portion 262 may then be attached to the body portion 210 as described herein to enclose the interior cavity 310 (block 1430). The second filler material 514 may then be injected into the interior cavity 310 through one or more of the ports of the first set of ports 320, the second set of ports 330, the third set of ports 340, and/or the fourth set of ports 350 that may be connected to the interior cavity 310 as described herein (block 1440). The second filler material 514 may then cure at ambient temperature or by one or more heating/cooling cycles depending on the material used for the second filler material 514. The apparatus, methods, and articles of manufacture described herein are not limited in this regard.

Figure 15:
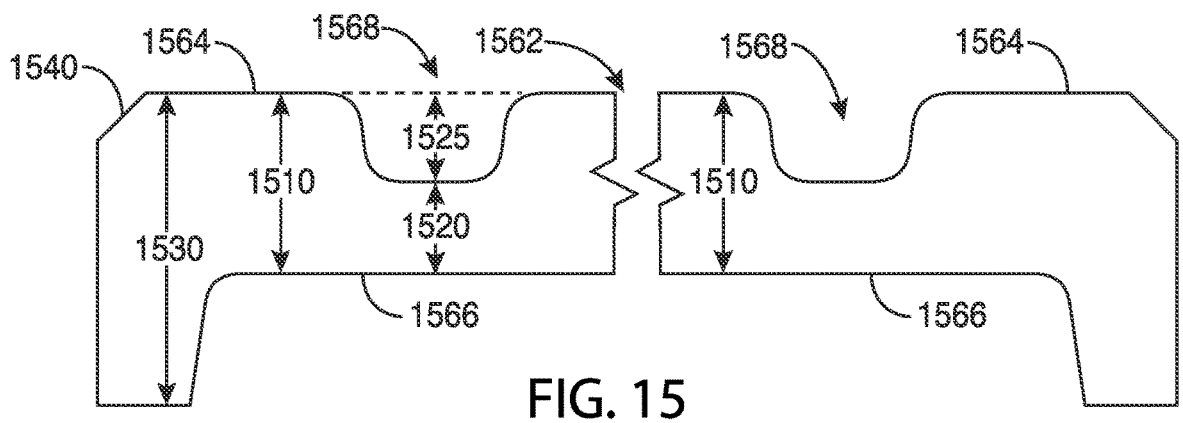
FIGS. 15 and 16 depict schematic cross-sectional views of two example face portions of a golf club head according to embodiments of the apparatus, methods, and articles of manufacture described herein.

In one example, as illustrated in FIG. 15, a face portion 1562, which may be any of the face portions described herein, may have a first thickness 1510 (T1) or a second thickness 1520 (T2). The first thickness 1510 may be a thickness of a section of the face portion 1562 adjacent to a groove 1568 whereas the second thickness 1520 may be a thickness of a section of the face portion 1562 below the groove 1568. For example, the first thickness 1510 may be a maximum distance between the front surface 1564 and the back surface 1566. The second thickness 1520 may be based on the groove 1568. In particular, the groove 1568 may have a groove depth 1525 (Dgroove). The second thickness 1520 may be a maximum distance between the bottom of the groove 1568 and the back surface 1566. The sum of the second thickness 1520 and the groove depth 1525 may be substantially equal to the first thickness 1510 (e.g., T2+Dgroove=T1). Accordingly, the second thickness 1520 may be less than the first thickness 1510 (e.g., T2<T1).

To lower and/or move the CG of a golf club head further back, such as the CG of any of the golf club heads described herein, mass from the front portion of a golf club head may be removed by using a relatively thinner face portion 1562. For example, the first thickness 1510 or the second thickness 1520 may be less than or equal to 0.1 inch (2.54 millimeters). In another example, the first thickness 1510 or the second thickness 1520 may be about 0.075 inch (1.875 millimeters) (e.g., T1=0.075 inch). With the support of the back wall portion of a golf club head to form an interior cavity and filling at least a portion of the interior cavity with one or more filler materials as described herein, the face portion 1562 may be relatively thinner (e.g., T1<0.075 inch) without degrading the structural integrity, sound, and/or feel of a golf club head. In one example, the first thickness 1510 may be less than or equal to 0.060 inch (1.524 millimeters) (e.g., T1≤0.060 inch). In another example, the first thickness 1510 may be less than or equal to 0.040 inch (1.016 millimeters) (e.g., T1≤0.040 inch). Based on the type of material(s) used to form the face portion 1562 and/or the body portion 210, the face portion 1562 may be even thinner with the first thickness 1510 being less than or equal to 0.030 inch (0.762 millimeters) (e.g., T1≤0.030 inch). The groove depth 1525 may be greater than or equal to the second thickness 1520 (e.g., Dgroove≥T2). In one example, the groove depth 1525 may be about 0.020 inch (0.508 millimeters) (e.g., Dgroove=0.020 inch). Accordingly, the second thickness 1520 may be about 0.010 inch (0.254 millimeters) (e.g., T2=0.010 inch). In another example, the groove depth 1525 may be about 0.015 inch (0.381 millimeters), and the second thickness 1520 may be about 0.015 inch (e.g., Dgroove=T2=0.015 inch). Alternatively, the groove depth 1525 may be less than the second thickness 1520 (e.g., Dgroove<T2). Without the support of the back wall portion of a golf club head and one or more filler materials used to fill in the interior cavity, the golf club head may not be able to withstand multiple impacts by a golf ball on a face portion. In contrast, a golf club head with a relatively thin face portion but without the support of the back wall portion and the one or more filler materials as described herein (e.g., a cavity-back golf club head) may produce unpleasant sound (e.g., a tinny sound) and/or feel during impact with a golf ball. The apparatus, methods, and articles of manufacture described herein are not limited in this regard.

Based on manufacturing processes and methods used to form a golf club head such as any of the golf club heads described herein, the face portion 1562 may include additional material at or proximate to a periphery of the face portion 1562. Accordingly, the face portion 1562 may also include a third thickness 1530, and a chamfer portion 1540. The third thickness 1530 may be greater than either the first thickness 1510 or the second thickness 1520 (e.g., T3>T1>T2). In particular, the face portion 1562 may be coupled to the body portion of a golf club head by a welding process. For example, the first thickness 1510 may be about 0.030 inch (0.762 millimeters), the second thickness 1520 may be about 0.015 inch (0.381 millimeters), and the third thickness 1530 may be about 0.050 inch (1.27 millimeters). Accordingly, the chamfer portion 1540 may accommodate some of the additional material when the face portion 1562 is welded to the body portion of the golf club head.

Figure 16:
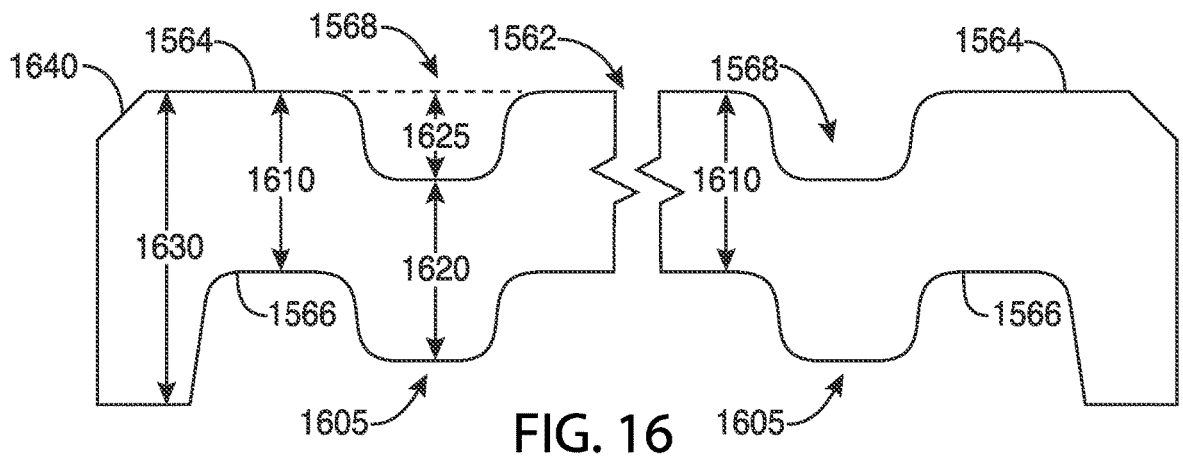

As illustrated in FIG. 16, for example, the face portion 1562 may include a reinforcement section, which is generally illustrated as reinforcement section 1605, below one or more grooves 1568. In one example, the face portion 1562 may include a reinforcement section 1605 below each groove. Alternatively, face portion 1562 may include the reinforcement section 1605 below some grooves (e.g., every other groove) or below only one groove. The face portion 1562 may include a first thickness 1610, a second thickness 1620, a third thickness 1630, and a chamfer portion 1640. The groove 1568 may have a groove depth 1625. The reinforcement section 1605 may define the second thickness 1620. The first and second thicknesses 1610 and 1620, respectively, may be substantially equal to each other (e.g., T1=T2). In one example, the first and second thicknesses 1610 and 1620, respectively, may be about 0.030 inch (0.762 millimeters) (e.g., T1=T2=0.030 inch). The groove depth 1625 may be about 0.015 inch (0.381 millimeters), and the third thickness 1630 may be about 0.050 inch (1.27 millimeters). The groove 1568 may also have a groove width. The width of the reinforcement section 1605 may be greater than or equal to the groove width. The apparatus, methods, and articles of manufacture described herein are not limited in this regard.

Alternatively, the face portion 1562 may vary in thickness at and/or between the top portion and the sole portion of a golf club head. In one example, the face portion 1562 may be relatively thicker at or proximate to the top portion than at or proximate to the sole portion (e.g., thickness of the face portion 1562 may taper from the top portion towards the sole portion). In another example, the face portion 1562 may be relatively thicker at or proximate to the sole portion than at or proximate to the top portion (e.g., thickness of the face portion 1562 may taper from the sole portion towards the top portion). In yet another example, the face portion 1562 may be relatively thicker between the top portion and the sole portion than at or proximate to the top portion and the sole portion (e.g., thickness of the face portion 1562 may have a bell-shaped contour). The face portion 1562 may be similar to any of the face portions described in any of the incorporated by reference patent documents. The apparatus, methods, and articles of manufacture described herein are not limited in this regard.

Figure 17:
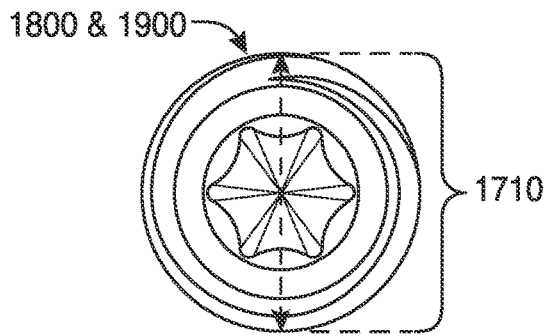
FIG. 17 depicts a top view of a mass portion of a golf club head according to an embodiment of the apparatus, methods, and articles of manufacture described herein.

One or more mass portions of any of the sets of mass portions described herein may have similar or different physical properties (e.g., color, marking, shape, size, density, mass, volume, external surface texture, materials of construction, etc.). In the illustrated example as illustrated in FIG. 17, one or more mass portions of any of the sets of mass portions described herein may have a cylindrical shape (e.g., a circular cross section). Alternatively, one or more mass portions of any of the sets of mass portions described herein may have similar or different shapes relative to one or more other mass portions of the set of mass portions. In another example, one or more mass portions of any of the sets of mass portions described herein may have a different color(s), marking(s), shape(s), density or densities, mass(es), volume(s), material(s) of construction, external surface texture(s), and/or any other physical property as compared to one or more mass portions of another one of the sets of mass portions as described herein. The properties of any of the mass portions and sets of mass portions described herein may be similar to any of the mass portions and sets of mass portions described in any of the incorporated by reference patent documents. The apparatus, methods, and articles of manufacture described herein are not limited in this regard.

Figure 18:
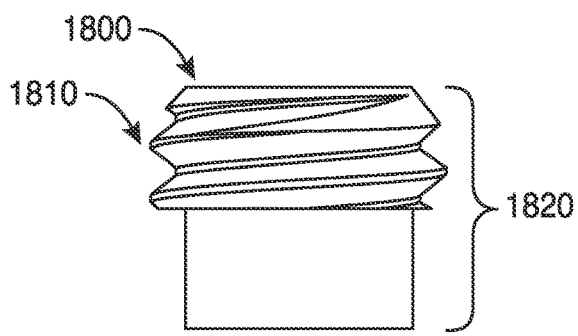
FIGS. 18 and 19 depict side views of two example mass portions of a golf club head according to embodiments of the apparatus, methods, and articles of manufacture described herein.
Figure 19:
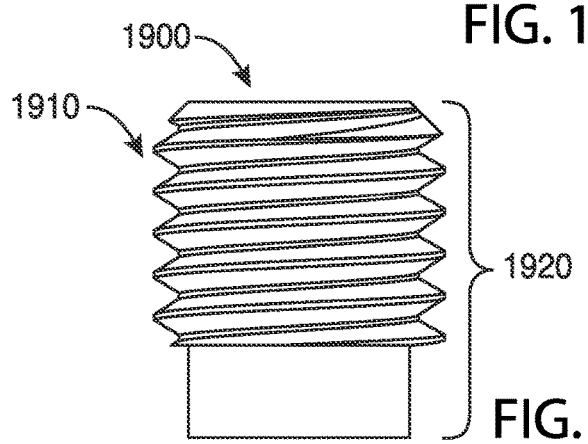
Figure 20:
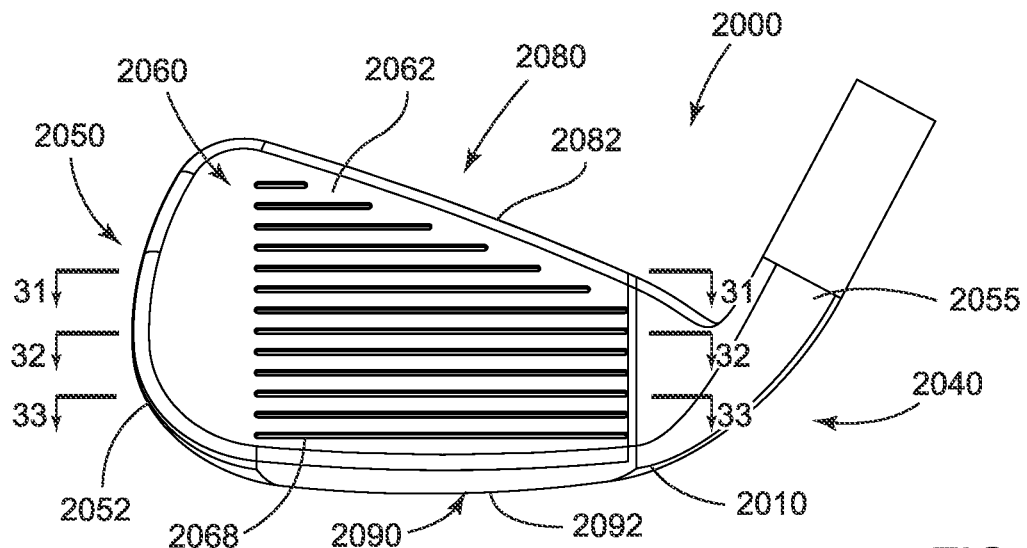
FIGS. 20, 21, 22, 23, 24, 25, 26, 27, 28, 29, 30, 31, 32, and 33 depict a front view, a top view, a bottom view, a back view, another back view, a top and toe side view, a toe side view, a heel side view, a cross-sectional view taken at line 28-28 of FIG. 23, a cross-sectional view taken at line 29-29 of FIG. 23, a cross-sectional view taken at line 30-30 of FIG. 23, a cross-sectional view taken at line 31-31 of FIG. 20, a cross-sectional view taken at line 32-32 of FIG. 20, a cross-sectional view taken at line 33-33 of FIG. 20, respectively, of a golf club head according to an embodiment of the apparatus, methods, and articles of manufacture described herein.
Figure 21:
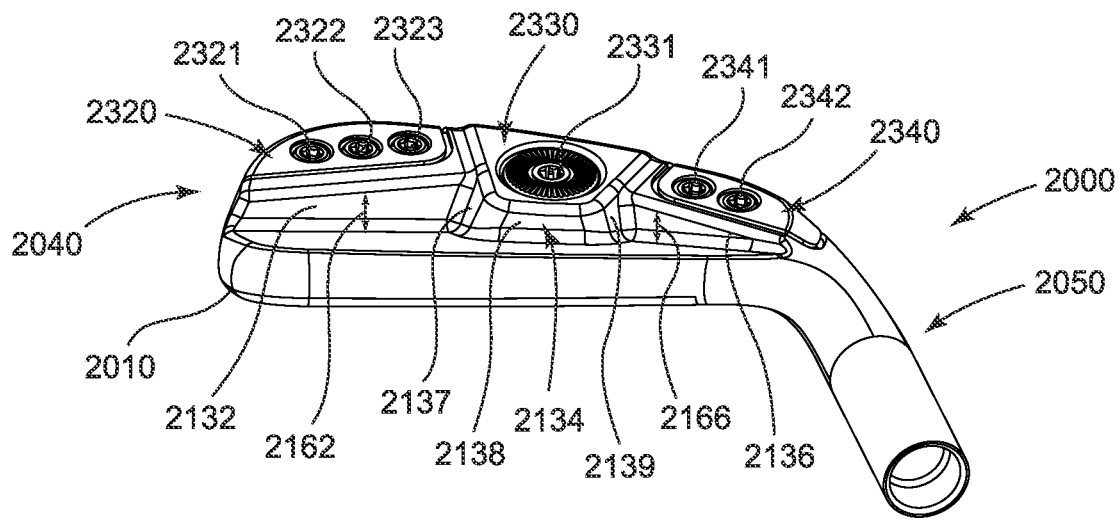
Figure 22:
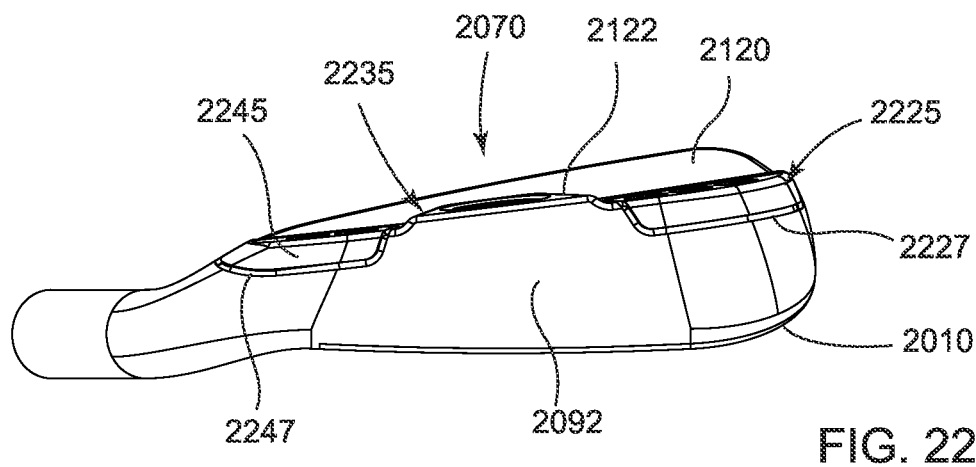
Figure 23:
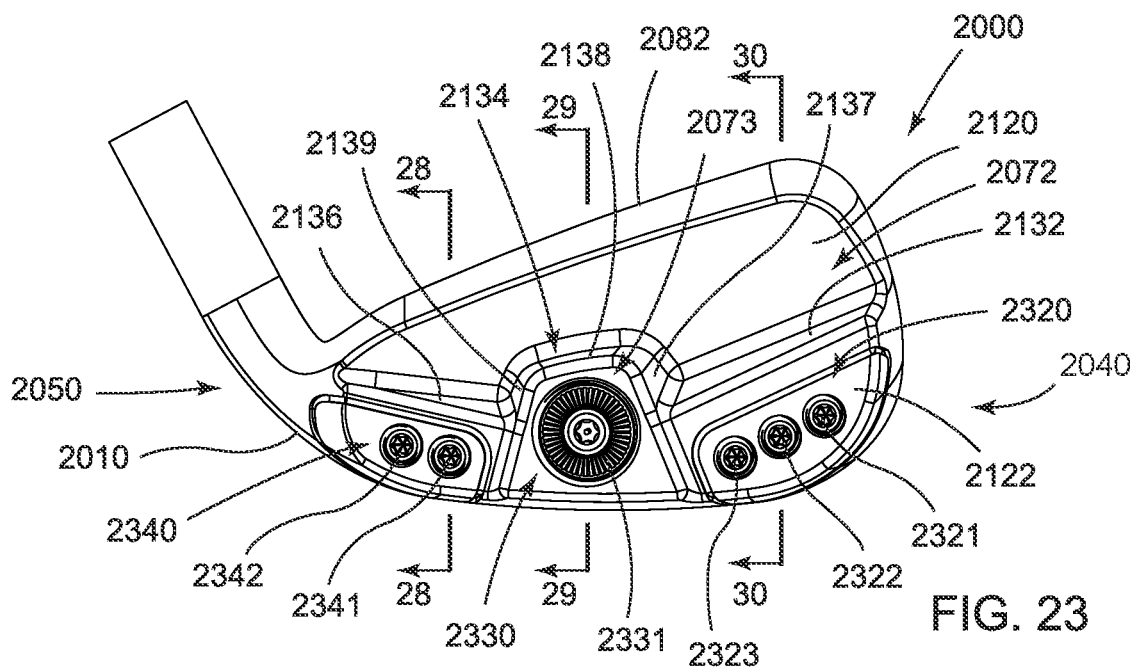
Figure 24:
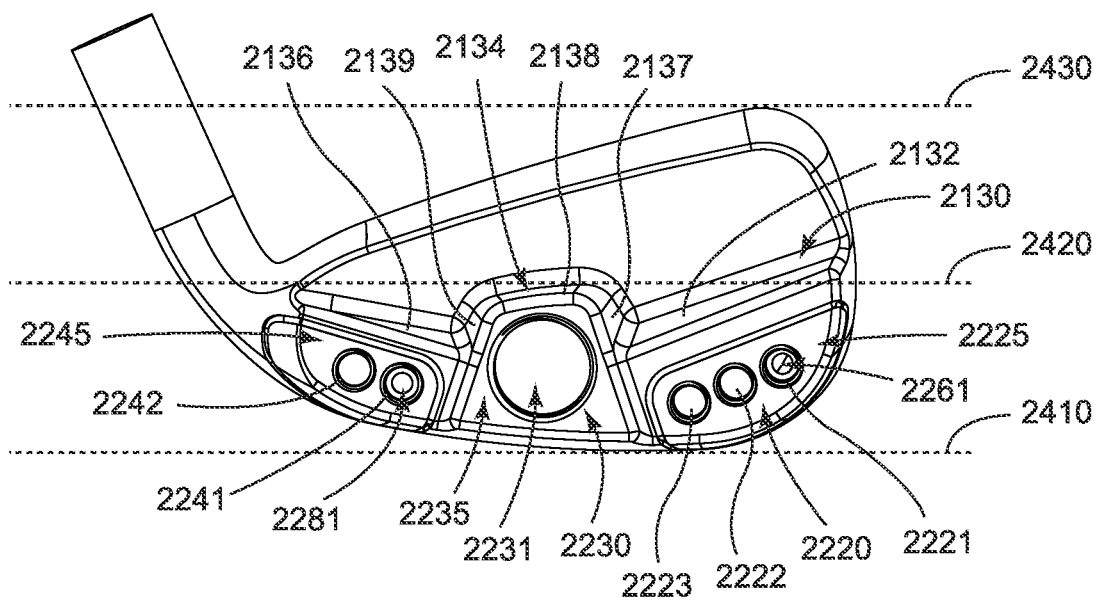
Figure 25:
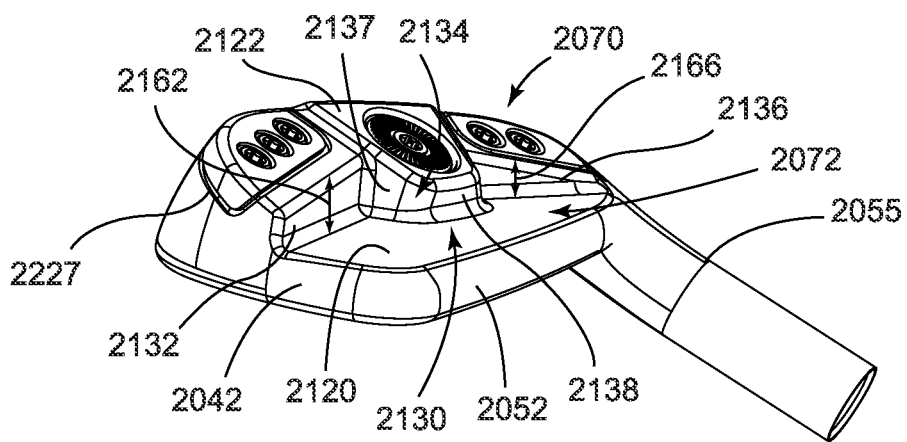
Figures 26, 27:
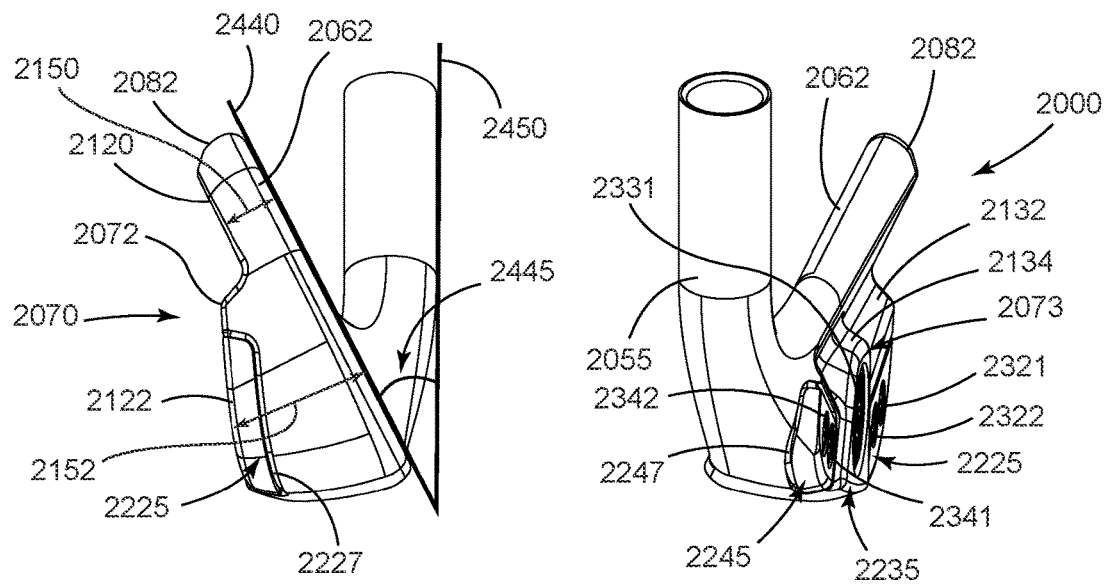

Referring to FIGS. 18 and 19, for example, a first mass portion 1800 and a second mass portion 1900 may include threads, generally illustrated as threads 1810 and threads 1910, respectively, to engage with correspondingly configured threads in ports on the to secure in the ports as described herein. Accordingly, one or more mass portions as described herein may be shaped similar to and function as a screw or threaded fastener for engaging threads in a port. For example, one or more mass portions of any of the sets of mass portions described herein may be a screw. One or more mass portions of any of the mass portions described herein may not be readily removable from the body portion of a golf club head with or without a tool. Alternatively, one or more mass portions of any of the sets of mass portions described herein may be readily removable (e.g., with a tool) so that a relatively heavier or lighter mass portion may replace one or more mass portions of any of the sets of mass portions described herein. In another example, one or more mass portions of any of the sets of mass portions described herein may be secured in the ports with epoxy or adhesive so that the mass portions may not be readily removable. In yet another example, one or more mass portions of any of the sets of mass portions described herein may be secured in the ports with both threads and thread sealant (e.g., acrylic adhesive, cyanoacrylate adhesive, epoxy, thermoplastic adhesive, silicone sealant, or urethane adhesive) so that the mass portions may not be readily removable. In yet another example, one or more mass portions of any of the sets of mass portions described herein may be press fit in a port. In yet another example, one or more mass portions of any of the sets of mass portions described herein may be formed inside a port by injection molding. For example, a liquid metallic material (i.e., molten metal) or a plastic material (e.g., rubber, foam, or any polymer material) may be injected or otherwise introduced into a port. After the liquid material is cooled and/or cured inside the port, the resulting solid material (e.g., a metal material, a plastic material, or a combination thereof) may form a mass portion. The apparatus, methods, and articles of manufacture described herein are not limited in this regard.

As mentioned above, one or more mass portions of any of the sets of mass portions described herein may be similar in some physical properties but different in other physical properties. For example, a mass portion may be made from an aluminum-based material or an aluminum alloy whereas another mass portion may be made from a tungsten-based material or a tungsten alloy. In another example, a mass portion may be made from a polymer material whereas another mass portion may be made from a steel-based material. In yet another example, as illustrated in FIGS. 17-19, one or more mass portions of any of the sets of mass portions described herein may have a diameter 1710 of about 0.25 inch (6.35 millimeters) but one or more mass portions of another one or more sets of mass portions described herein may be different in height. In particular, one or more mass portions of any of the sets of mass portions described herein may be associated with a first height 1820, and one or more mass portions of another one or more sets of mass portions described herein may be associated with a second height 1920. The first height 1820 may be relatively shorter than the second height 1920. In one example, the first height 1820 may be about 0.125 inch (3.175 millimeters) whereas the second height 1920 may be about 0.3 inch (7.62 millimeters). In another example, the first height 1820 may be about 0.16 inch (4.064 millimeters) whereas the second height 1920 may be about 0.4 inch (10.16 millimeters). Alternatively, the first height 1820 may be equal to or greater than the second height 1920. Although the above examples may describe particular dimensions, one or more mass portions described herein may have different dimensions. In one example, any of the mass portions described herein may be interchangeably used in any of the ports described herein. Any property of any of the mass portions described herein may be similar to the corresponding property of any of the mass portions described in any of the incorporated by reference patent documents. The apparatus, methods, and articles of manufacture described herein are not limited in this regard.

In the example of FIGS. 20-38, a golf club head 2000 may include a body portion 2010 having a toe portion 2040 with a toe portion edge 2042, a heel portion 2050 with a heel portion edge 2052 that may include a hosel portion 2055. A golf club shaft (such as the golf club shaft 104 that is illustrated for example in FIG. 1) may include one end coupled to the hosel portion 2055, and an opposite end coupled to a golf club grip (such as the grip 106 that is illustrated for example in FIG. 1) to form a golf club (such as the golf club 100 that is illustrated for example in FIG. 1). The body portion 2010 may further include a front portion 2060 with a perimeter edge portion 2061, a back portion 2070 with a back wall portion 2072, a top portion 2080 with a top portion edge 2082, and a sole portion 2090 with a sole portion edge 2092. The toe portion 2040, the heel portion 2050, the front portion 2060, the back portion 2070, the top portion 2080, and/or the sole portion 2090 may partially overlap each other. The toe portion edge 2042, the heel portion edge 2052, the top portion edge 2082, and the sole portion edge 2092 may define a periphery of the body portion 2010. The golf club head 2000 may be any type of golf club head described herein, such as, for example, an iron-type golf club head or a wedge-type golf club head. The volume of the golf club head 2000, the materials of construction of the golf club head 2000, and/or any components thereof may be similar to any of the golf club heads described herein and/or described in any of the incorporated by reference applications. The apparatus, methods, and articles of manufacture described herein are not limited in this regard.

The golf club head 2000 may include a face portion 2062 (i.e., the strike face), which may be integrally formed with the body portion 2010 (e.g., a single unitary piece). In one example, as illustrated in FIGS. 20-38, the face portion 2062 may be a separate piece coupled (e.g., directly or indirectly, adhesively, mechanically, by welding, and/or by soldering) to the front portion 2060 to close a front opening of the front portion 2060. The face portion 2062 may include a front surface 2064 and a back surface 2066. The front surface 2064 may include a plurality of front grooves 2068 that may extend between the toe portion 2040 and the heel portion 2050. Each front groove 2068 may have a front groove depth 2069 ($D_{FG}$). In one example, the front groove depth 2069 may be greater than or equal to 0.005 inch (0.127 mm) and less than or equal to 0.025 inch (0.635 mm) (0.005 in≤$D_{FG}$≤0.025 in). In another example, the front groove depth 2069 may be greater than or equal to 0.011 inch (0.267 mm) and less than or equal to 0.018 inch (0.445 mm) (0.011 in≤$D_{FG}$≤0.018 in). In another example, the front groove depth 2069 may be greater than or equal to 0.012 inch (0.311 mm) and less than or equal to 0.016 inch (0.400 mm) (0.012 in≤$D_{FG}$≤0.016 in). In yet another example, the front groove depth 2069 may be greater than or equal to 0.013 inch (0.33 mm) and less than or equal to 0.015 inch (0.381 mm) (0.013 in≤$D_{FG}$≤0.015 in). The front groove depth 2069 and the configuration of the front grooves 2068 (i.e., cross-sectional shape, curvature, length, width, etc.) may be determined to provide certain performance characteristics for the golf club head 2000. The apparatus, methods, and articles of manufacture described herein are not limited in this regard.

Each front groove 2068 may have a front groove width 2071 ($W_{FG}$). In one example, the front groove width 2071 may be greater than or equal to 0.011 inch (0.267 mm) and less than or equal to 0.033 inch (0.833 mm) (0.011 in≤$W_{FG}$≤0.033 in). In another example, the front groove width 2071 may be greater than or equal to 0.014 inch (0.347 mm) and less than or equal to 0.055 inch (1.406 mm) (0.014 in≤$W_{FG}$≤0.055 in). In another example, the front groove width 2071 may be greater than or equal to 0.017 inch (0.427 mm) and less than or equal to 0.062 inch (1.562 mm) (0.017 in≤$W_{FG}$≤0.062 in). In another example, the front groove width 2071 may be greater than or equal to 0.021 inch (0.521 mm) and less than or equal to 0.041 inch (1.041 mm) (0.021 in≤$W_{FG}$≤0.041 in). In another example, the front groove width 2071 may be greater than or equal to 0.025 inch (0.640 mm) and less than or equal to 0.032 inch (0.800 mm) (0.025 in≤$W_{FG}$≤0.032 in). In yet another example, the front groove width 2071 may be greater than or equal to 0.027 inch (0.677 mm) and less than or equal to 0.053 inch (1.354 mm) (0.027 in≤$W_{FG}$≤0.053 in). The front groove width 2071 and the configuration of the front grooves 2068 (i.e., cross-sectional shape, curvature, length, width, etc.) may be determined to provide certain performance characteristics for the golf club head 2000. The apparatus, methods, and articles of manufacture described herein are not limited in this regard.

In one example (not illustrated), the front portion 2060 may include one or a plurality of recessed shoulders configured to receive the face portion 2062 for attachment of the face portion 2062 to the body portion 2010. In another example, as illustrated in FIGS. 20-38, the back surface 2066 may include a perimeter portion 2067 that may be attached to a perimeter edge portion 2061 of the body portion 2010. The perimeter portion 2067 of the face portion 2062 may be attached to the perimeter edge portion 2061 of the body portion 2010 by one or more fasteners, one or more adhesive or bonding agents, and/or welding or soldering. In one example, the perimeter portion 2067 may be welded to the perimeter edge portion 2061 at one or more locations. In another example, the entire perimeter portion 2067 may be welded to the entire perimeter edge portion 2061 (i.e., a continuous weld). The configuration of the face portion 2062 and the attachment of the face portion 2062 (e.g., welding) to the body portion 2010 may be similar in many respects to any of the golf club heads described herein and/or described in any of the incorporated by reference applications. The apparatus, methods, and articles of manufacture described herein are not limited in this regard.

The golf club head 2000 may be associated with a ground plane 2410, a horizontal midplane 2420, and a top plane 2430. In particular, the ground plane 2410 may be a plane that is parallel or substantially parallel to the ground and is tangent to the lowest portion of the sole portion edge 2092 when the golf club head 2000 is at an address position (e.g., the golf club head 2000 aligned to strike a golf ball). A top plane 2430 may be a plane that is tangent to the upper most portion of top portion edge 2082 when the golf club head 2000 is at the address position. The ground plane 2410 and the top plane 2430, respectively, may be parallel or substantially parallel to each other. The horizontal midplane 2420 may be vertically halfway between the ground plane 2410 and the top plane 2430, respectively, and be parallel or substantially parallel to the ground plane 2410. Further, the golf club head 2000 may be associated with a loft plane 2440 defining a loft angle 2445 (α) of the golf club head 2000. The loft plane 2440 may be a plane that is tangent or coplanar to the face portion 2062. The loft angle 2445 may be defined by an angle between the loft plane 2440 and a vertical plane 2450 that is normal to the ground plane 2410. The apparatus, methods, and articles of manufacture described herein are not limited in this regard.

The back wall portion 2072 may include an upper back wall portion 2120, a lower back wall portion 2122, and a ledge portion 2130 between the upper back wall portion 2120 and the lower back wall portion 2122. The ledge portion 2130 may extend outward (i.e., away from the face portion 2062) from the upper back wall portion 2120 to the lower back wall portion 2122 (i.e., the ledge portion 2130 may extend inward or toward the face portion 2062 from the lower back wall portion 2122 to the upper back wall portion 2120). Accordingly, a body portion upper width 2150 ($W_{UB}$) may be defined by a distance between the front surface 2064 of the face portion 2062 and the outer surface of the upper back wall portion 2120, and a body portion lower width 2152 ($W_{LB}$) may be defined by a distance between the front surface 2064 of the face portion 2062 and the outer surface of the lower back wall portion 2122. In one example, the maximum value of the body portion lower width 2152 may be greater than or equal to 1.5 the maximum value of the body portion upper width 2150 ($W_{LB(MAX)} \geq 1.5 W_{UB(MAX)}$). In another example, the maximum value of the body portion lower width 2152 may be greater than or equal to 1.25 the maximum value of the body portion upper width 2150 ($W_{LB(MAX)} \geq 1.25 W_{UB(MAX)}$). In another example, the maximum value of the body portion lower width 2152 may be greater than or equal to 1.75 the maximum value of the body portion upper width 2150 ($W_{LB(MAX)} \geq 1.75 W_{UB(MAX)}$). In another example, the maximum value of the body portion lower width 2152 may be greater than or equal to twice the maximum value of the body portion upper width 2150 ($W_{LB(MAX)} \geq 2.0 W_{UB(MAX)}$). In another example, the maximum value of the body portion lower width 2152 may be greater than the maximum value of the body portion upper width 2150 ($W_{LB(MAX)} \geq W_{UB(MAX)}$). The apparatus, methods, and articles of manufacture described herein are not limited in this regard.

In the example of FIGS. 20-38, the ledge portion 2130 may include a first ledge portion 2132 that may extend from a location at or proximate to the toe portion edge 2042 toward the heel portion 2050, a second ledge portion 2134 that may be located at or proximate to a center portion 2073 of the back wall portion 2072, and a third ledge portion 2136 that may extend from a location at or proximate to the heel portion edge 2052 toward the toe portion 2040. The second ledge portion 2134 may extend between the first ledge portion 2132 and the third ledge portion 2136. The first ledge portion 2132 and the third ledge portion 2136 may also extend in a downwardly inclined direction toward the sole portion 2090. Accordingly, as illustrated in FIGS. 20-38, a first ledge portion height 2142, which may be defined by a distance between the first ledge portion 2132 and the ground plane 2410, may increase from the center portion 2073 toward the toe portion edge 2042, and a third ledge portion height 2146, which may be defined by a distance between the third ledge portion 2136 and the ground plane 2410, may increase from the center portion 2073 toward the heel portion edge 2052. As illustrated in FIGS. 20-38, for example, the second ledge portion 2134 may include a first side wall portion 2137 that may extend from the first ledge portion 2132 toward the top portion 2080, a center ledge portion 2138 that may extend from the first side wall portion 2137 toward the heel portion 2050, and a second side wall portion 2139 that may extend from the center ledge portion 2138 toward the sole portion 2090 and to the third ledge portion 2136. The second ledge portion 2134 may include a second ledge portion height 2144, which may be defined by a distance between the center ledge portion 2138 and the ground plane 2410. The second ledge portion height 2144 may be greater than the first ledge portion height 2142 and the third ledge portion height 2146 at or proximate to the center portion 2073. In another example, the ledge portion 2130 may be similar in some or many respects to the ledge portion 616 of the golf club head 200. In yet another example, the ledge portion 2130 may be similar in some or many respects to any of the ledge portions of the golf club heads described in any of the incorporated by reference applications. The apparatus, methods, and articles of manufacture described herein are not limited in this regard.

In the example of FIGS. 20-38, the first ledge portion 2132 may include a first ledge portion width 2162 that may decrease from the center portion 2073 toward the toe portion edge 2042. Accordingly, the widest part of the first ledge portion 2132 may be at the location where the first ledge portion 2132 and the first side wall portion 2137 meet. In one example, the increase in the first ledge portion height 2142 and the decrease in the first ledge portion width 2162 may be correlated. For example, every increase in the first ledge portion height 2142 may correspond to a decrease in the first ledge portion width 2162 that may be based on a certain factor, similar rate of change, certain non-similar rate of change, or a certain mathematical relationship. In another example, the increase in the first ledge portion height 2142 and decrease in the first ledge portion width 2162 may not have any correlation. The apparatus, methods, and articles of manufacture described herein are not limited in this regard.

In the example of FIGS. 20-38, the third ledge portion 2136 may include a third ledge portion width 2166 that may decrease from the center portion 2073 toward the heel portion edge 2052. Accordingly, the widest part of the third ledge portion 2136 may be at the location where the third ledge portion 2136 and the second side wall portion 2139 meet. In one example, the increase in the third ledge portion height 2146 and the decrease in the third ledge portion width 2166 may be correlated. For example, every increase in the third ledge portion height 2146 may correspond to a decrease in the third ledge portion width 2166 that may be based on a certain factor, similar rate of change, certain non-similar rate of change, or a certain mathematical relationship. In another example, the increase in the third ledge portion height 2146 and the decrease in the third ledge portion width 2166 may not have any correlation. The apparatus, methods, and articles of manufacture described herein are not limited in this regard.

In the example of FIGS. 20-38, the first side wall portion 2137 and the second side wall portion 2139 may increase in width from the center ledge portion 2138 to the first ledge portion 2132 and from the center ledge portion 2138 to the third ledge portion 2136, respectively. The downwardly inclined configuration and the increasing widths toward the center portion 2073 of the first ledge portion 2132 and the third ledge portion 2136, and the downwardly increasing widths of the first side wall portion 2137 and the second side wall portion 2139 may allow more mass to be placed at the toe portion 2040 and/or the heel portion 2050 below the first ledge portion 2132 and the third ledge portion 2136, respectively, for optimizing the moment of inertia (MOI) of the golf club head 2000, and more mass may be placed at or below the center portion 2073 of the back wall portion to lower and move farther aft the center of gravity (CG) of the golf club head 2000. In other words, the configuration of the ledge portion 2130 may provide for a relatively large portion of the mass of the golf club head 2000 to be selectively placed (i) below the ledge portion 2130 and closer to the toe portion edge 2042, (ii) below the ledge portion 2130 and closer to the heel portion edge 2052, (iii) at or proximate to the center portion 2073, and/or, (iv) at or proximate to the sole portion edge 2092 to increase the MOI of the golf club head 2000 and move the CG of the golf club head lower and farther aft. The apparatus, methods, and articles of manufacture described herein are not limited in this regard.

The body portion 2010 may include one or more ports, which may be exterior ports and/or interior ports (e.g., located inside the body portion 2010). The one or more ports may be at any location on the body portion 2010. The inner walls of the body portion 2010 that define the interior cavity 2110 may include one or more ports. In the illustrated example of FIGS. 20-38, the body portion may include a first port region 2225 located below the first ledge portion 2132 and between the toe portion edge 2042 and the center portion 2073. In one example, as illustrated in FIGS. 20-38, the first port region 2225 may include a first perimeter groove 2227, which may visually define a portion or all of the first port region 2225. The first perimeter groove 2227 may be a slot, channel, depression, or a recess. The mass that may be removed from the body portion 2010 to define the first perimeter groove 2227 may be placed at other locations on or inside the body portion 2010 to provide certain MOI, CG location, and/or golf club performance characteristics without changing or substantially changing the overall mass of the body portion 2010. In another example, the portion of the body portion 2010 within the first perimeter groove 2227 may have a different color, texture, or other visual distinguishing features relative to outside the first perimeter groove 2227 to visually define the first port region 2225. The apparatus, methods, and articles of manufacture described herein are not limited in this regard.

In the illustrated example of FIGS. 20-38, the body portion may include a second port region 2235 located below the center ledge portion 2138 of the second ledge portion 2134, and a third port region 2245 located below the third ledge portion 2136 and between the heel portion edge 2052 and the center portion 2073. The second port region 2235 may be between the first port region 2225 and the third port region 2245. In one example, as illustrated in FIGS. 20-38, the third port region 2245 may include a second perimeter groove 2247, which may visually define a portion or all of the third port region 2245. The second perimeter groove 2247 may be a slot, channel, depression, or a recess. The mass that may be removed from the body portion 2010 to define the second perimeter groove 2247 may be placed at other locations on or inside the body portion 2010 to provide certain MOI, CG location, and golf club performance characteristics without changing or substantially changing the overall mass of the body portion 2010. In another example, the portion of the body portion 2010 within the second perimeter groove 2247 may have a different color, texture, or other visual distinguishing features relative to outside the second perimeter groove 2247 to visually define the third port region 2245. The apparatus, methods, and articles of manufacture described herein are not limited in this regard.

The first port region 2225 may include any number of ports, and any one or more of the ports of the first port region 2225 may be connected to the interior cavity 2110. In one example, as illustrated in FIGS. 20-38, the first port region 2225 may include a first set of ports 2220 (e.g., illustrated as ports 2221, 2222, and 2223). The ports 2221, 2222, and 2223 may be arranged in the first port region 2225 in any manner. In one example, the ports 2221, 2222, and 2223 may be arranged so as to be aligned with the contour of the sole portion edge 2092 similar to the ports of the golf club head 200. In another example, as illustrated in FIGS. 20-38, the ports 2221, 2222, and 2223 may be arranged so as to be aligned with the general direction of the first ledge portion 2132. The spacing between the ports of the first set of ports 2220 may have any configuration. In the illustrated example of FIGS. 20-38, each port of the first set of ports 2220 may be spaced apart from an adjacent port of the first set of ports 2220 by a distance of less than or equal to the port diameter of any of the ports of the first set of ports 2220. The distance from any of the ports of the first set of ports 2220 to the toe portion edge 2042 may be less than the distance from any of the ports of the first set of ports 2220 to the heel portion edge 2052 or to the hosel portion 2055. The first port region 2225 may be a thicker portion and/or a structurally enhanced portion of the back wall portion 2072 to accommodate the structures and/or functions of the ports of the first set of ports 2220. The apparatus, methods, and articles of manufacture described herein are not limited in this regard.

Figures 28, 29, 30:
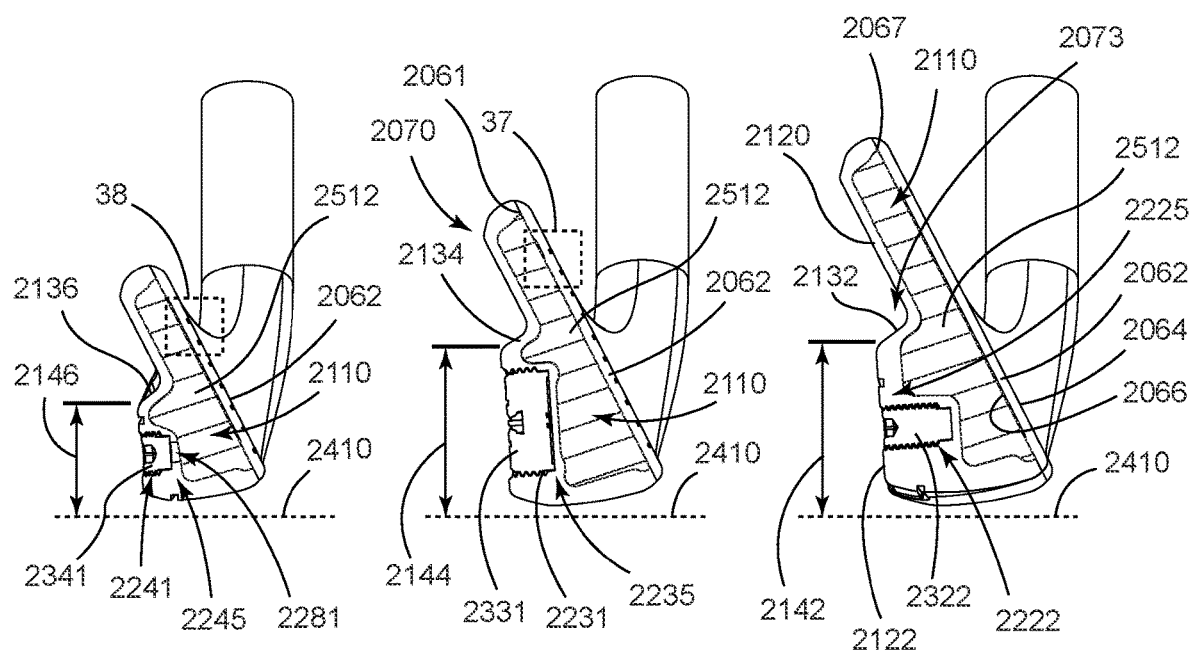
Figure 31:
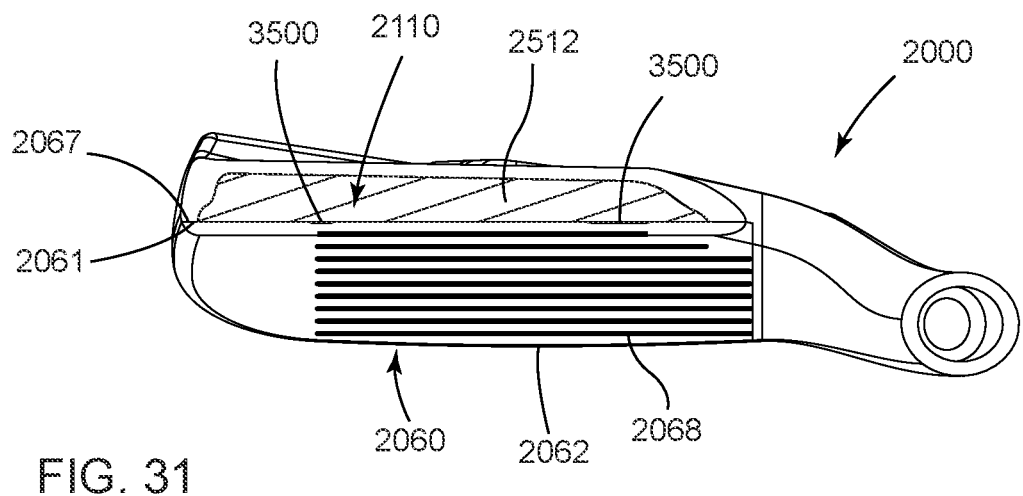
Figure 32:
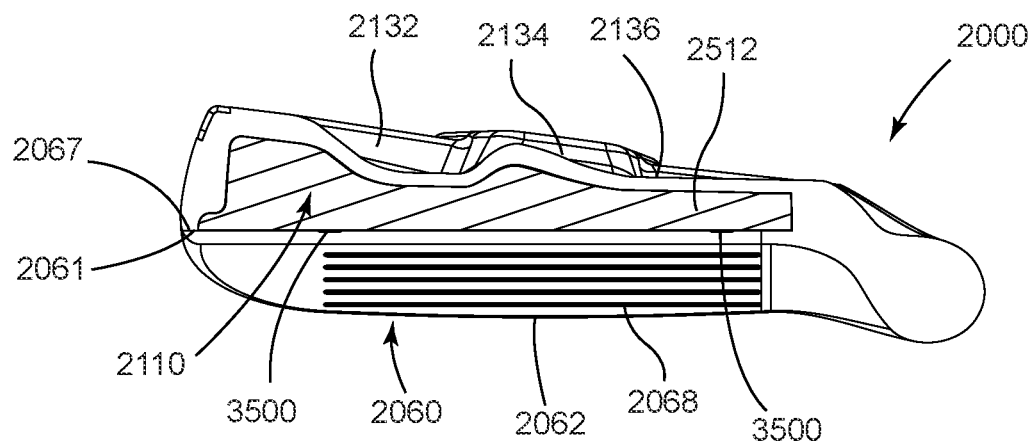

The second port region 2235 may include any number of ports, and any one or more of the ports may be connected to the interior cavity 2110. In one example, as illustrated in FIGS. 20-38, the second port region 2235 may include a second set of ports 2230 (e.g., illustrated as port 2231). The second port region 2235 may be at or proximate to the center portion 2073. The second port region 2235 may be a thicker portion and/or a structurally enhanced portion of the back wall portion 2072 to accommodate the ports of the second set of ports 2230. In one example, as illustrated in FIG. 29, the second port region 2235 may include structurally enhanced portions of the back wall portion 2072 to accommodate the structure and/or function of the port 2231. The apparatus, methods, and articles of manufacture described herein are not limited in this regard.

The third port region 2245 may include any number of ports, and any one or more of the ports of the third port region 2245 may be connected to the interior cavity 2110. In one example, as illustrated in FIGS. 20-38, the third port region 2245 may include a third set of ports 2240 (e.g., illustrated as ports 2241 and 2242). The ports 2241 and 2242 may be arranged in the third port region 2245 in any manner. In one example, the ports 2241 and 2242 may be arranged so as to be aligned with the contour of the sole portion edge 2092 similar to the ports of the golf club head 200. In another example, as illustrated in FIGS. 20-38, the ports 2241 and 2242 may be arranged so as to be aligned with the general direction of the third ledge portion 2136. The spacing between the ports of the third set of ports 2240 may have any configuration. In the illustrated example of FIGS. 20-38, each port of the third set of ports 2240 may be spaced apart from an adjacent port of the third set of ports 2240 by a distance of less than or equal to the port diameter of any of the ports of the third set of ports 2240. The distance from any of the ports of the third set of ports 2240 to the toe portion edge 2042 may be greater than the distance from any of the ports of the third set of ports 2240 to the heel portion edge 2052 or to the hosel portion 2055. The third port region 2245 may be a thicker portion and/or a structurally enhanced portion of the back wall portion 2072 to accommodate the structures and/or functions of the ports of the third set of ports 2240. The apparatus, methods, and articles of manufacture described herein are not limited in this regard.

The first set of ports 2220, the second set of ports 2230, and/or the third set of ports 2240 may include any number of ports. The locations, spacing relative to other ports, and any other configuration of each port of the first set of ports 2220, the second set of ports 2230, and/or the third set of ports 2240 may be similar in many respects to any of the ports described herein or described in any of the incorporated by reference applications. Further, any one or more of the ports of the first set of ports 2220, the second set of ports 2230, and/or the third set of ports 2240 may be connected to interior cavity 2110 through which one or more filler materials may be injected into the interior cavity 2110. In the illustrated example of FIGS. 20-38, the port 2221 and the port 2241 may be connected to the interior cavity 2110 via opening 2261 and opening 2281, respectively. The apparatus, methods, and articles of manufacture described herein are not limited in this regard.

In one example, as illustrated in FIGS. 20-38, the second set of ports 2230 may include a single port 2231 that may be larger in diameter than any of the ports of the first set of ports 2220 and/or the third set of ports 2240. The port 2231 may be located at or proximate to the center portion 2073 of the back wall portion 2072 and at or proximate to the sole portion edge 2092. In one example, the diameter of the port 2231 may be greater than or equal to 1.1 times the diameter and less than or equal to 8.0 times the diameter of any of the ports of the first set of ports 2220 and any of the ports of the third set of ports 2240. In another example, the diameter of the port 2231 may be greater than or equal to twice the diameter of any of the ports of the first set of ports 2220 and the third set of ports 2240. In another example, the diameter of the port 2231 may be greater than or equal to 2.5 times the diameter of any of the ports of the first set of ports 2220 and the third set of ports 2240. In another example, the diameter of the port 2231 may be greater than or equal to 3.5 times the diameter of any of the ports of the first set of ports 2220 and the third set of ports 2240. In yet another example, the diameter of the port 2231 may be greater than or equal to the diameter any of the ports of the first set of ports 2220 and any of the ports of the third set of ports 2240. In the example of FIGS. 20-38, the ports of the first set of ports 2220, the second set of ports 2230 and the third set of ports 2240 are illustrated to be cylindrical. In other examples (not illustrated), the ports may have any shape. Accordingly, the relative sizes of the ports may be expressed by any dimension such as length, width, radius, diameter, distance between two boundaries, or any dimension corresponding to a particular geometric shape (e.g., major and minor axes for an elliptical shaped port). The apparatus, methods, and articles of manufacture described herein are not limited in this regard.

The body portion 2010 may include any number of ports above and/or below the first ledge portion 2132, the second ledge portion 2134, and/or the third ledge portion 2136. The body portion 2010 may include any number of ports above and/or below the horizontal midplane 2420. The body portion 2010 may include any number of ports on the toe portion edge 2042, the heel portion edge 2052, the top portion edge 2082, and/or the sole portion edge 2092. The number of ports on the body portion 2010, the arrangement and/or the configuration of the ports on the body portion 2010 may be similar in many respects to the golf club head 200 or any of the golf club heads described in any of the incorporated by reference applications. The apparatus, methods, and articles of manufacture described herein are not limited in this regard.

Figure 33:
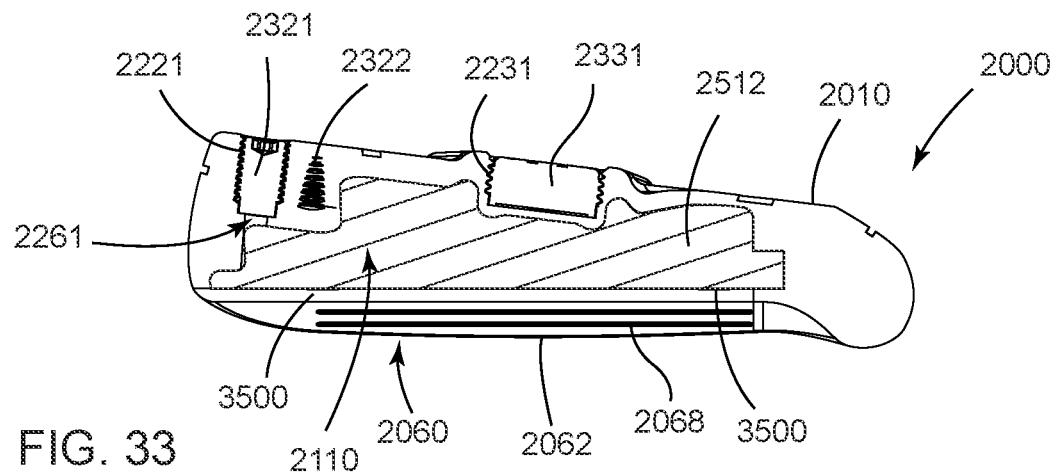
Figure 34:
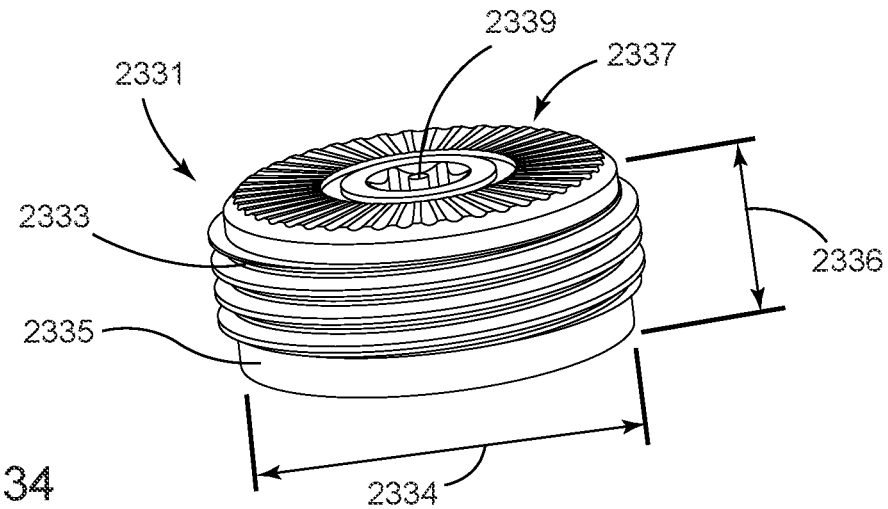
FIG. 34 is a mass portion for the golf club head of FIG. 20 according to an embodiment of the apparatus, methods, and articles of manufacture described herein.

The body portion 2010 may include one or more mass portions (e.g., weight portion(s)) at any location on the body portion 2010. The one or more mass portions may be integral mass portion(s) or separate mass portion(s) that may be coupled to the body portion 2010 at any exterior or interior location on the body portion 2010. In the illustrated example of FIGS. 20-38, the body portion 2010 may include a first set of mass portions 2320 (e.g., illustrated as mass portions 2321, 2322, and 2323), a second set of mass portions 2330 (e.g., illustrated as mass portion 2331), and a third set of mass portions 2340 (e.g., illustrated as mass portions 2341 and 2342). In the example of FIGS. 20-38, the mass portions of the first set of mass portions 2320 and the third set of mass portions 2320 may be similar to any of the mass portions described herein, such as the mass portions 1800 and 1900 of FIGS. 17-19, or the mass portions described in any of the incorporated by reference applications. The second set of mass portions 2330 may include a single mass portion 2331, which may have a greater mass than any of the mass portions of the first set of mass portions 2320 and the third set of mass portions 2340. In one example, as illustrated in FIG. 33, the mass portion 2331 may be cylindrical with a head portion 2333, a shaft portion 2335 and a top portion 2337 including a tool engagement portion 2339. The diameter 2334 of the mass portion 2331 may be greater than the length 2336 of the mass portion 2331. Accordingly, the mass portion 2331 may be disc shaped as illustrated in FIG. 34 with the diameter 2334 being greater as described herein than the diameters of the mass portions of the first set of mass portions 2320 and the third set of mass portions 2340 as illustrated for example by mass portions 1800 and 1900 of FIGS. 17-19. The port 2231 may be configured to receive the mass portion 2331, which may be inserted and secured into the port 2231 by any of the methods described herein such as being screwed in, press fitted, secured with an adhesive, or welded. In one example, as illustrated in FIG. 33, the head portion 2333 may be threaded to engage internal threads in the port 2231 to secure the mass portion 2331 in the port 2231. The apparatus, methods, and articles of manufacture described herein are not limited in this regard.

Each port of the first set of ports 2220 and the third set of ports 2240 may be configured to receive any of the mass portions of the first set of mass portions 2320 and/or the third set of mass portions 2340 similar to the coupling and/or engagement of any of the mass portions and ports described herein (e.g., mass portions 1800 and 1900 of FIGS. 17-19) or described in any of the incorporated by reference applications. As illustrated in the example of FIGS. 18 and 19, the mass portions of the first set of mass portions 2320 and/or the third set of mass portions 2340 may have different lengths or other physical properties (e.g., one or more materials of construction) as described herein. Accordingly, each port of the first set of ports 2220 and/or the third set of ports 2240 may receive a mass portion of the first set of mass portions 2320 or the third set of mass portions 2340 that may correspond or substantially correspond in length to the depth of the port. For example, as illustrated in FIGS. 28 and 30, the depth of the port 2222 may be greater than the depth of the port 2241. Accordingly, the mass portion 2322 that is secured in the port 2222 may have a greater length (an example illustrated in FIG. 19) than the mass portion 2341 (an example illustrated in FIG. 18) that is secured in the port 2241. Thus, as illustrated in FIGS. 20-38, the inner diameter and/or the depth of each port of the first set of ports 2220, the second set of ports 2230, and the third set of ports 2240 and/or the diameter and/or length of each mass portion of the first set of mass portions 2320, the second set of mass portions 2330, and the third set of mass portions 2340 may determine the selection of a corresponding mass portion for a flush configuration of the mass portion relative to the outer surface of the back wall portion 2072. Further, as described herein and in any of the incorporated by reference applications, the material of construction of each mass portion, which affects the density of each mass portion, may determine the selection of a mass portion. In other words, each port may receive a correspondingly sized mass portion having a certain total mass as described herein. In another example, the inner diameter and/or the depth of each port of the first set of ports 2220, the second set of ports 2230, and the third set of ports 2240 and/or the diameter and/or length of each mass portion of the first set of mass portions 2320, the second set of mass portions 2330, and the third set of mass portions 2340 may determine the selection of a corresponding mass portion for a recessed configuration of the mass portion relative to the outer surface of the back wall portion 2072. In yet another example, the inner diameter and/or the depth of each port of the first set of ports 2220, the second set of ports 2230, and the third set of ports 2240 and/or the diameter and/or length of each mass portion of the first set of mass portions 2320, the second set of mass portions 2330, and the third set of mass portions 2340 may determine the selection of a corresponding mass for a protruding configuration of the mass portion relative to the outer surface of the back wall portion 2072. Certain golf club head performance criteria, which may be affected by the MOI and CG location of the golf club head may also dictate the section of a mass portion for a port. In one example, mass portions having greater masses may be placed in the ports that are closer to the toe portion than to the heel portion to increase the moment of inertia (MOI) of the golf club head. In another example, the ports that are closest to the center portion 2073 may receive relatively heavier mass portions to lower the center of gravity of the golf club head. Each mass of the first set of mass portions 2320, the second set of mass portions 2330, and/or the third set of mass portions 2340 may be interchangeable with a relatively heavier or lighter mass to provide certain performance characteristics for the golf club head 2000. Thus, the configuration of each port, the configuration of each mass portion, and/or certain golf club head performance criteria may determine selection and/or placement of a mass portion in a port. The apparatus, methods, and articles of manufacture described herein are not limited in this regard.

The total mass of the mass portion 2331 may be greater than the total mass of any mass portion of the first set of mass portions 2320 and/or the third set of mass portions 2340. The total mass of the mass portion 2331 may be greater than or equal to the total mass of the first set of mass portions 2320 and/or the third set of mass portions 2340. The total mass of the mass portion 2331 may be determined to provide certain performance characteristics for the golf club head 2000. In one example, the mass portion 2331 may have a total mass that is greater than or equal to 2 grams and less than or equal to 30 grams. In another example, the mass portion 2331 may have a total mass that is greater than or equal to 4 grams and less than or equal to 18 grams. In another example, the mass portion 2331 may have a total mass that is greater than or equal to 6 grams and less than or equal to 12 grams. In another example, the mass portion 2331 may have a total mass that is greater than or equal to 7 grams and less than or equal to 9 grams. The apparatus, methods, and articles of manufacture described herein are not limited in this regard.

The diameter of the mass portion 2331 may be determined based on one or more properties (e.g., material density) of the materials of construction of the mass portion 2331. In one example, the mass portion 2331 may have a diameter that is greater than or equal to 0.2 inch (5.08 mm) and less than or equal to 1.0 inch (25.4 mm). In another example, the mass portion 2331 may have a diameter that is greater than or equal to 0.3 inch (7.62 mm) and less than 1.5 inch (38.1 mm). In another example, the mass portion 2331 may have a diameter that is greater than or equal to 0.4 inch (10.16 mm) and less than or equal to 0.8 inch (20.32 mm). In another example, the mass portion 2331 may have a diameter that is greater than or equal to 0.5 inch (12.7 mm) and less than or equal to 0.7 inch (17.78 mm). The apparatus, methods, and articles of manufacture described herein are not limited in this regard.

A center region or a geometric center of the port 2231 of the second set of ports 2230 may be located at or proximate to the CG of the golf club head 2000. Accordingly, a center of gravity of the mass portion 2331 may also be located at or proximate to the CG of the golf club head 2000 when the mass portion 2331 is secured in the port 2231 as described herein. As a result, the mass portion 2331 may be interchangeable with another mass portion 2331 having lower mass or a mass portion 2331 having a higher mass without causing a relatively large or a significant shift in the CG of the golf club head 2000. In one example, for each gram mass increase of the mass portion 2331, the CG location of the golf club head may shift by less than 0.5% of the $CG_X$ location (x-axis coordinate of the CG), less than 0.5% of the $CG_Y$ location (y-axis coordinate of the CG), and/or less than 0.2% of the $CG_Z$ location (z-axis coordinate of the CG). In another example, for each gram mass increase of the mass portion 2331, the CG location of the golf club head may shift by less than 0.35% of the $CG_X$ location, less than 0.35% of the $CG_Y$ location, and/or less than 0.15% of the $CG_Z$ location. In yet another example, for each gram mass increase of the mass portion 2331, the CG location of the golf club head may shift by less than 0.25% of the $CG_X$ location, less than 0.25% of the $CG_Y$ location, and/or less than 0.10% of the $CG_Z$ location. Thus, the mass portion 2331 may be interchangeable with another mass portion 2331 having a lower or a greater mass to provide certain performance characteristics for an individual (i.e., customize the performance of the golf club head 2000 for a certain individual) without substantially shifting the CG of the golf club head 2000 and/or altering the overall or general performance characteristics of the golf club head 2000. The apparatus, methods, and articles of manufacture described herein are not limited in this regard.

In one example, each mass portion of the first set of mass portions 2320 and/or the third set of mass portions 2340 may have a mass of greater than or equal to 0.25 grams and less than or equal to 6.0 grams. In another example, each mass portion of the first set of mass portions 2320 and/or the third set of mass portions 2340 may have a mass of greater than or equal to 1.25 grams and less than or equal to 5.25 grams. In another example, each mass portion of the first set of mass portions 2320 and/or the third set of mass portions 2340 may have a mass of greater than or equal to 1.75 grams and less than or equal to 4.1 grams. In another example, each mass portion of the first set of mass portions 2320 and/or the third set of mass portions 2340 may have a mass of greater than or equal to 0.75 grams and less than or equal to 3.5 grams. In yet another example, each mass portion of the first set of mass portions 2320 and/or the third set of mass portions 2340 may have a mass of greater than or equal to 0.5 grams and less than or equal to 4.0 grams. The apparatus, methods, and articles of manufacture described herein are not limited in this regard.

The interior cavity 2110 may be partially or entirely filled with one or more filler materials (i.e., a cavity filling material), which may include one or more similar or different types of materials. In one example, as illustrated in FIGS. 20-38, the interior cavity 2110 may be filled with a filler material 2512 that may be similar to any of the filler materials described herein or in any of the incorporated by reference applications. In another example (not illustrated for FIGS. 20-38), the interior cavity 2110 may be filled with a first filler material and a second filler material that may be similar to the golf club head 200 or similar to any of the golf club heads described in any of the incorporated by reference applications. In one example, as illustrated in FIGS. 20-38, the filler material 2512 may be injected into the interior cavity 2110 from any of the ports 2221 and 2241, while the other one of the ports 2221 and 2241 may functions as an air exhaust port through which the air in the interior cavity 2110 that is displaced by the filler material 2512 may exit.

Accordingly, as illustrated in FIGS. 20-38, the filler material 2512 may be molded in the shape of the interior cavity 2110. The apparatus, methods, and articles of manufacture described herein are not limited in this regard.

In one example, one or more materials of the filler material, the physical properties of the one or more materials (i.e., density and/or elasticity), the amount (i.e., volume and/or mass) of the filler material 2512 may be determined for each golf club head (i.e., having a certain loft angle) to (i) provide vibration dampening or sound dampening (e.g., consistent and/or pleasing sound and feel when the golf club head 2000 strikes a golf ball as perceived by an individual using the golf club head 2000), (ii) provide structural support for the face portion 2062, and/or (iii) optimize ball travel distance, ball speed, ball launch angle, ball spin rate, ball peak height, ball landing angle and/or ball dispersion. In one example, the filler material 2512 may be formed from any type of polymer materials such as any of the polymer materials described herein or described in any of the incorporated by reference applications. In one example, the filler material 2512 may be formed from a rubber or a rubber-based compound such as any of the rubber-based compounds described herein. In another example, the filler material 2512 may be formed from a thermoset material, such as an epoxy-based material. In another example, the filler material 2512 may be formed from a thermoplastic material. In yet another example, the filler material may be formed from a metal or metal alloy (e.g., aluminum or aluminum alloy) that may have a different density than the density of the material of the body portion 2010. The filler material 2512 may be attached to the inner walls of the body portion 2010 and the face portion 2062 with any bonding agent or any adhesive that may be appropriate for bonding or attaching the filler material 2512 to the material of the body portion 2010 and/or the face portion 2062. In another example (not illustrated), the filler material 2512 may be a polymer material that may include self adhesive properties so as to adhere to the body portion 2010 and/or the face portion 2062 without using a bonding agent or an adhesive. In another example, the injection molding and/or curing the filler material 2512 may provide sufficient holding forces (e.g., the filler material 2512 expanding during the filling or curing process) to maintain the filler material 2512 engaged with the body portion 2010 and/or the face portion 2062 without the use of bonding agents or adhesives. In yet another example, the filler material 2512 may be preformed and placed inside the interior cavity 2110 and/or attached to the interior walls of the body portion 2010 that define the interior cavity 2110 prior to enclosing the interior cavity 2110. The injection molding, curing, and/or attachment of the filler material 2512 in the interior cavity 2110 may be similar to the processes described herein or in any of the incorporated by reference application. The apparatus, methods, and articles of manufacture described herein are not limited in this regard.

Figure 35:
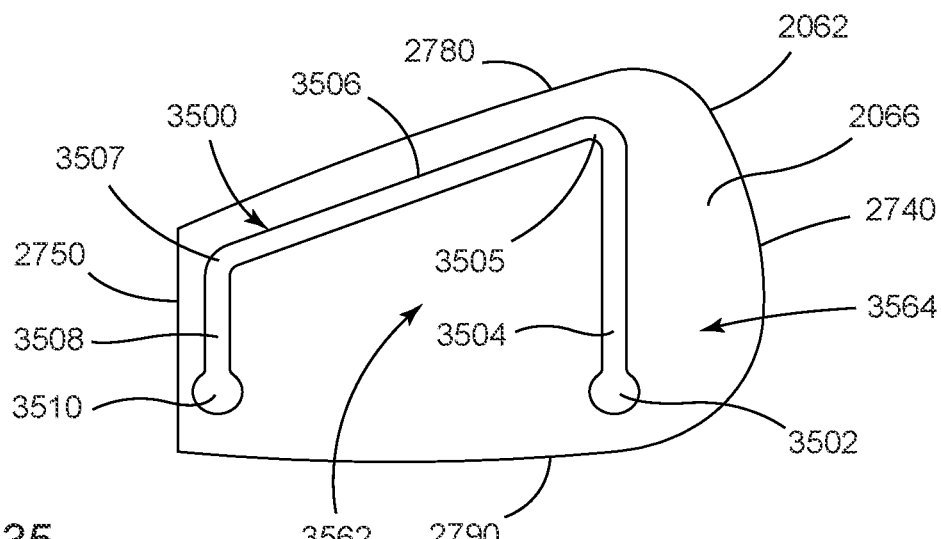
FIG. 35 is a face portion of the golf club head of FIG. 20 according to an embodiment of the apparatus, methods, and articles of manufacture described herein.

In the illustrated example of FIG. 35, the face portion 2062 may include a face perimeter that may include four perimeter sides, which may be a first perimeter side defined by a face portion toe portion edge (referred to herein as the face toe edge 2740), a second perimeter side defined by a face portion heel portion edge (referred to herein as the face heel edge 2750), a third perimeter side defined by a face portion top portion edge (referred to herein as face top edge 2780), and fourth perimeter side defined by a face portion sole portion edge (referred to herein as face sole edge 2790). The back surface 2066 of the face portion 2062 may include one or more grooves, slots, channels, depressions, or recesses, any of which may be referred to herein as back grooves and may define any structure on the back surface 2066 that may provide a relatively decreased face thickness. In the illustrated example of FIG. 35, the back surface 2066 may include a back groove 3500 having a first end portion 3502, a first portion 3504, a first transition portion 3505, a second portion 3506, a second transition portion 3507, a third portion 3508, and a second end portion 3510. In one example, as illustrated in FIG. 35, the first end portion 3502 may be proximate to the face toe edge 2740 and proximate to the face sole edge 2790. The first end portion 3502 may be circular as illustrated in FIG. 35 to eliminate or reduce stress concentration regions on the face portion 2062 at or proximate to the first end portion 3502. The first portion 3504 may extend from the first end portion 3502 toward the face top edge 2780. In the illustrated example of FIG. 35, the first portion 3504 may be linear and extend vertically from the first end portion 3502 toward the face top edge 2780. In another example, the first portion 3504 may extend from the first end portion 3502 toward the face top edge 2780 with a curvature that may be similar or substantially similar to the curvature or contour of the face toe edge 2740. In yet another example, the first portion 3504 may be inwardly curved. The first portion 3504 may then transition to the second portion 3506 via the first transition portion 3505 located proximate to the face toe edge 2740 and proximate to the face top edge 2780. The first transition portion 3505 may be curved to eliminate or reduce stress concentration regions on the face portion 2062 at or proximate to the first transition portion 3505. The second portion 3506 may extend from the first transition portion 3505 toward the face heel edge 2750. The second portion 3506 may be linear and have the same orientation and contour as the face top edge 2780. The second portion 3506 may then transition to the third portion 3508 via the second transition portion 3507 located proximate to the face heel edge 2750 and proximate to the face top edge 2780. The second transition portion 3507 may be curved to prevent or reduce stress concentration regions on the face portion 2062 at or proximate to the second transition portion 3507. The third portion 3508 may extend from the second transition portion 3507 toward the second end portion 3510 to the second end portion 3510. The second portion 3506 may be linear and have the same orientation and contour as the face heel edge 2750. The second end portion 3510 may be located proximate to the face heel edge 2750 and proximate to the face sole edge 2790. The second end portion 3510 may be circular as illustrated in FIG. 35 to eliminate or reduce stress concentration regions on the face portion 2062 at or proximate to the second end portion 3510. The apparatus, methods, and articles of manufacture described herein are not limited in this regard.

As illustrated in FIG. 35, the back groove 3500 may define an inner area 3562 and an outer area 3564 of the face portion 2062. The inner area 3562 may correspond to or include a portion of the face portion 2062 that may generally strike a golf ball. As discussed herein, the back groove 3500 may provide a relatively thinner part of the face portion 2062 as compared to the remaining parts of the face portion 2062. Accordingly, the back groove 3500 may provide enhanced deflection of the inner area 3562 relative to the outer area 3564 as compared a face portion 2062 without the back groove 3500. In other words, the back groove 3500 may provide a trampoline effect for the inner area 3562 of the face portion 2062. The enhanced deflection of the inner area 3562 may provide enhanced rebounding of the inner area 3562 after the face portion 2062 strikes a golf ball, which may increase ball launch angle, decrease ball backspin and/or increase ball carry distance compared to a similar golf club head as the golf club head 2000 but without having the back groove 3500. The apparatus, methods, and articles of manufacture described herein are not limited in this regard.

Figure 37:
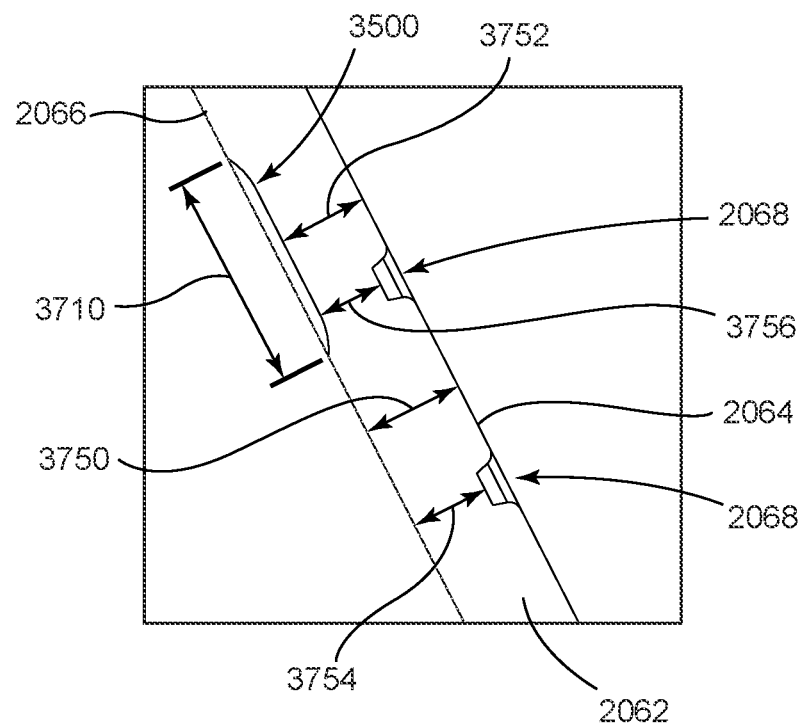
FIG. 37 is an enlarged view of area 37 of FIG. 28.
Figure 38:
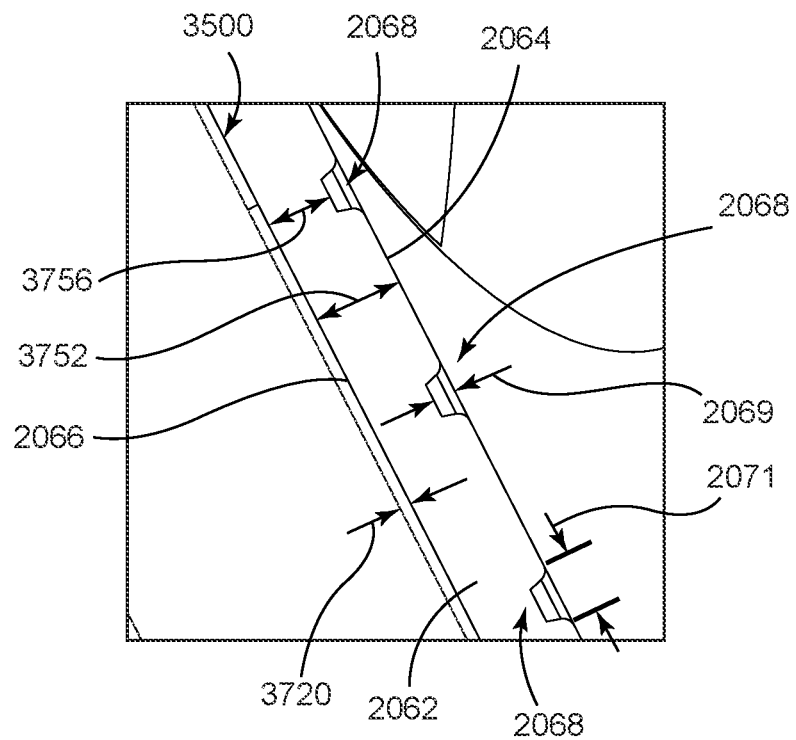
FIG. 38 is an enlarged view of area 38 of FIG. 29.

In one example, as illustrated in FIGS. 35, 37, and 38, any portion of the back groove 3500 may include a back groove width 3710 ($W_{BG}$). The back groove width 3710 ($W_{BG}$) may have any value to provide certain performance characteristics for the golf club head 2000. In one example, the back groove width 3710 may be greater than or equal to 0.050 inch (1.270 mm) and less than or equal to 0.200 inch (5.080 mm) (0.050 in≤$W_{BG}$≤0.200 in). In another example, the back groove width 3710 may be greater than or equal to 0.094 inch (2.381 mm) and less than or equal to 0.156 inch (3.969 mm) (0.094 in≤$W_{BG}$≤0.156 in). In another example, the back groove width 3710 may be greater than or equal to 0.109 inch (2.778 mm) and less than or equal to 0.141 inch (3.572 mm) (0.109 in≤$W_{BG}$≤0.141 in). In yet another example, the back groove width 3710 may be greater than or equal to 0.120 inch (3.048 mm) and less than or equal to 0.130 inch (3.302 mm) (0.120 in≤$W_{BG}$≤0.130 in). The back groove width 3710 may be constant or substantially constant (considering manufacturing tolerances) along any one or more portions of back groove 3500 or along the entire back groove 3500. The back groove width 3710 may vary at a certain portion or portions of the back groove 3500. Any portion of back groove 3500 and/or any portion of the back groove 3600 may have any cross-sectional shape. Accordingly, the back groove width 3710 at any one or more portions may vary according to corresponding variations in the cross-sectional shape of the back groove 3500. The apparatus, methods, and articles of manufacture described herein are not limited in this regard.

In one example, as illustrated in FIGS. 35, 37, and 38, any portion of the back groove 3500 may include a back groove depth 3720 ($D_{BG}$). The back groove depth 3720 ($D_{BG}$) may have any value to provide certain performance characteristics for the golf club head 2000. In one example, the back groove depth 3720 may be greater than or equal to 0.003 inch (0.076 mm) and less than or equal to 0.015 inch (0.381 mm) (0.003 in≤$D_{BG}$≤0.015 in). In another example, the back groove depth 3720 may be greater than or equal to 0.005 inch (0.133 mm) and less than or equal to 0.009 inch (0.222 mm) (0.005 in≤$D_{BG}$≤0.009 in). In another example, the back groove depth 3720 may be greater than or equal to 0.006 inch (0.156 mm) and less than or equal to 0.008 inch (0.200 mm) (0.006 in≤$D_{BG}$≤0.008 in). In yet another example, the back groove depth 3720 may be greater than or equal to 0.0065 inch (0.1651 mm) and less than or equal to 0.0075 inch (0.1905 mm) (0.0065 in≤$D_{BG}$≤0.0075 in). The back groove depth 3720 may be constant or substantially constant (considering manufacturing tolerances) along any one or more portions of back groove 3500 or along the entire back groove 3500. The back groove depth 3720 may vary at a certain portion or portions of the back groove 3500. Any portion of back groove 3500 and/or any portion of the back groove 3600 may have any cross-sectional shape. Accordingly, the back groove depth 3720 at any one or more portions may vary according to corresponding variations in the cross-sectional shape of the back groove 3500. The apparatus, methods, and articles of manufacture described herein are not limited in this regard.

In one example, as illustrated in FIGS. 37 and 38, the face portion 2062 may include a first face thickness 3750 ($T_1$), a second face thickness 3752 ($T_2$), a third face thickness 3754 ($T_3$), and a fourth face thickness 3756 ($T_4$). The first face thickness 3750 may be defined by a distance between the front surface 2064 and the back surface 2066 of the face portion 2062 at a location on the face portion 2062 that does not include any portion of a front groove 2068 and any portion of the back groove 3500. The second face thickness 3752 may be defined by a distance between the front surface 2064 of the face portion 2062 and a bottom surface of the back groove 3500 at a location on the face portion 2062 that includes a portion of the back groove 3500 but does not include any portion of a front groove 2068. Accordingly, the second face thickness 3752 may be determined by subtracting the back groove depth 3720 from the first face thickness 3750. The third face thickness 3754 may be defined by a distance between a bottom surface of a front groove 2068 and the back surface 2066 of the face portion 2062 at a location on the face portion 2062 that does not include any portion of the back groove 3500. Accordingly, the third thickness 3754 may be determined by subtracting a front groove depth 2069 from the first face thickness 3750. The fourth face thickness 3756 may be defined by a distance between a bottom surface of a front groove 2068 and a bottom surface of the back groove 3500 at a location on the face portion 2062 that includes a portion of a front groove 2068 and an opposing portion of a back groove 3500. Accordingly, the fourth face thickness 3756 may be determined by subtracting a sum of the back groove depth 3720 and a front groove depth 2069 from the first face thickness 3750. The first face thickness 3750 may be greater than the second face thickness 3752, the third face thickness 3754, and the fourth face thickness 3756 ($T_1>T_2$, $T_1>T_3$, $T_1>T_4$). The second face thickness 3752 may be greater than the fourth face thickness 3756 ($T_2>T_4$). The third face thickness 3754 may be greater than the fourth face thickness 3756 ($T_3>T_4$). In one example, as illustrated in FIGS. 37 and 38, the second face thickness 3752 may be greater than the third face thickness 3754 ($T_2>T_3$). In another example (not shown), the third face thickness 3754 may be greater than the second face thickness 3752 ($T_3>T_2$). The apparatus, methods, and articles of manufacture described herein are not limited in this regard.

The first face thickness 3750 may have any value to provide certain performance characteristics for the golf club head 2000. In one example, the first face thickness 3750 may be greater than or equal to 0.025 inch (0.635 mm) and less than or equal to 0.125 inch (3.175 mm) (0.025 in≤$T_1$≤0.125). In another example, the first face thickness 3750 may be greater than or equal to 0.047 inch (1.181 mm) and less than or equal to 0.078 inch (1.969 mm) (0.047 in≤$T_1$≤0.078). In another example, the first face thickness 3750 may be greater than or equal to 0.054 inch (1.378 mm) and less than or equal to 0.070 inch (1.772 mm) (0.054 in≤$T_1$≤0.070). In another example, the first face thickness 3750 may be greater than or equal to 0.060 inch (1.524 mm) and less than or equal to 0.065 inch (1.651 mm) (0.060 in≤$T_1$≤0.065). The apparatus, methods, and articles of manufacture described herein are not limited in this regard.

The second face thickness 3752 may have any value to provide certain performance characteristics for the golf club head 2000. The value of the second face thickness 3752 may be determined by subtracting the value of the back groove depth 3720 as described herein from the value of the first face thickness 3750. The value of the second face thickness 3752 may also be expressed as a percentage of the value of the first face thickness 3750. In one example, the second face thickness 3752 may be greater than or equal to 75% and less than or equal to 98% of the first face thickness 3750 (0.75≤$T_2/T_1$≤0.98). Accordingly, the back groove depth 3720 may be less than or equal to 25% and greater than or equal to 2% of first face thickness 3750 ($0.02 \leq D_{BG}/T_1 \leq 0.25$). In another example, the second face thickness 3752 may be greater than or equal to 70% and less than or equal to 85% of the first face thickness 3750 ($0.70 \leq T_2/T_1 \leq 0.85$). Accordingly, the back groove depth 3720 may be less than or equal to 30% and greater than or equal to 15% of first face thickness 3750 ($0.15 \leq D_{BG}/T_1 \leq 0.30$). In another example, the second face thickness 3752 may be greater than or equal to 85% and less than or equal to 95% of the first face thickness 3750 ($0.85 \leq T_2/T_1 \leq 0.95$). Accordingly, the back groove depth 3720 may be less than or equal to 15% and greater than or equal to 5% of first face thickness 3750 ($0.05 \leq D_{BG}/T_1 \leq 0.15$). In yet another example, the second face thickness 3752 may be greater than or equal to 80% and less than or equal to 90% of the first face thickness 3750 ($0.80 \leq T_2/T_1 \leq 0.90$). Accordingly, the back groove depth 3720 may be less than or equal to 20% and greater than or equal to 10% of first face thickness 3750 ($0.10 \leq D_{BG}/T_1 \leq 0.20$). The apparatus, methods, and articles of manufacture described herein are not limited in this regard.

The third face thickness 3754 may have any value to provide certain performance characteristics for the golf club head 2000. The value of the third face thickness 3754 may be determined by subtracting value of the front groove depth 2069 as described herein from the value of first face thickness 3750. The value of the third face thickness 3754 may also be expressed as a percentage of the value of the first face thickness 3750. In one example, the third face thickness 3754 may be greater than or equal to 60% and less than or equal to 97% of the first face thickness 3750 ($0.60 \leq T_3/T_1 \leq 0.97$). In another example, the third face thickness 3754 may be greater than or equal to 75% and less than or equal to 85% of the first face thickness 3750 ($0.75 \leq T_3/T_1 \leq 0.85$). In another example, the third face thickness 3754 may be greater than or equal to 80% and less than or equal to 95% of the first face thickness 3750 ($0.80 \leq T_3/T_1 \leq 0.95$). In yet another example, the third face thickness 3754 may be greater than or equal to 70% and less than or equal to 90% of the first face thickness 3750 ($0.70 \leq T_3/T_1 \leq 0.90$). The apparatus, methods, and articles of manufacture described herein are not limited in this regard.

The fourth face thickness 3756 may have any value to provide certain performance characteristics for the golf club head 2000. The value of the fourth face thickness 3756 may be determined by subtracting the value of the front groove depth 2069 as described herein and the value of the back groove depth 3720 as described herein from the value of the first face thickness 3750. The value of the fourth face thickness 3756 may also be expressed as a percentage of the value of the first face thickness 3750. In one example, the fourth face thickness 3756 may be greater than or equal to 45% and less than or equal to 85% of the first face thickness 3750 ($0.45 \leq T_4/T_1 \leq 0.85$). In another example, the fourth face thickness 3756 may be greater than or equal to 55% and less than or equal to 75% of the first face thickness 3750 ($0.55 \leq T_4/T_1 \leq 0.75$). In another example, the fourth face thickness 3756 may be greater than or equal to 60% and less than or equal to 70% of the first face thickness 3750 ($0.60 \leq T_4/T_1 \leq 0.70$). In yet another example, the fourth face thickness 3756 may be greater than or equal to 62% and less than or equal to 68% of the first face thickness 3750 ($0.62 \leq T_4/T_1 \leq 0.68$). The apparatus, methods, and articles of manufacture described herein are not limited in this regard.

In one example, as illustrated in FIGS. 37 and 38, the back groove width 3710 may be greater than the front groove width 2071, and the back groove depth 3720 may be less than the front groove depth 2069. In another example (not shown), the back groove width 3710 may be greater than the front groove width 2071, and the back groove depth 3720 may be greater than the front groove depth 2069. In another example (not shown), the back groove width 3710 may be less than the front groove width 2071, and the back groove depth 3720 may be greater than the front groove depth 2069. In yet another example (not shown), the back groove width 3710 may be less than the front groove width 2071, and the back groove depth 3720 may be less than the front groove depth 2069. The apparatus, methods, and articles of manufacture described herein are not limited in this regard.

In one example, the back groove width 3710 and the back groove depth 3720 may be similar. In another example, the back groove width 3710 may be less than the back groove depth 3720. In yet another example, the back groove width 3710 may be greater than the back groove depth 3720. In the illustrated example of FIGS. 37 and 38, the back groove width 3710 may be substantially greater than the back groove depth 3720. The back groove width 3710 and the back groove depth 3720 may be determined to provide sufficient deflection for the face portion 2062 without compromising the structural integrity of the face portion. In other words, the back groove width 3710 and the back groove depth 3720 may be determined so that the face portion 2062 may sufficiently deflect to provide the rebounding and the trampoline effect described herein when striking a golf ball without failure after one, a few, or repeated and long-term use of the golf club head 2000 for golf ball strikes. Additionally, values of the back groove width 3710 and the back groove depth 3720 may depend on the values of the first face thickness 3750, the front groove width 2071, and/or the front groove depth 2069. The apparatus, methods, and articles of manufacture described herein are not limited in this regard.

As described herein, the interior cavity 2110 may be filled with one or more filler materials, such as the filler material 2512. Accordingly, in one example, all or portions of the back groove 3500 may be filled with the filler material 2512. The filler material 2512 may structurally support the relatively thinner portions of the face portion 2062 at locations in and/or proximate to the back groove 3500. In another example, all or portions of the back groove 3500 may be filled with a filler material that may have different physical properties than any of the filler materials in the interior cavity 2110. In yet another example, a portion of the back groove 3500 may be filled with a first filler material, whereas another portion of the back groove 3500 may be filled with a second filler material having one or more different physical properties than the first filler material. The configuration (e.g., depth, width, location on the face portion, cross-sectional shape) of the back groove 3500 may determine the physical properties of the one or more filler materials and the amount of the one or more filler materials that may be used to fill the back groove 3500 and/or the interior cavity 2110. The apparatus, methods, and articles of manufacture described herein are not limited in this regard.

Figure 49:
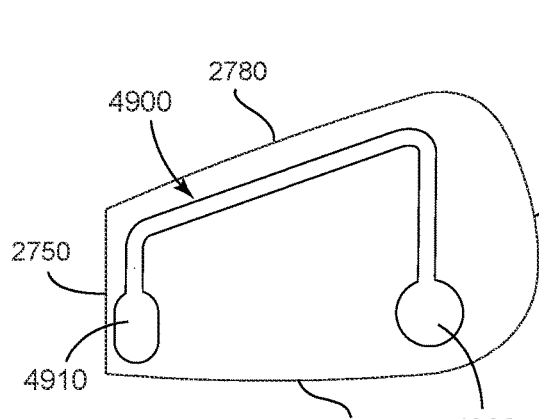
Figure 59:
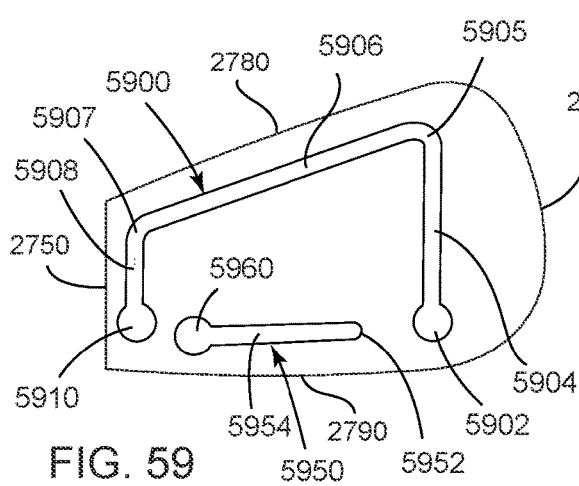
Figure 65:
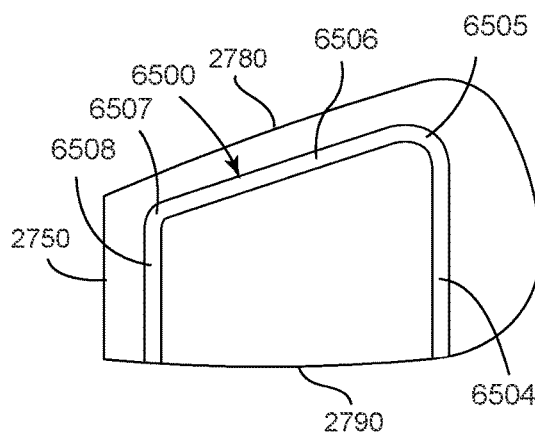
Figure 66:
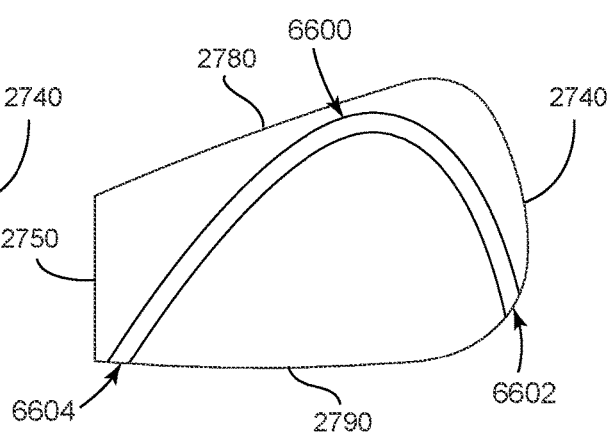
Figure 67:
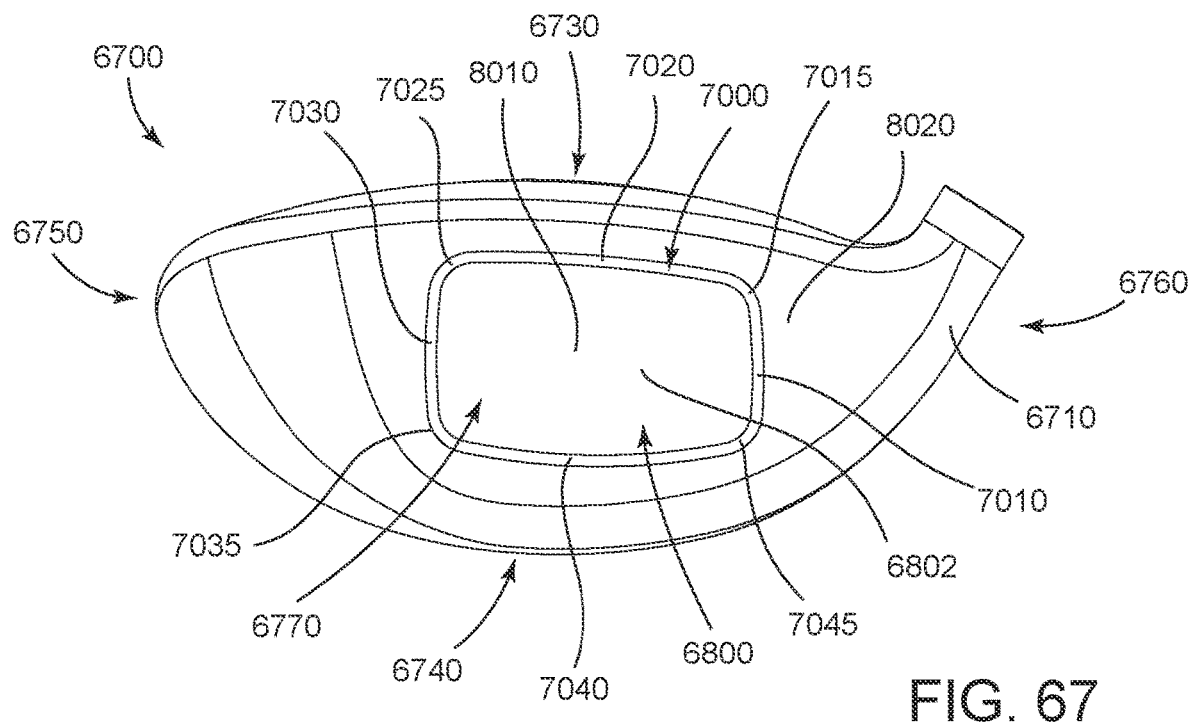
FIG. 67 depicts a front view of a golf club head according to another embodiment of the apparatus, methods, and articles of manufacture described herein.
Figure 68:
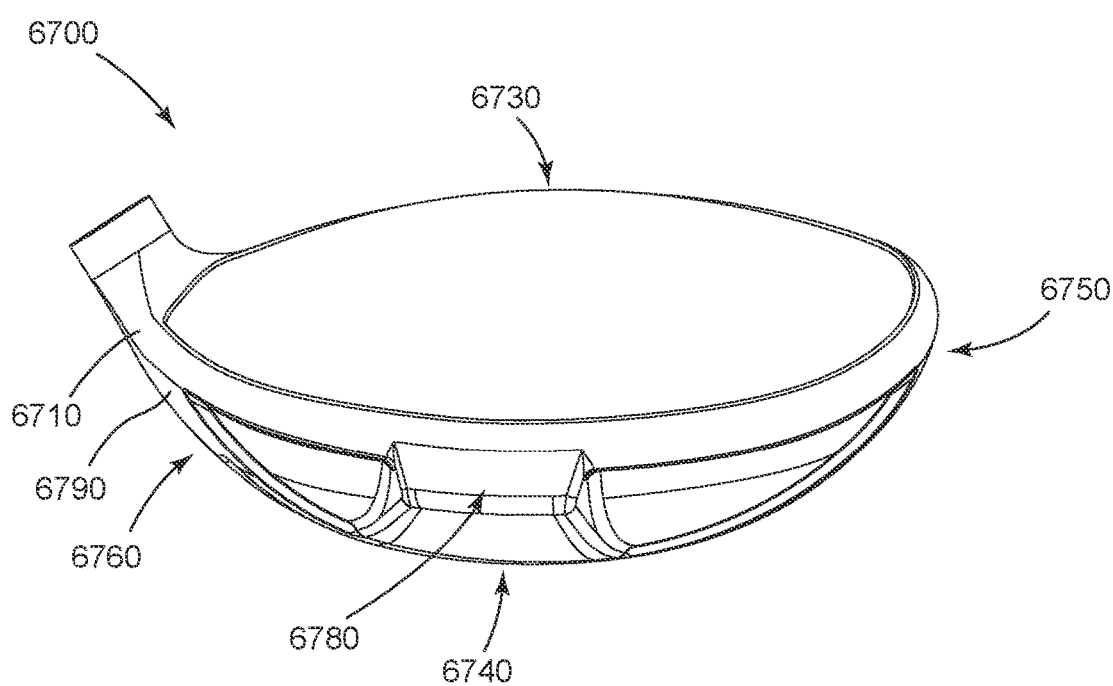
FIG. 68 depicts a rear view of the golf club head of FIG. 67.
Figure 69:
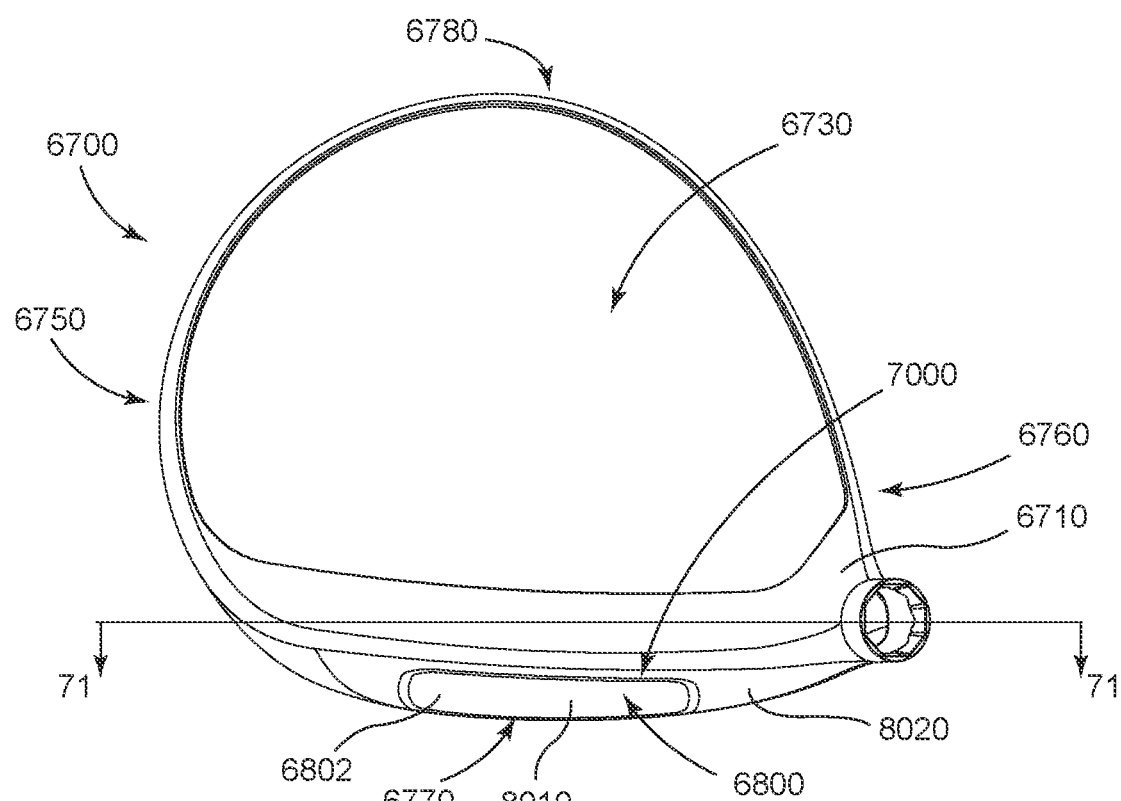
FIG. 69 depicts a top view of the golf club head of FIG. 67.
Figure 70:
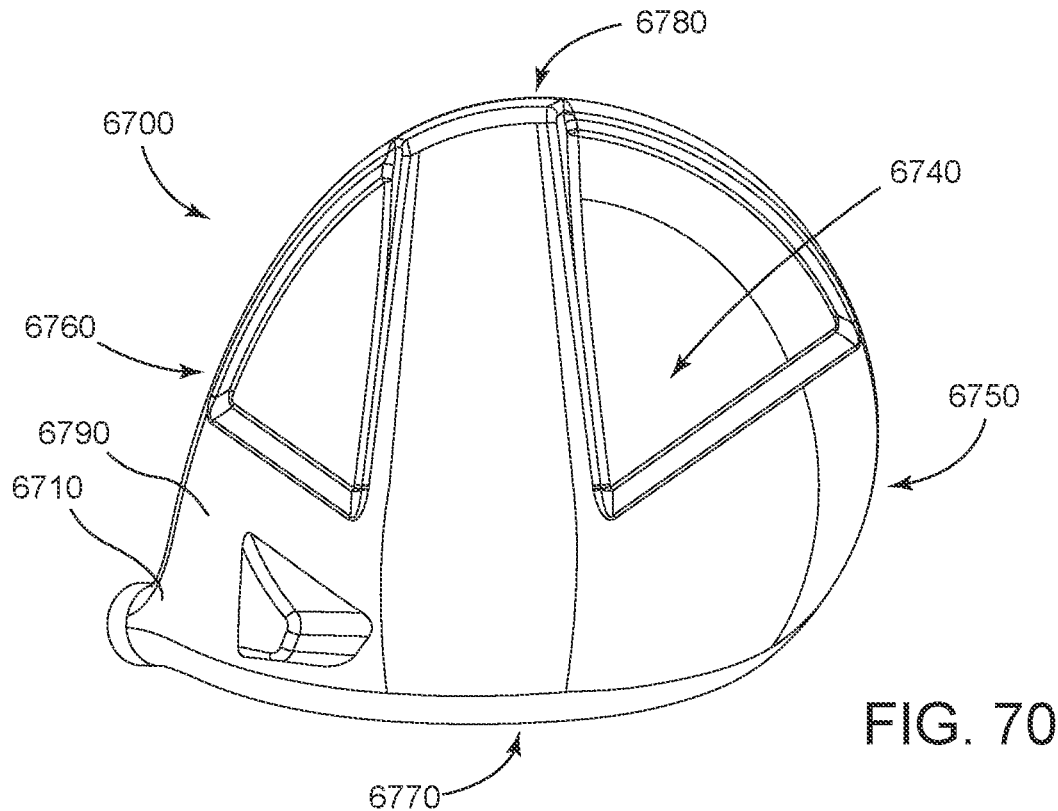
FIG. 70 depicts a bottom view of the golf club head of FIG. 67.

The first end portion 3502 and/or or the second end portion 3510 may have any shape and/or size without any sharp corners or vertices to eliminate or reduce stress concentration points or regions at or proximate to the back groove 3500. In one example, the first end portion 3502 and/or the second end portion 3510 may have an elliptical or a semi-elliptical shape. In another example, the first end portion 3502 and/or the second end portion 3510 may have a triangular shape with rounded vertices. In another example, as illustrated in FIG. 49, the first end portion 3502 and/or the second end portion 3510 may have an obround shape (i.e., a rectangle with semicircles at opposite sides). In another example, as illustrated in FIGS. 65 and 66, the back groove 3500 may extend to the face perimeter. In other words, any portion of a back groove 3500 may extend to the face perimeter and terminate at the face perimeter. In yet another example, as illustrated in FIG. 59, the back groove 3500 may terminate at a rounded or curved end portion 5952 having the same width as the back groove width 3710 without having an enlarged end portion. Any end portion of any of the back grooves described herein may have any shape and/or any shape without sharp corners or vertices so as to eliminate or reduce any stress concentration regions on the face portion 2062 at or proximate to the back groove. The apparatus, methods, and articles of manufacture described herein are not limited in this regard.

The cross-sectional shape of the back groove 3500 may be without any sharp corners to eliminate or reduce stress concentration points or regions at or proximate to the back groove 3500. In one example, as illustrated in FIG. 37, the cross-section of the back groove 3500 may have a wide and shallow U-shape. In another example, the cross-section of the back groove 3500 may have a deep and/or narrow U-shape. In another example, the cross-section of the back groove 3500 may have a rectangular shape with rounded corners or vertices. In yet another example, the cross-sectional shape of the back groove 3500 may be semi-circular or semi-elliptical. Accordingly, the back groove 3500 may be manufactured with any cross-sectional shape. The cross-sectional shape of the back groove 3500 may be manufactured without sharp corners or vertices so as to eliminate or reduce any stress concentration regions on the face portion 2062 at or proximate to the back groove 3500. The apparatus, methods, and articles of manufacture described herein are not limited in this regard.

Figure 36:
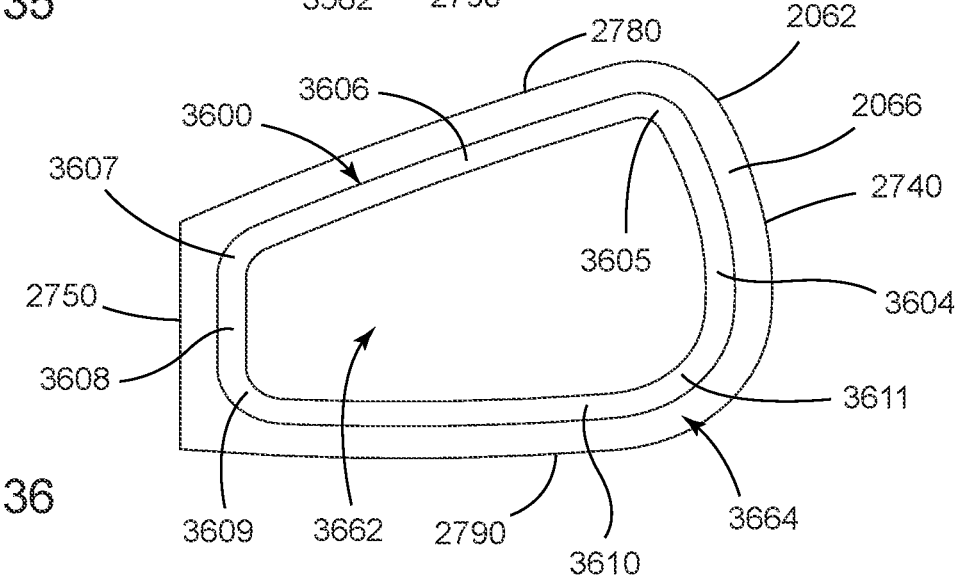
FIG. 36 is a face portion of the golf club head of FIG. 20 according to another embodiment of the apparatus, methods, and articles of manufacture described herein.

In another example, as illustrated in FIG. 36, the back surface 2066 of the face portion 2062 may include a back groove 3600, which may be similar in many respects to the back groove 269 of FIG. 13. The back groove 3600 may have similar back groove width, back groove depth, and/or cross-sectional shape as described and illustrated herein with respect to the back groove 3500. The back groove 3600 may include a first portion 3604, a first transition portion 3605, a second portion 3606, a second transition portion 3607, a third portion 3608, and a third transition portion 3609, a fourth portion 3610, and a fourth transition portion 3611, all of which may define a continuous back groove 3600 that extends proximate to a perimeter of the back surface 2066 of the face portion 2062 and generally follows the contour of the perimeter of the face portion 2062 without having any sharp corners to prevent stress concentration regions at or near any portion of the back groove 3600. As illustrated in FIG. 36, the back groove 3600 may define an inner area 3662 and an outer area 3664 of the face portion 2062. The inner area 3662 may correspond to or include a portion of the face portion 2062 that generally strikes a golf ball. Further, the back groove 3600 may provide a relatively thinner part of the face portion 2062 as compared to the remaining parts of the face portion 2062. Accordingly, the back groove 3600 may provide enhanced deflection of the inner area 3662 relative to the outer area 3664 as compared to face portion 2062 without the back groove 3600. In other words, the back groove 3600 may provide a trampoline effect for the inner area 3662 of the face portion 2062. The enhanced deflection of the inner area 3662 may provide enhanced rebounding of the inner area 3662 after the face portion 2062 strikes a golf ball, which may increase ball speed and/or carry distance. The apparatus, methods, and articles of manufacture described herein are not limited in this regard.

In one example, to eliminate or reduce stress concentration regions in or around the back groove 3500, any portion of the back groove 3500 may have a curved or chamfered shape when changing directions. In one example, as illustrated in FIG. 35, the first transition portion 3505 and/or the second transition portion 3507 of the back groove 3500 may be curved. In another example, as illustrated in FIG. 36, the first transition portion 3605, the second transition portion 3607, the third transition portion 3609, and the fourth transition portion 3611 of the back groove 3600 may be curved. In another example as illustrated in FIG. 35, the first end portion 3502 and the second end portion 3510 of the back groove 3500 may be circular. The size of the circle defining the first end portion 3502 and/or the second end portion 3510 may be determined considering the first face thickness, the second face thickness, the third face thickness, the fourth face thickness, material properties of the face portion, the method by which the face portion is manufactured, and/or a broad range of deflections to which the face portion 2062 may be subjected with repeated golf ball strikes. In one example, the diameter of a circle defining the first end portion 3502 and/or the second end portion 3510 may be greater than or equal to 0.1 inch (2.54 mm) and less than or equal to 0.4 inch (10.16 mm). In another example, the diameter of a circle defining the first end portion 3502 and/or the second end portion 3510 may be greater than or equal to 0.188 inch (4.763 mm) and less than or equal to 0.313 inch (7.938 mm). In yet another example, the diameter of a circle defining the first end portion 3502 and/or the second end portion 3510 may be greater than or equal to 0.219 inch (5.556 mm) and less than or equal to 0.281 inch (7.144 mm). The apparatus, methods, and articles of manufacture described herein are not limited in this regard.

To determine the effect of back grooves 3500 and 3600 on the performance of the golf club head 2000, certain club performance parameters were measured for three sample golf clubs, which are identified in FIGS. 39-42 as golf club number one (Club No. 1), golf club number two (Club No. 2), and golf club number 3 (Club No. 3). All three golf clubs were 7-iron golf clubs with golf club heads that were identical in every respect to the golf club head 2000 as described herein except for the configuration of the back groove on the back surface 2066 of the face portion 2062. Club No. 1 did not include any back grooves such as the back groove 3500 or the back groove 3600. Club No. 2 included the back groove 3500 as described herein and illustrated in FIG. 35. Club No. 3 included the back groove 3600 as described herein and illustrated in FIG. 36. The back groove 3500 of Club No. 2 and the back groove 3600 of Club No. 3 had a back groove width 3710 of about 0.125 inch (3.175 mm) and a back groove depth 3720 of about 0.007 inch (0.178 mm). The diameter of the circles defining the first end portion 3502 and the second end portion 3510 of the back groove 3500 were about 0.25 inch (6.350 mm).

Each of the sample golf clubs was tested with a swing robot to strike a golf ball at an average golf club head speed of 84 mph to 86 mph for multiple iterations at each of five locations on the face portion of the golf club head to determine average ball speed (mph), average ball launch angle (degrees), average ball backspin (rpm), and average total carry distance (yards). For example, the swing robot may be a model manufactured by Golf Laboratories of San Diego, California. The five locations of the face portion were a center location, a toe location, a heel location, a low location, and a high location, all of which may be referred to herein as the measurement locations. The center location was determined as the location on the face portion by which a golf ball is typically struck by an individual. In other words, the center location statistically (e.g., greater than 75%) receives the highest number of ball strikes. The center location was set at 0.75 inches or approximately 0.75 inches up from the sole portion edge 2092 and at the center of a corresponding front groove 2068 on the face portion 2062 subject to variations and/or approximations according to measurement tolerances and/or the actual ball strike region on the face portion 2062 by the swing robot. The toe location and the heel location were set as 0.5 inches or approximately 0.5 inches from the center location in the toe direction and in the heel direction, respectively, subject to variations and/or approximations according to measurement tolerances and the actual ball strike point on the face portion 2062 by the swing robot. The high location and the low location were set at 0.25 inches or approximately 0.25 inches from the center location in the top direction and the bottom direction, respectively, subject to variations and/or approximations according to measurement tolerances and the actual ball strike point on the face portion 2062 by the swing robot. The apparatus, methods, and articles of manufacture described herein are not limited in this regard.

Figure 39:
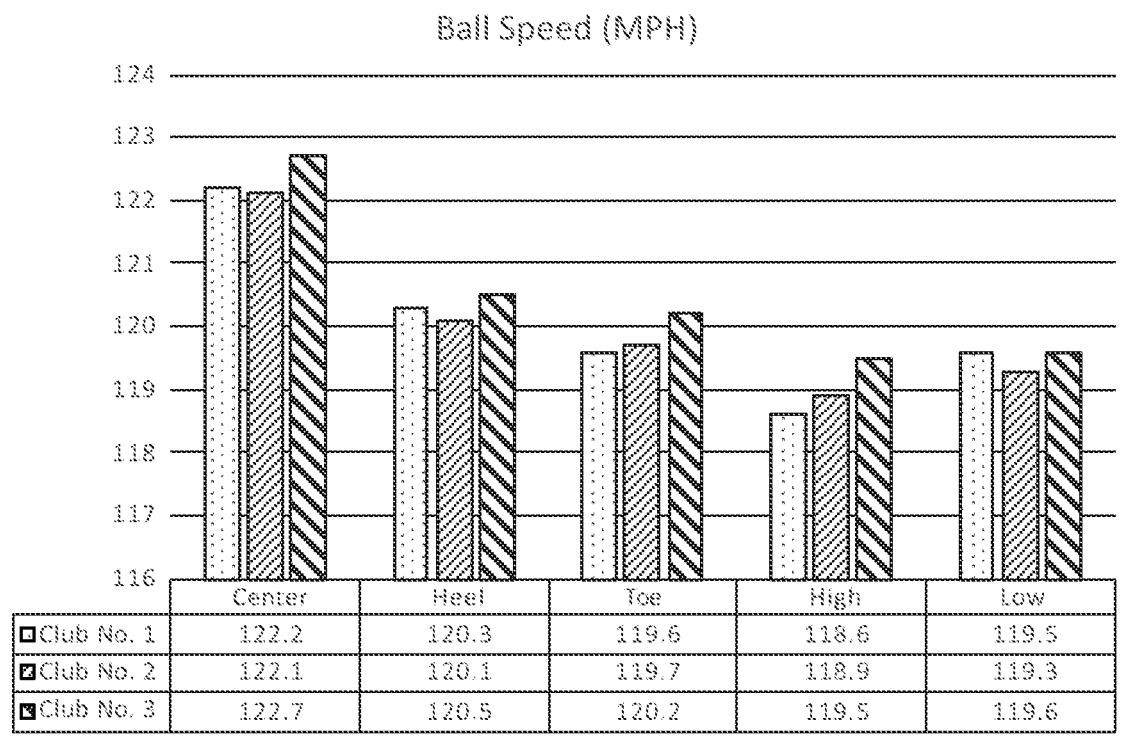
FIGS. 39, 40, 41, and 42 are plots of experimental results for the golf club head of FIG. 20 according to several embodiments of the apparatus, methods, and articles of manufacture described herein.

As illustrated in FIG. 39, ball speed for Club No. 3 was higher at all measurement locations than the ball speeds for Club No. 1 and Club No. 2. Referring back to FIG. 36, the back groove 3600 forms a continuous loop on the back surface 2066 of the face portion 2062. Accordingly, the entire inner area 3662 of the face portion 2062 may deflect inward relative to the outer area 3664 with a golf ball strike to provide an enhanced trampoline or rebounding effect for the golf ball to result in enhanced ball speeds at all measurement locations relative to Club No. 1 and Club No. 3.

Figure 40:
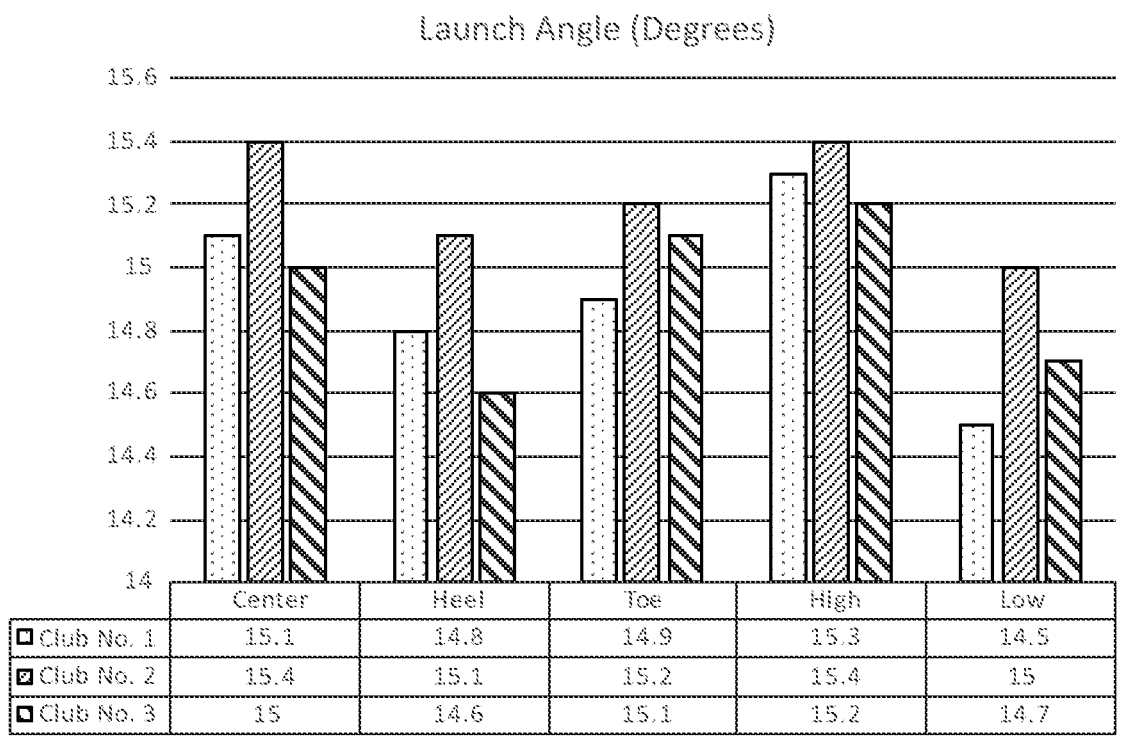

As illustrated in FIG. 40, launch angle for Club No. 2 was higher at all measurement locations than the launch angle for Club No. 1 and Club No. 3. Referring back to FIG. 35, the back groove 3500 forms a C-shaped groove on the back surface 2066 of the face portion 2062. Accordingly, the upper portion of the inner area 3562 of the face portion 2062 may have a greater inward deflection when the face portion 2062 strikes a golf ball than the lower portion of the inner area 3562, hence launching the golf ball with a higher launch angle. In other words, the upper portion of the inner area 3562 may provide a greater trampoline or rebound effect than the lower portion of the inner area 3562 to produce a relatively higher launch angle than Club No. 1 and Club No. 3.

Figure 41:
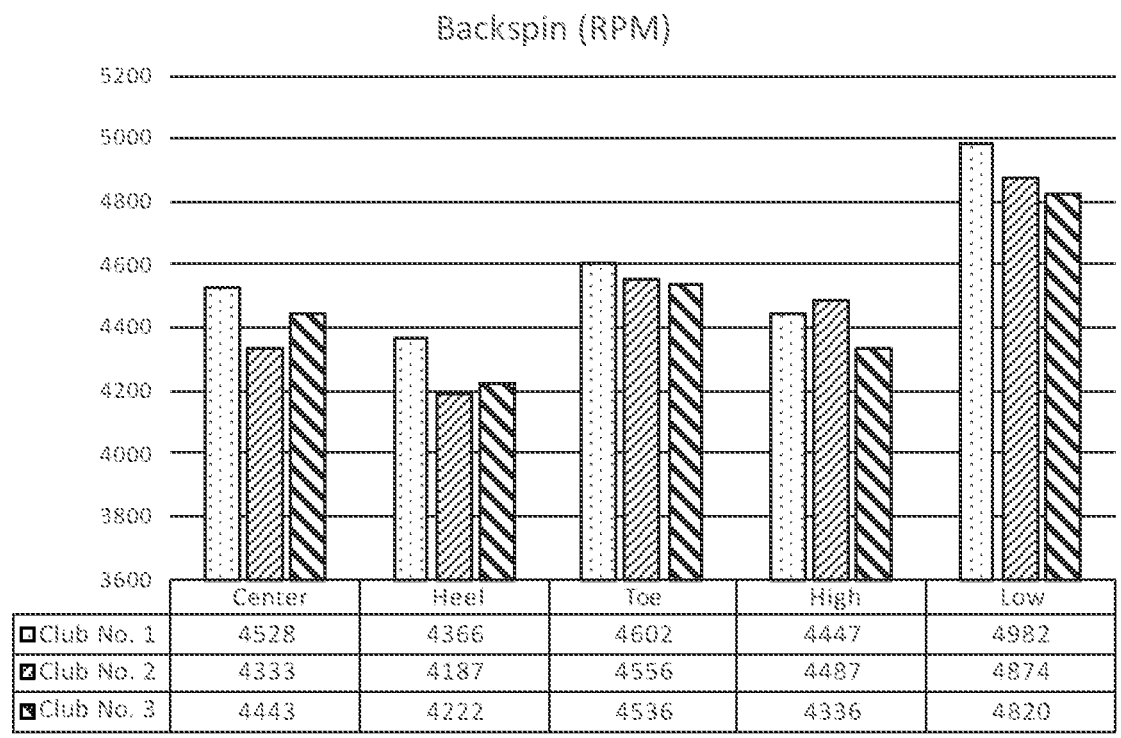

As illustrated in FIG. 41, ball backspin for Club No. 2 was lower at the center location than the backspin for Club No. 1 and Club No. 3. Referring back to FIG. 35, the back groove 3500 forms a C-shaped groove on the back surface 2066 of the face portion 2062. Accordingly, the center portion of the inner area 3562 of the face portion 2062 may have a greater inward deflection when the face portion 2062 strikes a golf ball than the lower portion of the inner area 3562, hence creating a lower backspin on the golf ball. In other words, the relatively greater inward deflection of the upper portion of the inner area 3562 may impart a lower backspin on the ball than Club No. 1 and Club No. 3.

Figure 42:
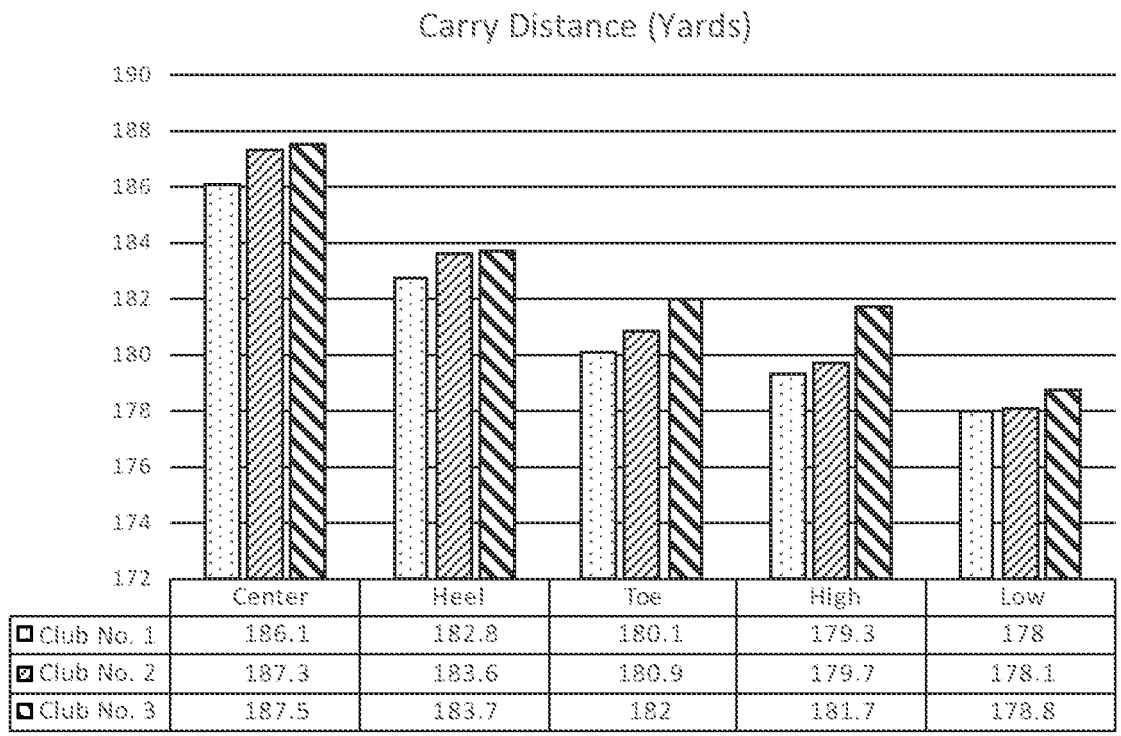

As illustrated in FIG. 42, ball carry distance for Club No. 2 and Club No. 3 were generally similar at the center location and the heel location, but higher than the ball carry distance for Club No. 1 at all five locations. As discussed herein, the greater trampoline or rebound effects provided by the back groove 3500 of Club No. 2 and the back groove 3600 of Club No. 3 may generate a larger carry distance than Club No. 1.

The configuration of a back groove on the back surface 2066 of the face portion 2062 may affect performance characteristics of a golf club. Accordingly, certain performance characteristic for a golf club may be achieved by different groove configurations. In one example, as illustrated in FIG. 43, the face portion 2062 may include a back groove 4300 having a first portion 4304, a first transition portion 4305, a second portion 4306, a second transition portion 4307, a third portion 4308, a third transition portion 4310, a fourth portion 4312, and a fourth transition portion 4314, all of which define a continuous back groove 4300. The back groove 4300 may be similar in many respects to the back groove 3600, except that the first portion 4304 may extend linearly between the face top edge 2780 and the face sole edge 2790 instead of following the contour of the face toe edge 2740 as illustrated in FIG. 36. The apparatus, methods, and articles of manufacture described herein are not limited in this regard.

In another example, as illustrated in FIG. 44, the face portion 2062 may include a back groove 4400 having a first end portion 4402, a first portion 4404, a first transition portion 4405, a second portion 4406, a second transition portion 4407, a third portion 4408, and a second end portion 4410. The back groove 4400 may be similar in many respects to the back groove 3600, except that the first portion 4404 terminates at the first end portion 4402 located at or proximate to the face toe edge 2740 and the face sole edge 2790, and the third portion 4408 terminates at the second end portion 4410 located at or proximate to the face heel edge 2750 and the face sole edge 2790. The apparatus, methods, and articles of manufacture described herein are not limited in this regard.

In another example, as illustrated in FIG. 45, the face portion 2062 may include a back groove 4500 having a first portion 4504, a first transition portion 4505, a second portion 4506, a second transition portion 4507, and a third portion 4508. The back groove 4500 may also include a first end portion 4520 that may be at or proximate to the face sole edge 2790 and a second end portion 4530 at or proximate to the face sole edge 2790. The first end portion 4520 may be closer to the face toe edge 2740 than to the face heel edge 2750, and the second end portion 4530 may be closer to the face heel edge 2750 than to the face toe edge 2740. The back groove 4500 may further include a fourth portion 4501 that extends from the first end portion 4520 toward the face toe edge 2740 and to a third transition portion 4503 that connects the fourth portion 4501 to the first portion 4504, and a fifth portion 4512 that extends from the second end portion 4530 toward the face heel edge 2750 and to a fourth transition portion 4509 that connects the fifth portion 4512 to the third portion 4508. Accordingly, the back groove 4500 may be partially similar in configuration to the back groove 3500 and extend continuously on the back surface 2066 of the face portion 2062 except for a discontinuity defined by a gap 4540 between the first end portion 4520 and the second end portion 4530. The apparatus, methods, and articles of manufacture described herein are not limited in this regard.

In another example, as illustrated in FIG. 46, the face portion 2062 may include a back groove 4600 having a first portion 4604, a first transition portion 4605, a second portion 4606, a second transition portion 4607, and a third portion 4608. The back groove 4600 may also include a first end portion 4620 that may be at or proximate to the face sole edge 2790 and a second end portion 4630 at or proximate to the face sole edge 2790. The first end portion 4620 may be closer to the face toe edge 2740 than to the face heel edge 2750, and the second end portion 4630 may be closer to the face heel edge 2750 than to the face toe edge 2740. The back groove 4600 may further include a fourth portion 4601 that extends from the first end portion 4620 toward the face toe edge 2740 and to a third transition portion 4603 that connects the fourth portion 4601 to the first portion 4604, and a fifth portion 4612 that extends from the second end portion 4630 toward the face heel edge 2750 and to a fourth transition portion 4609 that connects the fifth portion 4612 to the third portion 4608. Accordingly, the back groove 4600 may be partially similar in configuration to the back groove 3600 and extend continuously on the back surface 2066 of the face portion 2062 except for a discontinuity defined by a gap 4640 between the first end portion 4620 and the second end portion 4630. The apparatus, methods, and articles of manufacture described herein are not limited in this regard.

In another example, as illustrated in FIG. 47, the face portion 2062 may include a first back groove 4710 and a second back groove 4720. The first back groove 4710 may include a first end portion 4712, a first portion 4714, a transition portion 4715, a second portion 4716, and a second end portion 4718. The first back groove 4710 may be closer to the face toe edge 2740 than to the face heel edge 2750. The second back groove 4720 may include a first end portion 4722, a first portion 4724, a transition portion 4725, a second portion 4726, and a second end portion 4728. The second back groove 4720 may be closer to the face heel edge 2750 than to the face toe edge 2740. Further, all or significant portions of the first back groove 4710 and the second back groove 4720 may be closer to the face top edge 2780 than to the face sole edge 2790. The apparatus, methods, and articles of manufacture described herein are not limited in this regard.

In another example, as illustrated in FIG. 48, the face portion 2062 may include a first back groove 4810 and a second back groove 4820. The first back groove 4810 may include a first end portion 4812, a first portion 4814, a first transition portion 4815, a second portion 4816, a second transition portion 4817, and a second end portion 4818. The first back groove 4810 may be closer to the face top edge 2780 than to the face sole edge 2790. The second back groove 4820 may include a first end portion 4822, a first portion 4824, a transition portion 4825, a second portion 4826, a second transition portion 4827, and a second end portion 4828. The second back groove 4820 may be closer to the face sole edge 2790 than to the face top edge 2780. Further, each of the first back groove 4810 and the second back groove 4820 may extend from a location at or proximate to the face toe edge 2740 to a location at or proximate to the face heel edge 2750. The first back groove 4810 may be proximate to and follow the contours of the face toe edge 2740, the face top edge 2780, and the face heel edge 2750. The second back groove 4820 may be proximate to and follow the contours of the face toe edge 2740, the face sole edge 2790, and the face heel edge 2750. The apparatus, methods, and articles of manufacture described herein are not limited in this regard.

In another example, as illustrated in FIG. 49, the face portion 2062 may include a back groove 4900, which may be similar in many respects to the back groove 3500 except for the first end portion 4902 and the second end portion 4910. Referring back to the illustrated example of FIG. 35, the first end portion 3502 and the second end portion 3510 may be circular and can have any diameter as described herein. In another example, as illustrated in FIG. 49, the first end portion 4902 may be circular with a larger diameter than the first end portion 3502 of FIG. 35. In another example, as illustrated in FIG. 49, the second end portion 4910 may have an obround shape (i.e., a rectangle with semicircles at opposite sides). In another example (not shown), the first end portion 4902 and/or the second end portion 4910 may have an elliptical shape. In another example (not shown), the first end portion 4902 and/or the second end portion 4910 may have a triangular shape with rounded vertices. In yet another example (not shown), the first end portion 4902, the second end portion 4910, and/or any of the back groove end portions described herein may have any shape and/or any shape without sharp corners or vertices so as to eliminate or reduce any stress concentration regions on the face portion 2062 at or proximate to the back groove. The apparatus, methods, and articles of manufacture described herein are not limited in this regard.

Figure 50:
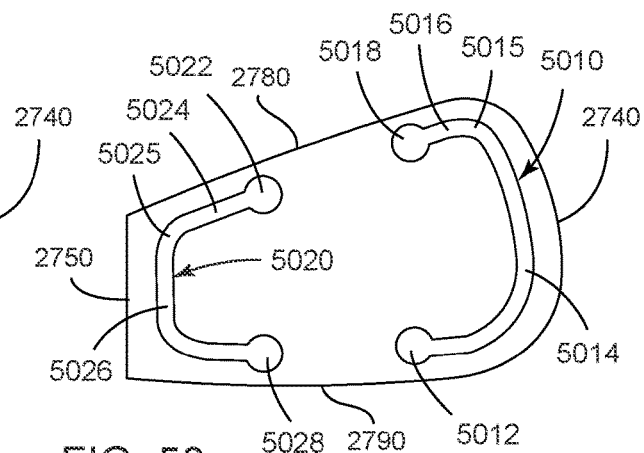

In another example, as illustrated in FIG. 50, the face portion 2062 may include a first back groove 5010 and a second back groove 5020. The first back groove 5010 may include a first end portion 5012, a first portion 5014, a first transition portion 5015, a second portion 5016, and a second end portion 5018. The first back groove 5010 may be closer to the face toe edge 2740 than to the face heel edge 2750. The second back groove 5020 may include a first end portion 5022, a first portion 5024, a transition portion 5025, a second portion 5026 and a second end portion 5028. The second back groove 5020 may be closer to the face heel edge 2750 than to the face toe edge 2740. Further, each of the first back groove 5010 and the second back groove 5020 may extend from a location at or proximate to the face top edge 2780 to a location at or proximate to the face sole edge 2790. The first back groove 5010 may be proximate to and follow the contours of the face top edge 2780, the face toe edge 2740, and the face sole edge 2790. The second back groove 5020 may be proximate to and follow the contours of the face top edge 2780, the face heel edge 2750, and the face sole edge 2790. The apparatus, methods, and articles of manufacture described herein are not limited in this regard.

Figure 51:
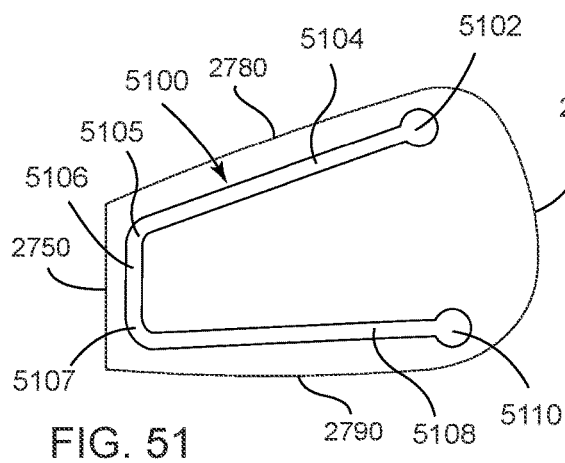

In another example, as illustrated in FIG. 51, the face portion 2062 may include a back groove 5100 having a first end portion 5102, a first portion 5104, a first transition portion 5105, a second portion 5106, a second transition portion 5107, a third portion 5108, and a second end portion 5110. The back groove 5100 may extend proximate to and follow the contours of the face top edge 2780, the face heel edge 2750, and the face sole edge 2790. The first end portion 5102 may be at or proximate to the face top edge 2780 and the face toe edge 2740, and the second end portion 5110 may be at or proximate to the face sole edge 2790 and the face toe edge 2740. Accordingly, the back groove 5100 may not include an elongated portion between the first end portion 5102 and the second end portion 5110 that extends in a direction from the face top edge 2780 to the face sole edge 2790 at a location at or proximate to the face toe edge 2740. The apparatus, methods, and articles of manufacture described herein are not limited in this regard.

Figure 52:
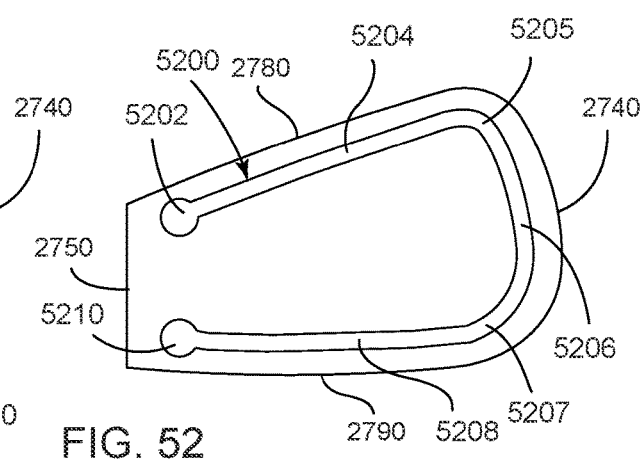

In another example, as illustrated in FIG. 52, the face portion 2062 may include a back groove 5200 having a first end portion 5202, a first portion 5204, a first transition portion 5205, a second portion 5206, a second transition portion 5207, a third portion 5208, and a second end portion 5210. The back groove 5200 may extend proximate to and follow the contours of the face top edge 2780, the face toe edge 2740, and the face sole edge 2790. The first end portion 5202 may be at or proximate to the face top edge 2780 and the face heel edge 2750, and the second end portion 5210 may be at or proximate to the face sole edge 2790 and the face heel edge 2750. Accordingly, the back groove 5200 may not include an elongated portion between the first end portion 5202 and the second end portion 5210 that extends in a direction from the face top edge 2780 to the face sole edge 2790 at a location at or proximate to the face heel edge 2750. The apparatus, methods, and articles of manufacture described herein are not limited in this regard.

Figure 53:
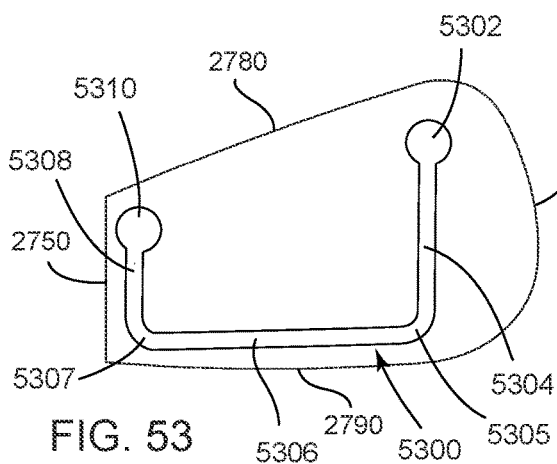

In another example, as illustrated in FIG. 53, the face portion 2062 may include a back groove 5300 having a first end portion 5302, a first portion 5304, a first transition portion 5305, a second portion 5306, a second transition portion 5307, a third portion 5308, and a second end portion 5310. The back groove 5300 may extend proximate to the face toe edge 2740, the face sole edge 2790, and the face heel edge 2750. The first end portion 5302 may be at or proximate to the face top edge 2780 and the face toe edge 2740, and the second end portion 5310 may be at or proximate to the face top edge 2780 and the face toe edge 2740. Accordingly, the back groove 5300 may not include an elongated portion between the first end portion 5302 and the second end portion 5310 that extends in a direction from the face toe edge 2740 to the face heel edge 2750 at a location at or proximate to the face top edge 2780. As illustrated in FIG. 53, the back groove 5300 may be similar in many respects to the back groove 3500 but may be in an inverted configuration on the back surface 2066 of the face portion 2062 as compared to the back groove 3500. The apparatus, methods, and articles of manufacture described herein are not limited in this regard.

Figure 54:
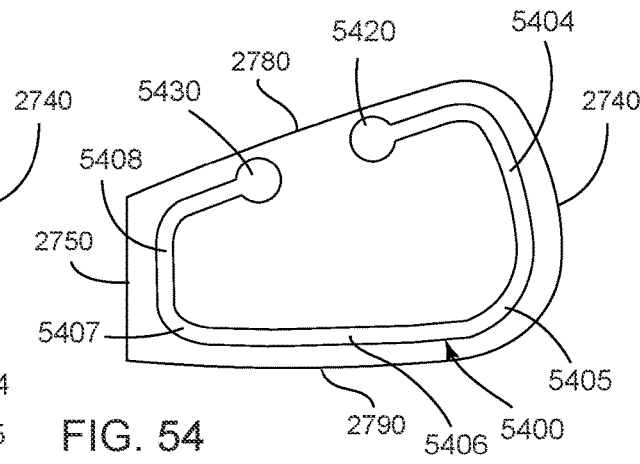

In another example, as illustrated in FIG. 54, the face portion 2062 may include a back groove 5400 having a first portion 5404, a first transition portion 5405, a second portion 5406, a second transition portion 5407, and a third portion 5408. The back groove 5400 may also include a first end portion 5420 that may be at or proximate to the face top edge 2780 and a second end portion 5430 at or proximate to the face top edge 2780. The first end portion 5420 may be closer to the face toe edge 2740 than to the face heel edge 2750, and the second end portion 5430 may be closer to the face heel edge 2750 than to the face toe edge 2740. As illustrated in FIG. 54, the back groove 5400 may be similar in many respects to the back groove 4600 but may be in an inverted configuration on the back surface 2066 of the face portion 2062 as compared to the back groove 4600. The apparatus, methods, and articles of manufacture described herein are not limited in this regard.

Figure 55:
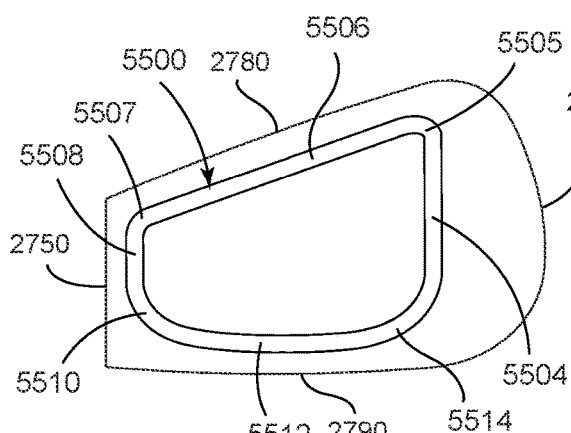

In one example, as illustrated in FIG. 55, the face portion 2062 may include a back groove 5500 having a first portion 5504, a first transition portion 5505, a second portion 5506, a second transition portion 5507, a third portion 5508, and a third transition portion 5510, a fourth portion 5512, and a fourth transition portion 5514, all of which may define a continuous back groove 5500. The back groove 5500 may be similar in many respects to the back groove 4300, except that the fourth portion 5512 may have a convex shape relative to the face sole edge 2790. The apparatus, methods, and articles of manufacture described herein are not limited in this regard.

Figure 56:
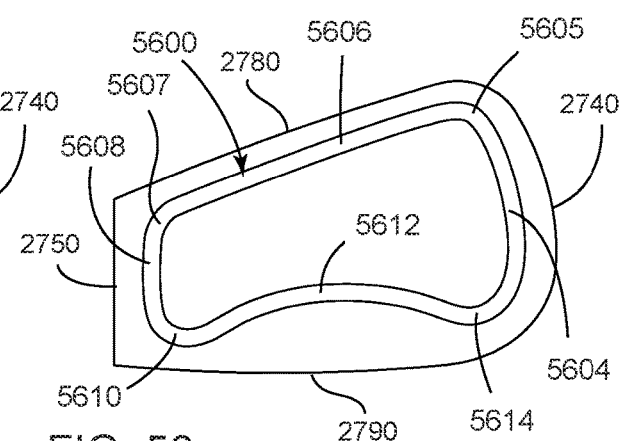

In one example, as illustrated in FIG. 56, the face portion 2062 may include a back groove 5600 having a first portion 5604, a first transition portion 5605, a second portion 5606, a second transition portion 5607, a third portion 5608, and a third transition portion 5610, a fourth portion 5612, and a fourth transition portion 5614, all of which may define a continuous back groove 5600. The back groove 5600 may be similar in many respects to the back groove 3600, except that the fourth portion 5612 may have a concave shape relative to the face sole edge 2790. The apparatus, methods, and articles of manufacture described herein are not limited in this regard.

Figure 57:
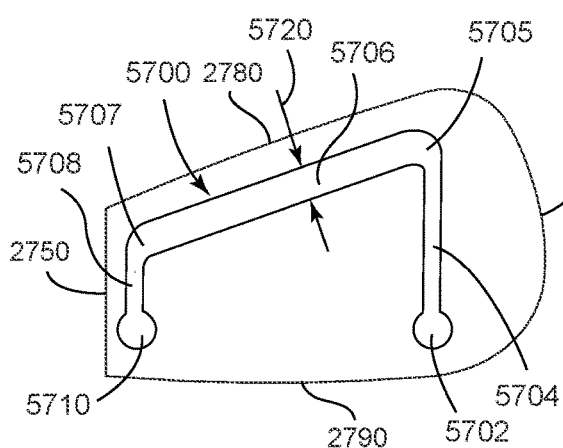

In another example, as illustrated in FIG. 57, the face portion 2062 may include a back groove 5700 having a first end portion 5702, a first portion 5704, a first transition portion 5705, a second portion 5706, a second transition portion 5707, a third portion 5708, and a second end portion 5710. The back groove 5700 may be similar in many respects to the back groove 3500, except that the back groove width 5720 of the second portion 5706 may be greater than the back groove width 5720 of the remaining portions of the back groove 5700. In another example, any one or more of the first portion 5704, the second portion 5706, and the third portion 5708 may have similar or different back groove widths and/or back groove depths. Any of the back grooves described herein may have portions with different or similar back groove widths and/or back groove depths. The apparatus, methods, and articles of manufacture described herein are not limited in this regard.

Figure 58:
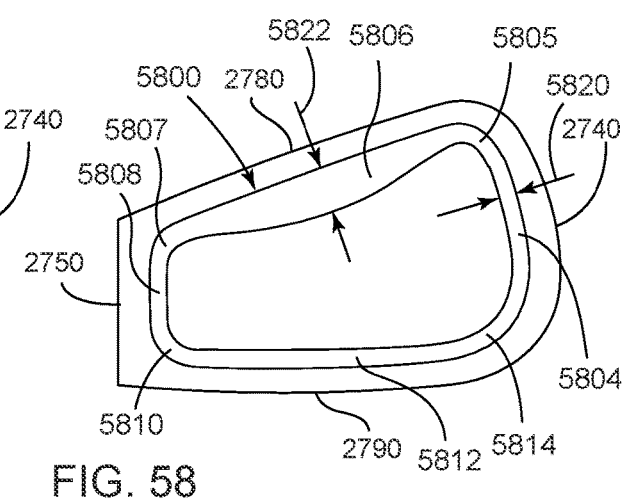

In another example, as illustrated in FIG. 58, the face portion 2062 may include a back groove 5800 having a first portion 5804, a first transition portion 5805, a second portion 5806, a second transition portion 5807, a third portion 5808, a third transition portion 5810, a fourth portion 5812, and a fourth transition portion 5814, all of which may define a continuous back groove 5800. The back groove 5800 may be similar in many respects to the back groove 3600, except that the back groove width 5820 of the second portion 5806 may vary between the first transition portion 5805 and the second transition portion 5807. As illustrated in the example of FIG. 58, the back groove width 5820 may gradually increase from the first transition portion 5805 in a direction toward the second transition portion 5807 to a maximum back groove width 5822 and may gradually decrease from the location of the maximum back groove width 5822 in a direction toward the second transition portion 5807. Any portion of any of the back grooves described herein may have portions with different or similar back groove widths and/or back groove depths that may increase, decrease in a continuous (i.e., gradual), or discrete manner (i.e., increase or decrease in steps). The apparatus, methods, and articles of manufacture described herein are not limited in this regard.

In another example, as illustrated in FIG. 59, the face portion 2062 may include a first back groove 5900 and a second back groove 5950. The first back groove 5900 may include a first end portion 5902, a first portion 5904, a first transition portion 5905, a second portion 5906, a second transition portion 5907, a third portion 5908, and a second end portion 5910. The first back groove 5900 may be similar in many respects to the back groove 3500. The second back groove 5950 may extend between the first end portion 5902 and the second end portion 5910 and include a second groove first end portion 5952, a second groove portion 5954, and a second groove second end portion 5960. The second groove first end portion 5952 may be proximate to the first end portion 5902, and the second groove second end portion 5960 may be proximate to the second end portion 5910. FIG. 59 illustrates an example of multiple back grooves disposed on the back surface 2066 of the face portion 2062 with different configurations. The apparatus, methods, and articles of manufacture described herein are not limited in this regard.

Figure 60:
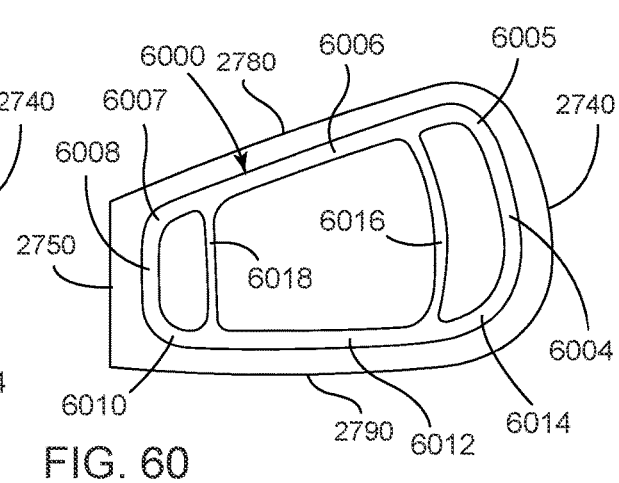

In another example, as illustrated in FIG. 60, the face portion 2062 may include a back groove 6000 having a first portion 6004, a first transition portion 6005, a second portion 6006, a second transition portion 6007, a third portion 6008, a third transition portion 6010, a fourth portion 6012, and a fourth transition portion 6014, all of which may define a continuous back groove 6000. The back groove 6000 may be similar in many respects to the back groove 6000, and further include a fifth portion 6016 and a sixth portion 6018, both of which may be located between the first portion 6004 and the third portion 6008 and extend from the second portion 6006 to the fourth portion 6012. The fifth portion 6016 may be closer to the face toe edge 2740 than to the face heel edge 2750. The sixth portion 6018 may be closer to the face heel edge 2750 than to the face toe edge 2740. The back groove 6000 may include any groove portions extending between and/or connecting any two adjacent or opposing pairs of the first portion 6004, the first transition portion 6005, the second portion 6006, the second transition portion 6007, the third portion 6008, the third transition portion 6010, the fourth portion 6012, and/or the fourth transition portion 6014. The apparatus, methods, and articles of manufacture described herein are not limited in this regard.

Figure 61:
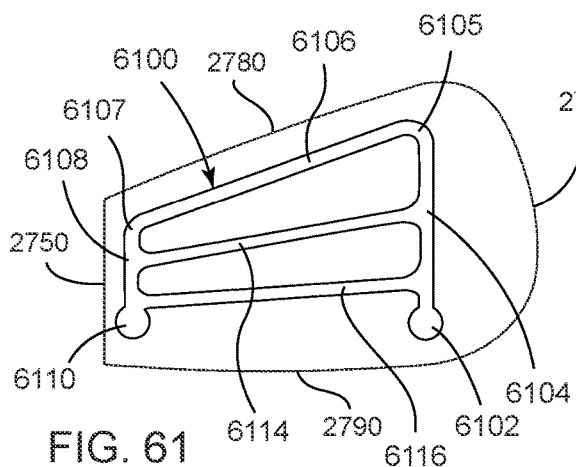

In another example, as illustrated in FIG. 61, the face portion 2062 may include a back groove 6100 having a first end portion 6102, a first portion 6104, a first transition portion 6105, a second portion 6106, a second transition portion 6107, a third portion 6108, and a second end portion 6110. The back groove 5700 may be similar in many respects to the back groove 3500, and further include a fifth portion 6114 and a sixth portion 6116, both of which may be located between the second portion 6106 and the face sole edge 2790 and extend from the first portion 6104 and the third portion 6108. The fifth portion 6114 may be closer to the face top edge 2780 than to the face sole edge 2700. The sixth portion 6116 may be closer to the face sole edge 2790 than to the face top edge 2780. The back groove 6100 may include any groove portions extending between and/or connecting any two adjacent or opposing pairs of the first end portion 6102, the first portion 6104, the first transition portion 6105, the second portion 6106, the second transition portion 6107, the third portion 6108, and/or the second end portion 6110. The apparatus, methods, and articles of manufacture described herein are not limited in this regard.

Figure 62:
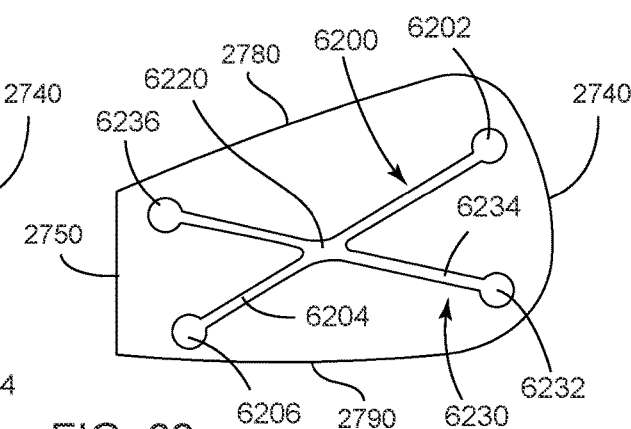

In another example, as illustrated in FIG. 62, the face portion 2062 may include a first back groove 6200 and the second back groove 6230. The first back groove 6200 may extend diagonally on the back surface 2066 of the face portion 2062 and include a first end portion 6202 located proximate to the face toe edge 2740 and the face top edge 2780, a second end portion 6206 located proximate to the face heel edge 2750 and the face sole edge 2790, and a groove portion 6204 connecting the first end portion 6202 and the second end portion 6206. The second back groove 6230 may extend diagonally on the back surface 2066 of the face portion 2062 and include a first end portion 6232 located proximate to the face toe edge 2740 and the face sole edge 2790, a second end portion 6236 located proximate to the face heel edge 2750 and the face top edge 2780, and a groove portion 6234 connecting the first end portion 6232 and the second end portion 6236. The groove portion 6204 of the first back groove 6200 and the groove portion 6234 of the second back groove 6230 may intersect at a common groove portion 6220 that may be located at or proximate to a center region of the face portion 2062. The apparatus, methods, and articles of manufacture described herein are not limited in this regard.

Figure 63:
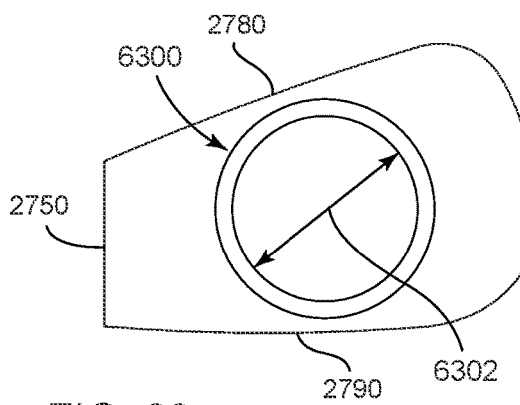

In another example, as illustrated in FIG. 63, the face portion 2062 may include a back groove 6300 that may be circular having an inner diameter 6302 that may be within the boundaries of the face portion 2062 as defined by the face toe edge 2740, the face heel edge 2750, the face top edge 2780, and the face sole edge 2790. The back groove 6300 may be located at a center region of the face portion 2062 as illustrated in the example of FIG. 63. In another example the back groove 6300 may be at any location on the back surface 2066 of the face portion 2062. In another example, the back groove 6300 may include a plurality separate or overlapping circular grooves on the back surface 2066 of the face portion. In yet another example, the back groove 6300 may include a plurality separate and concentric circular grooves on the back surface 2066 of the face portion. The apparatus, methods, and articles of manufacture described herein are not limited in this regard.

Figure 64:
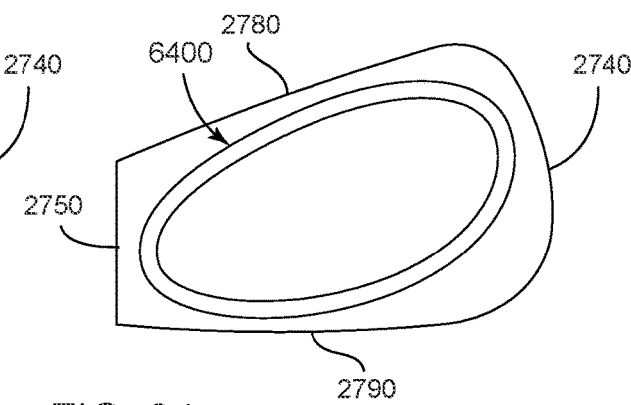

In another example, as illustrated in FIG. 64, the face portion 2062 may include a back groove 6400 that may be elliptical and located within the boundaries of the face portion 2062 as defined by the face toe edge 2740, the face heel edge 2750, the face top edge 2780, and the face sole edge 2790. A center portion of the back groove 6400 may be located at a center region of the face portion 2062 as illustrated in the example of FIG. 64. In another example the back groove 6400 may be at any location on the back surface 2066 of the face portion 2062. In another example, the back groove 6400 may include a plurality of separate or overlapping elliptical grooves on the back surface 2066 of the face portion. In yet another example, the back groove 6400 may include a plurality of separate or concentric or nested elliptical grooves on the back surface 2066 of the face portion. The apparatus, methods, and articles of manufacture described herein are not limited in this regard.

In another example, as illustrated in FIG. 65, the face portion 2062 may include a back groove 6500 having a first portion 6504, a first transition portion 6505, a second portion 6506, a second transition portion 6507, and a third portion 6508. The back groove 6500 may be similar in many respects to the back groove 3500, except that the back groove 6500 may not include the first end portion 3502 and the second end portion 3510 of the back groove 3500. The first portion 6504 and the third portion 6508 extend to the face sole edge 2790. Similarly, any portion of any of the back grooves discussed herein may extend to the face toe edge 2740, the face heel edge 2750, the face top edge 2780, or the face sole edge 2790. The apparatus, methods, and articles of manufacture described herein are not limited in this regard.

In yet another example, as illustrated in FIG. 66, the face portion 2062 may include a back groove 6600 having a curved shape that may be concave relative to the face sole edge 2790. The back groove 6600 may be continuous and extend from a first groove end 6602 at the face sole edge 2790 and proximate to the face toe edge 2740 to a second groove end 6604 at the face sole edge 2790 and proximate to the face heel edge 2750. Similarly, any portion of any of the back grooves discussed herein may have any linear or curved shape and extend to the face toe edge 2740, the face heel edge 2750, the face top edge 2780, or the face sole edge 2790. The apparatus, methods, and articles of manufacture described herein are not limited in this regard.

Any one or more of the back grooves illustrated in examples of FIGS. 13, 35, 36, and 43-66, or any one or more portions of the back grooves illustrated in examples of FIGS. 13, 35, 36, and 43-66 may be combined to provide other back groove configurations. In one example, the back surface 2066 of the face portion 2062 may include any one or both of the back grooves 6200 and 6230 of FIG. 62 in combination with the back groove 64 of FIG. 64. In another example, the back surface 2066 of the face portion 2062 may include the back groove 3600 of FIG. 36 and the back groove 6300 of FIG. 63. In another example, the back surface 2066 of the face portion 2062 may include the back grooves 4710 and 4720 of FIG. 47 and the back groove 5950 of FIG. 59. In another example, the back surface 2066 of the face portion 2062 may include the back groove 6500 of FIG. 65 and the back groove 5950 of FIG. 59. In yet another example, the back surface 2066 of the face portion 2062 may include any one or both of the back grooves 5010 and 5020 of FIG. 50, and the back groove 6300 of FIG. 63. Thus, any one or more back grooves or any one or more portions of the back grooves discussed herein and illustrated in FIGS. 13, 35, 36, and 43-66 may be combined to provide any configuration of back groove portions on the back surface 2066 of the face portion 2062. The apparatus, methods, and articles of manufacture described herein are not limited in this regard.

As illustrated by the examples of FIGS. 13, 35, 36, and 43-66, the back surface 2066 of the face portion 2062 may have any number of back grooves with any configuration to provide certain performance characteristics for the golf club head 2000. As described herein, an area of the face portion 2062 that may be partially or fully surrounded by one or more back grooves (i.e., partially or fully bound by a back groove portion) may exhibit greater deflection than an area of the face portion 2062 that surrounds the back groove when a golf ball strikes the face portion 2062. Accordingly, certain face portion deflection characteristics may be achieved by providing certain back groove characteristics. In one example and referring back to FIG. 50, the portion of the face portion 2062 that is surrounded by the first back groove 5010 and the portion of the face portion 2062 that is surrounded by the second back groove 5020 may each have a greater deflection that a center region of the face portion 2062. In another example and referring back to FIG. 51, the portion of the face portion 2062 that is surrounded by the back groove 5100 may have a greater deflection at a location that is closer to the face heel edge 2750 than the portion of the back groove 5100 that is closer to the face toe edge 2740. In another example, and referring back to FIG. 54, the portion of the face portion 2062 that is surrounded by the back groove 5400 may have a greater deflection at a location that is closer to the face sole edge 2790 than a portion of the back groove 5400 that is closer to the face top edge 2780. In yet another example and referring back to FIG. 62, the greatest deflection of the face portion 2062 may be at or proximate to the common groove portion 6220. Accordingly, each of the back groove configurations illustrated in the examples of FIGS. 13, 35, 36, and 43-66 may provide a certain performance characteristic for a golf club head. The apparatus, methods, and articles of manufacture described herein are not limited in this regard.

The golf club head 2000 may be manufactured by any of the methods described herein, such as the method illustrated in FIG. 14, or the methods described in any of the incorporated by reference applications. The back groove may be manufactured with the face portion or formed on the face portion after manufacturing the face portion by any method of creating grooves, channels, slots, slits, depressions, dimples, recesses, or in general reducing a thickness of a portion of an object. For example, the back groove may be machined on the back surface of the face portion. The apparatus, methods, and articles of manufacture described herein are not limited in this regard.

Any of the golf club heads described herein may be an iron-type golf club head (e.g., a 1-iron, a 2-iron, a 3-iron, a 4-iron, a 5-iron, a 6-iron, a 7-iron, an 8-iron, a 9-iron, etc.), or a wedge-type golf club head (e.g., a pitching wedge, a lob wedge, a sand wedge, an n-degree wedge such as 44 degrees (°), 48°, 52°, 56°, 60°, etc.). Although a particular type of club head may be depicted and described, the apparatus, methods, and articles of manufacture described herein may be applicable to other types of club heads (e.g., a driver-type club head, a fairway wood-type club head, a hybrid-type club head, a putter-type club head, etc.). The apparatus, methods, and articles of manufacture described herein are not limited in this regard.

The body portion and/or the face portion of any of the golf club heads described herein may be partially or entirely made of a steel-based material (e.g., 17-4 PH stainless steel, Nitronic® 50 stainless steel, alloy steel 8620, maraging steel or other types of stainless steel), a titanium-based material, an aluminum-based material (e.g., a high-strength aluminum alloy or a composite aluminum alloy coated with a high-strength alloy), any combination thereof, non-metallic materials, composite materials, and/or other suitable types of materials. The body portion and/or the face portion may be constructed with materials that are similar to any of the body portions and/or face portions described herein or in any of the incorporated by reference patent documents. The apparatus, methods, and articles of manufacture described herein are not limited in this regard.

In one example, the area of the front surface of the face portion of any of the golf club heads described herein may be greater than or equal to 330 mm$^2$ and less than or equal to 5000 mm$^2$. In another example, the area of the front surface of the face portion of any of the golf club heads described herein may be greater than or equal to 1000 mm$^2$ and less than or equal to 5300 mm$^2$. In yet another example, the area of the front surface of the face portion of any of the golf club heads described herein may be greater than or equal to 1500 mm$^2$ and less than or equal to 4800 mm$^2$. While the above examples may describe particular areas, the area of the front surface may greater than or less than those numbers. The apparatus, methods, and articles of manufacture described herein are not limited in this regard.

In one example, a filler material as described herein may include an elastic polymer or an elastomer material (e.g., a viscoelastic urethane polymer material such as Sorbothane® material manufactured by Sorbothane, Inc., Kent, Ohio), a thermoplastic elastomer material (TPE), a thermoplastic polyurethane material (TPU), other polymer material(s), bonding material(s) (e.g., adhesive), and/or other suitable types of materials that may absorb shock, isolate vibration, and/or dampen noise. In another example, a filler material may be one or more thermoset polymers having bonding properties (e.g., one or more adhesive or epoxy materials). A material may also absorb shock, isolate vibration, and/or dampen noise when a golf club head as described herein strikes a golf ball. Further, a filler material may be an epoxy material that may be flexible or slightly flexible when cured. In another example, a filler material may include any of the 3M™ Scotch-Weld™ DP100 family of epoxy adhesives (e.g., 3M™ Scotch-Weld™ Epoxy Adhesives DP100, DP100 Plus, DP100NS and DP100FR), which are manufactured by 3M corporation of St. Paul, Minnesota. In another example, a filler material may include 3M™ Scotch-Weld™ DP100 Plus Clear adhesive. In another example, a filler material may include low-viscosity, organic, solvent-based solutions and/or dispersions of polymers and other reactive chemicals such as MEGUM™, ROBOND™, and/or THIXON™ materials manufactured by the Dow Chemical Company, Auburn Hills, Michigan. In yet another example, a filler material may be LOCTITE® materials manufactured by Henkel Corporation, Rocky Hill, Connecticut. In another example, a filler material may be a polymer material such as an ethylene copolymer material that may absorb shock, isolate vibration, and/or dampen noise when a golf club head strikes a golf ball via the face portion. In another example, a filler material may be a high density ethylene copolymer ionomer, a fatty acid modified ethylene copolymer ionomer, a highly amorphous ethylene copolymer ionomer, an ionomer of ethylene acid acrylate terpolymer, an ethylene copolymer comprising a magnesium ionomer, an injection moldable ethylene copolymer that may be used in conventional injection molding equipment to create various shapes, an ethylene copolymer that can be used in conventional extrusion equipment to create various shapes, an ethylene copolymer having high compression and low resilience similar to thermoset polybutadiene rubbers, and/or a blend of highly neutralized polymer compositions, highly neutralized acid polymers or highly neutralized acid polymer compositions, and fillers. For example, the ethylene copolymer may include any of the ethylene copolymers associated with DuPont™ High-Performance Resin (HPF) family of materials (e.g., DuPont™ HPF AD1172, DuPont™ HPF AD1035, DuPont® HPF 1000 and DuPont™ HPF 2000), which are manufactured by E.I. du Pont de Nemours and Company of Wilmington, Delaware. The DuPont™ HPF family of ethylene copolymers are injection moldable and may be used with conventional injection molding equipment and molds, provide low compression, and provide high resilience, i.e., relatively high coefficient of restitution (COR). In another example, any one or more of the filler materials described herein may be formed from one or more metals or metal alloys, such as aluminum, copper, zinc, and/or titanium. A filler material not specifically described in detail herein may include one or more similar or different types of materials described herein and in any of the incorporated by reference patent documents. The apparatus, methods, and articles of manufacture described herein are not limited in this regard.

Any of the filler materials described herein may be subjected to different processes during manufacturing of any of the golf club heads described herein. Such processes may include one or more filler materials being heated and/or cooled by conduction, convection, and/or radiation during one or more injection molding processes or post injection molding curing processes. For example, all of the heating and cooling processes may be performed by using heating or cooling systems that employ conveyor belts that move a golf club head described herein through a heating or cooling environment for a period of time as described herein. The processes of manufacturing a golf club head with one or more filler materials may be similar to any of the processes described in any of the incorporated by reference patent documents. The apparatus, methods, and articles of manufacture described herein are not limited in this regard.

In the example of FIGS. 67-73, a golf club head 6700 may include a body portion 6710 having a top portion 6730, a bottom portion 6740, a toe portion 6750, a heel portion 6760, a front portion 6770, and a rear portion 6780. The body portion 6710 may include a skirt portion 6790 defined as a side portion of the golf club head 6700 between the top portion 6730 and the bottom portion 6740 excluding the front portion 6770 and extending across a periphery of the golf club head 6700 from the toe portion 6750, around the rear portion 6780, and to the heel portion 6760. Alternatively, the golf club head 6700 may not include the skirt portion 6790. The front portion 6770 may include a face portion 6800 for impacting a golf ball. The face portion 6800 may be integral to the body portion 6710 or may be partially or fully a separate piece that is coupled (e.g., welded) to the front portion 6770 to enclose an interior cavity 6712 of the body portion 6710. The body portion 6710 may also include a hosel portion (not shown) configured to receive a shaft portion (not shown). The hosel portion may include an interchangeable hosel sleeve (not shown) and a fastener (not shown). Alternatively, the body portion 6710 may include a bore instead of the hosel portion. The body portion 6710 may be made partially or entirely of an aluminum-based material, a magnesium-type material, a steel-based material, a titanium-based material, any combination thereof, or any other suitable material. In another example the body portion 6710 may be made partially or entirely of a non-metal material such as a ceramic material, a composite material, any combination thereof, or any other suitable material. The golf club head 6700 may have a club head volume greater than or equal to 300 cubic centimeters ($cm^3$ or cc). In one example, the golf club head 6700 may be about 460 cc. Alternatively, the golf club head 6700 may have a club head volume less than or equal to 300 cc. In particular, the golf club head 6700 may have a club head volume between 100 cc and 200 cc. The club head volume of the golf club head 6700 may be determined by using the weighted water displacement method (i.e., Archimedes Principle). For example, procedures defined by golf standard organizations and/or governing bodies such as the United States Golf Association (USGA) and/or the Royal and Ancient Golf Club of St. Andrews (R&A) may be used for measuring the club head volume of the golf club head 6700. Although FIGS. 67-73 may depict a particular type of club head (e.g., a driver-type club head), the apparatus, methods, and articles of manufacture described herein may be applicable to other types of club head (e.g., a fairway wood-type club head, a hybrid-type club head, an iron-type club head, a putter-type club head, etc.). The golf club head 6700 may be manufactured by any of the methods described herein such as the method illustrated in FIG. 14, or any of the methods described in any of the incorporated by reference patent documents. The apparatus, methods, and articles of manufacture described herein are not limited in this regard.

The face portion 6800 may include a front surface 6802 and a rear surface 6804. The front surface 6802 may be configured to strike a golf ball. In one example, the face portion 6800 may include an outer face portion 6806 that may be integral with the body portion 6710 and surround a face opening 6808 in the face portion 6800. A face insert portion 6900 may be attached to the outer face portion 6806 to close the face opening 6808 and enclose an interior cavity 6712. The face opening 6808 may include a perimeter edge 6810 and the face insert portion 6900 may include a perimeter edge 6902. A gap (not shown) may exist between the perimeter edge 6902 of the face insert portion 6900 and the perimeter edge 6810 of the face opening 6808. In one example, the gap may be a V-shaped gap to enhance weld penetration. During manufacturing, the gap may be entirely or partially filled with weld material during a welding process in which the face insert portion 6900 is joined to the outer face portion 6806. A sanding or polishing process may follow by which excess weld material is removed to produce a smooth surface across the front portion 6770 of the golf club head 6700 and any excess weld material from the rear surface 6804 of the face portion 6800. While the above example may describe the body portion 6710 and the face insert portion 6900 as separate components of the golf club head 6700, the apparatus, methods, and articles of manufacture described herein may include golf club heads with the face portion being an integral part of the body portion (i.e., not separate components). In another example, the outer face portion 6806 and the face insert portion 6900 may be a one-piece part. Accordingly, the face portion 6800 may be attached to the front portion 6770 as described herein or in any of the incorporated by reference applications to enclose the interior cavity 6712. The apparatus, methods, and articles of manufacture described herein are not limited in this regard.

In one example, as shown in FIGS. 67-73, the face insert portion 6900 may include a first portion 6904 having a first thickness 6905 ($T_1$), a second portion 6906 having a second thickness 6907 ($T_2$), and a third portion 6908 having a third thickness 6909 ($T_3$). The second portion 6906 may also be referred to herein as a first transition portion 6906, which may define a transition in thickness between the first portion 6904 and the third portion 6908. The first thickness 6905 may be greater than the third thickness 6909 ($T_1 > T_3$). The second thickness 6907 may vary between the first thickness 6905 and the third thickness 6909. In other words, the second portion 6906 may be a transition portion 6906 that provides a transition in the thickness of the face insert portion 6900 between the first portion 6904 and the third portion 6908. The face portion 6800 may further include a fourth portion 6910 having a fourth thickness 6911 ($T_4$) and a fifth portion 6912 having a fifth thickness 6913 ($T_5$). The fourth portion 6910 may be defined as a connective portion between the perimeter edge 6902 of the face insert portion 6900 and the perimeter edge 6810 of the face opening 6808. The fifth portion 6912 may be defined by the outer face portion 6806. As described herein, the face insert portion 6900 may have a greater thickness than the outer face portion 6806. Accordingly, the first thickness 6905, the second thickness 6907, and the third thickness 6909 may be greater than the fifth thickness 6913 ($T_1 > T_5$; $T_2 > T_5$; and $T_3 > T_5$). The fourth thickness 6911 may vary between the third thickness 6909 and the fifth thickness 6913. In other words, the fourth portion 6910 may be a second transition portion 6910 that provides a transition in thickness between face insert portion 6900 and the outer face portion 6806. The apparatus, methods, and articles of manufacture described herein are not limited in this regard.

The first transition portion 6906 may surround the first portion 6904 at an inner perimeter 6914. Accordingly, at the inner perimeter 6914, which may define a boundary between the first portion 6904 and the first transition portion 6906, the first thickness 6905 and the second thickness 6907 may be the same or slightly vary due to manufacturing tolerances. From the inner perimeter 6914, the second thickness 6907 may decrease up to an outer perimeter 6915, which may define a boundary between the first transition portion 6906 and the third portion 6908. Accordingly, at the outer perimeter 6915, the second thickness 6907 and the third thickness 6909 may be the same or slightly vary due to manufacturing tolerances. In one example, the decrease in the second thickness 6907 from the inner perimeter 6914 to the outer perimeter 6915 may have a shallow or slight s-shaped path or profile. In other examples, some of which may be described herein, the decrease in the second thickness 6907 from the inner perimeter 6914 to the outer perimeter 6915 may have any path or profile. The apparatus, methods, and articles of manufacture described herein are not limited in this regard.

In one example, the first thickness 6905 may be greater than or equal to 0.1 inch (2.54 millimeters) and less than or equal to 0.2 inch (5.08 mm). In another example, the first thickness 6905 may be greater than or equal to 0.12 inch (3.05 millimeters) and less than or equal to 0.19 inch (4.83 mm). In yet another example, the first thickness 6905 may be greater than or equal to 0.13 inch (3.3 millimeters) and less than or equal to 0.16 inch (4.06 mm). As described herein, the first thickness 6905 may be determined to provide certain performance characteristics or optimum performance characteristics for the golf club head 6700 without compromising the structural integrity of the face portion 6800. The apparatus, methods, and articles of manufacture described herein are not limited in this regard.

In one example, the third thickness 6909 may be greater than or equal to 0.09 inch (2.29 millimeters) and less than or equal to 0.16 inch (4.06 mm). In another example, the third thickness 6909 may be greater than or equal to 0.1 inch (2.54 millimeters) and less than or equal to 0.15 inch (3.81 mm). In yet another example, the third thickness 6909 may be greater than or equal to 0.12 inch (3.05 millimeters) and less than or equal to 0.14 inch (3.56 mm). As described herein, the third thickness 6909 may be determined to provide certain performance characteristics or optimum performance characteristics for the golf club head 6700 without compromising the structural integrity of the face portion 6800. The apparatus, methods, and articles of manufacture described herein are not limited in this regard.

In one example, the fifth thickness 6913 may be greater than or equal to 0.06 inch (1.52 millimeters) and less than or equal to 0.12 inch (3.05 mm). In another example, the fifth thickness 6913 may be greater than or equal to 0.08 inch (2.03 millimeters) and less than or equal to 0.11 inch (2.79 mm). In yet another example, the fifth thickness 6913 may be greater than or equal to 0.09 inch (2.29 millimeters) and less than or equal to 0.10 inch (2.54 mm). As described herein, the fifth thickness 6913 may be determined to provide certain performance characteristics or optimum performance characteristics for the golf club head 6700 without compromising the structural integrity of the face portion 6800. The apparatus, methods, and articles of manufacture described herein are not limited in this regard.

Figure 85:
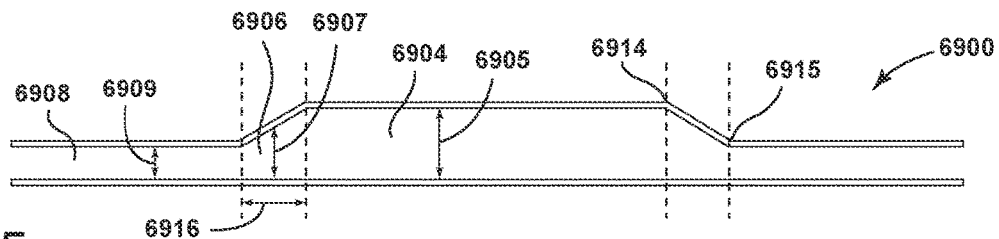
FIG. 85 illustrates a schematic cross section view of an example of the face portion of FIG. 84 taken at lines 85-85 of FIG. 84.
Figure 86:
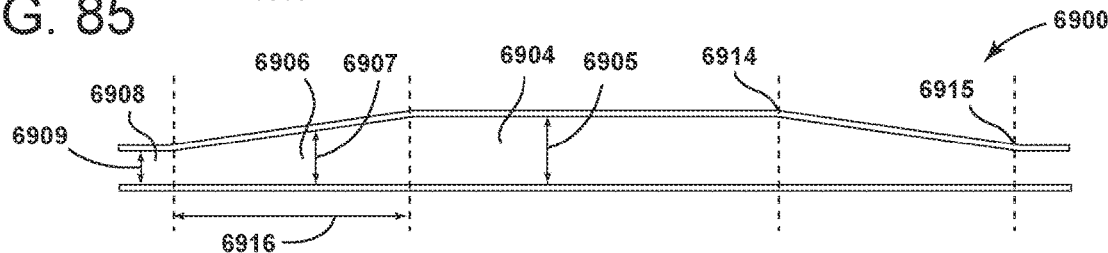
FIG. 86 illustrates a schematic cross section view of an example of the face portion of FIG. 84 taken at lines 86-86 of FIG. 84.
Figure 87:
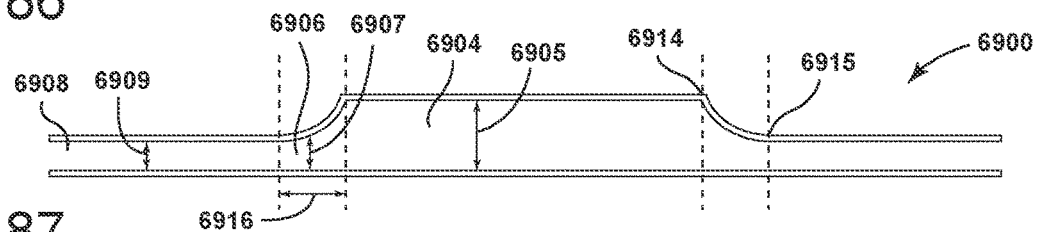
FIG. 87 illustrates a schematic cross section view of an example of the face portion of FIG. 84 taken at lines 87-87 of FIG. 84.
Figure 88:
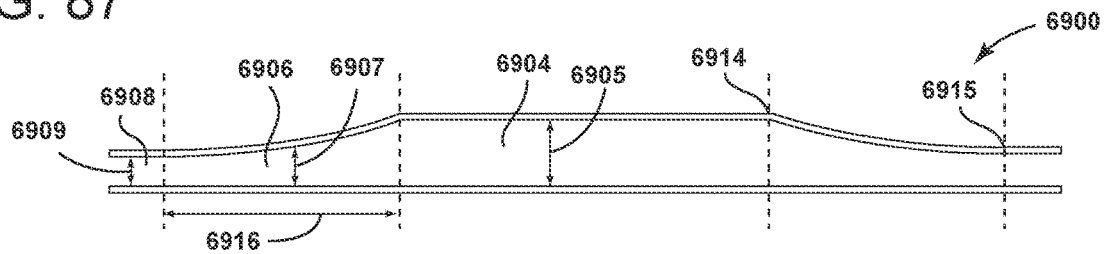
FIG. 88 illustrates a schematic cross section view of an example of the face portion of FIG. 84 taken at lines 88-88 of FIG. 84.

In one example, the variation in the second thickness 6907 may be linear (an example shown in FIG. 85) between the inner perimeter 6914 and the outer perimeter 6915. Alternatively, the variation in the second thickness 6907 may be nonlinear between the inner perimeter 6914 and the outer perimeter 6915. For example, the variation in the second thickness 6907 may be follow a slightly curved s-shaped path (an example shown in FIG. 90). In other words, the second thickness 6907 may follow a slight concave path to curve downward from the first thickness 6905 and then follow a slight convex path to level with the third thickness 6909. The variation in the second thickness 6907 (e.g., various examples shown in FIGS. 85-90) may follow a concave path, a convex path, a compound curve, a stepwise shape, or any linear or nonlinear shape. The variation in the fourth thickness 6911 may also follow a linear path, concave path, a convex path, a compound curvature, a stepwise shape, or any nonlinear shape. For example, the variation in the fourth thickness 6911 may follow a linear path from the third thickness 6909 to the fifth thickness 6913. The variation in the second thickness 6907 and/or the variation in the fourth thickness 6911 may also depend on the method of manufacturing the rear surface 6804 of the face portion 6800. For example, for a face insert portion 6900 that is manufactured by milling or machining, the variation in the second thickness 6907 may depend on the shape and movement patterns of the tip of the machining tool used to manufacture the first transition portion 6906. In another example, the variation in the second thickness 6907 may not be similar at different locations on the first transition portion 6906. For example, the variation in the second thickness 6907 and/or the fourth thickness 6911 may be linear at one portion and curved (e.g., convex or concave) at another portion. The apparatus, methods, and articles of manufacture described herein are not limited in this regard.

In the example of FIGS. 67-73, any variation in the thickness of the face portion 6800 may be defined by variations in a distance by which the rear surface 6804 projects into the interior cavity 6712 of the golf club head 6700 from the front surface 6802), whereas the front surface 6802 of the face portion 6800, which is configured to strike a golf ball, has a generally smooth or uniform surface profile. In other examples, the front surface 6802 may include a plurality of grooves. The apparatus, methods, and articles of manufacture described herein are not limited in this regard.

Figure 71:
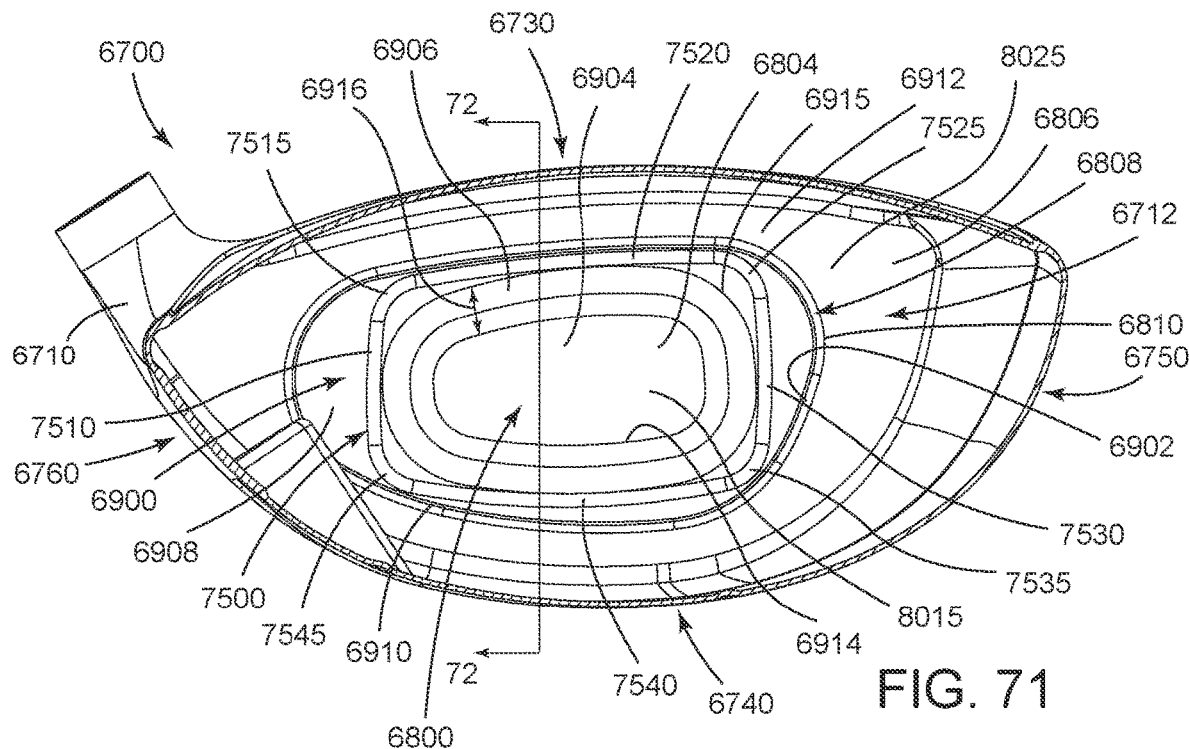
FIG. 71 is cross sectional view of the golf club head of FIG. 67 taken at lines 71-71 of FIG. 69.
Figure 72:
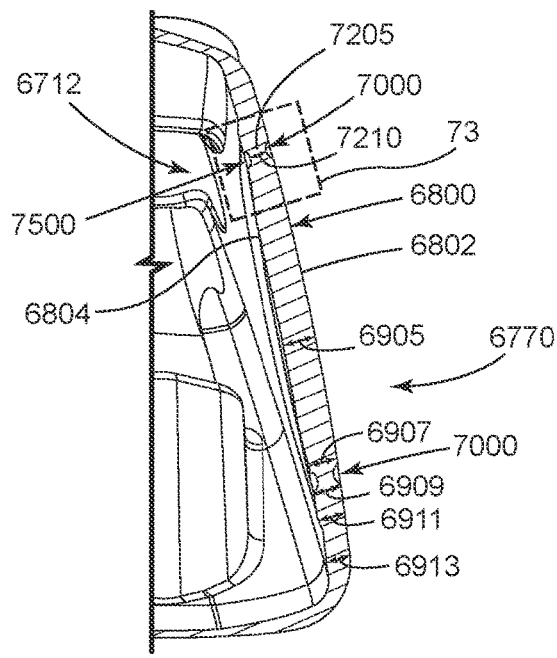
FIG. 72 is cross sectional view of the golf club head of FIG. 67 taken at lines 72-72 of FIG. 71.
Figure 73:
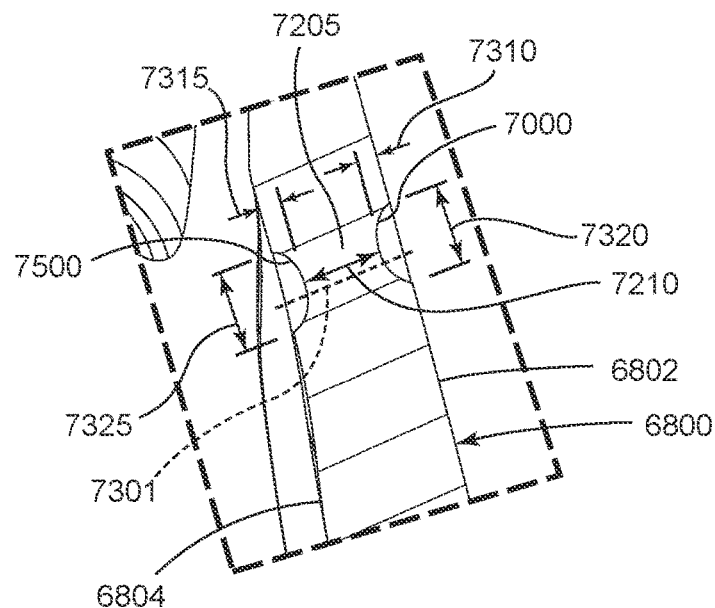
FIG. 73 is an enlarged view of the area specified by reference numeral 73 in FIG. 72.

The first portion 6904 may be located at a center region of the face portion 6800 or at a sweet spot region of the face portion 6800. The sweet spot region may be a region of the face portion 6800 that may provide optimum performance characteristics for the golf club head 6700 when striking a golf ball. The sweet spot region may also represent a region of the face portion 6800 that may have a higher probability of ball strikes than other locations on the face portion 6800. The first portion 6904 may be partially or fully within the sweet spot region, overlap the sweet spot region, and/or envelope the sweet spot region. The shape, size, and/or thickness of the first portion 6904, the second portion 6906, and/or the third portion 6908 may be determined and/or optimized to provide the golf club head 6700 with certain performance characteristics such as a particular range of characteristic time (CT) values, a particular range of coefficient of restitution (COR) values, and/or dampened vibration and sound without compromising the structural integrity of the face portion 6800. The first portion 6904 may have any shape. In one example, as shown in FIG. 71, the first portion 6904 may have a slightly curved or rounded trapezoidal shape that may expand in width (i.e., the dimension between the top portion 6730 and the bottom portion 6740) in a direction toward toe portion 6750. As shown in FIG. 71, the slightly rounded trapezoidal shape of the first portion 6904 may also be slightly rotated or tilted upward toward the toe portion 6750 to generally correspond with the configuration of the face portion 6800 and/or the configuration of the sweet spot. As described further herein, the first portion 6904 may have any shape and size to provide the golf club head 6700 with certain performance characteristics. The apparatus, methods, and articles of manufacture described herein are not limited in this regard.

In one example, as shown in FIG. 71, the first transition portion 6906 may have a constant transition portion width 6916 such that the inner perimeter 6914 and the outer perimeter 6915 have generally the same shape with the inner perimeter 6914 being centered with and nested in the outer perimeter 6915. In other words, the inner perimeter 6914 may be generally parallel with the outer perimeter 6915. The third portion 6908 may surround the first transition portion 6906 and extend from the outer perimeter 6915 to the perimeter edge 6902 of the face insert portion 6900. The apparatus, methods, and articles of manufacture described herein are not limited in this regard.

In one example, an area of the first portion 6904 may be greater than or equal to 0.7 inch$^2$ (451.61 mm$^2$) and less than or equal to 1.6 inch$^2$ (1032.26 mm$^2$). In another example, an area of the first portion 6904 may be greater than or equal to 0.88 inch$^2$ (567.74 mm$^2$) and less than or equal to 1.42 inch$^2$ (916.13 mm$^2$). In yet another example, an area of the first portion 6904 may be greater than or equal to 1.06 inch$^2$ (683.87 mm$^2$) and less than or equal to 1.24 inch$^2$ (800.00 mm$^2$). The area of the first portion 6904 relative to the face insert portion 6900 may be determined to provide certain performance characteristics or optimum performance characteristics for the golf club head 6700. In one example, the area of the first portion 6904 may be greater than or equal to 25% of the area of the face insert portion 6900 and less than or equal to 40% of the area of the face insert portion 6900. In another example, the area of the first portion 6904 may be greater than or equal to 28% of the area of the face insert portion 6900 and less than or equal to 37% of the area of the face insert portion 6900. In yet another example, the area of the first portion 6904 may be greater than or equal to 31% of the area of the face insert portion 6900 and less than or equal to 34% of the area of the face insert portion 6900. The apparatus, methods, and articles of manufacture described herein are not limited in this regard.

In one example, an area of the second portion 6906 may be greater than or equal to 1.0 inch$^2$ (645.16 mm$^2$) and less than or equal to 2.3 inch$^2$ (1483.87 mm$^2$). In another example, an area of the second portion 6906 may be greater than or equal to 1.26 inch$^2$ (812.90 mm$^2$) and less than or equal to 2.04 inch$^2$ (1316.13 mm$^2$). In yet another example, an area of the second portion 6906 may be greater than or equal to 1.52 inch$^2$ (980.64 mm$^2$) and less than or equal to 1.78 inch$^2$ (1148.38 mm$^2$). The area of the second portion 6906 relative to the face insert portion 6900 may be determined to provide certain performance characteristics or optimum performance characteristics for the golf club head 6700. In one example, the area of the second portion 6906 may be greater than or equal to 35% of the area of the face insert portion 6900 and less than or equal to 55% of the area of the face insert portion 6900. In another example, the area of the second portion 6906 may be greater than or equal to 38% of the area of the face insert portion 6900 and less than or equal to 52% of the area of the face insert portion 6900. In yet another example, the area of the second portion 6906 may be greater than or equal to 41% of the area of the face insert portion 6900 and less than or equal to 49% of the area of the face insert portion 6900. The apparatus, methods, and articles of manufacture described herein are not limited in this regard.

In one example, an area of the third portion 6908 may be greater than or equal to 0.5 inch$^2$ (322.58 mm$^2$) and less than or equal to 1.1 inch$^2$ (709.68 mm$^2$). In another example, an area of the third portion 6908 may be greater than or equal to 0.62 inch$^2$ (400.00 mm$^2$) and less than or equal to 0.98 inch$^2$ (632.26 mm$^2$). In yet another example, an area of the third portion 6908 may be greater than or equal to 0.74 inch$^2$ (477.42 mm$^2$) and less than or equal to 0.86 inch$^2$ (554.84 mm$^2$). The area of the third portion 6908 relative to the face insert portion 6900 may be determined to provide certain performance characteristics or optimum performance characteristics for the golf club head 6700. In one example, the area of the third portion 6908 may be greater than or equal to 15% of the area of the face insert portion 6900 and less than or equal to 30% of the area of the face insert portion 6900. In another example, the area of the third portion 6908 may be greater than or equal to 18% of the area of the face insert portion 6900 and less than or equal to 27% of the area of the face insert portion 6900. In yet another example, the area of the third portion 6908 may be greater than or equal to 21% of the area of the face insert portion 6900 and less than or equal to 24% of the area of the face insert portion

6900. The apparatus, methods, and articles of manufacture described herein are not limited in this regard.

In one example, an area of the fourth portion 6910 may be greater than or equal to 0.5 inch$^2$ (322.58 mm$^2$) and less than or equal to 0.9 inch$^2$ (580.64 mm$^2$). In another example, an area of the fourth portion 6910 may be greater than or equal to 0.58 inch$^2$ (374.19 mm$^2$) and less than or equal to 0.82 inch$^2$ (529.03 mm$^2$). In yet another example, an area of the fourth portion 6910 may be greater than or equal to 0.66 inch$^2$ (425.81 mm$^2$) and less than or equal to 0.74 inch$^2$ (477.42 mm$^2$). The apparatus, methods, and articles of manufacture described herein are not limited in this regard.

In one example, an area of the fifth portion 6912 may be greater than or equal to 1.9 inch$^2$ (1225.80 mm$^2$) and less than or equal to 3.3 inch$^2$ (2129.03 mm$^2$). In another example, an area of the fifth portion 6912 may be greater than or equal to 2.18 inch$^2$ (1406.45 mm$^2$) and less than or equal to 3.02 inch$^2$ (1948.38 mm$^2$). In yet another example, an area of the fifth portion 6912 may be greater than or equal to 2.46 inch$^2$ (1587.09 mm$^2$) and less than or equal to 2.74 inch$^2$ (1767.74 mm$^2$). The apparatus, methods, and articles of manufacture described herein are not limited in this regard.

The area of the face insert portion 6900 relative to the area of face portion 6800 may be determined to provide certain performance characteristics or optimum performance characteristics for the golf club head 6700 without compromising the structural integrity of the golf club head 6700. In one example, the area of the face insert portion 6900 may be greater than or equal to 40% of the area of the face portion 6800 and less than or equal to 60% of the area of the face portion 6800. In another example, the area of the face insert portion 6900 may be greater than or equal to 45% of the area of the face portion 6800 and less than or equal to 55% of the area of the face portion 6800. In yet another example, the area of the face insert portion 6900 may be greater than or equal to 48% of the area of the face portion 6800 and less than or equal to 53% of the area of the face portion 6800. The apparatus, methods, and articles of manufacture described herein are not limited in this regard.

Figure 75:
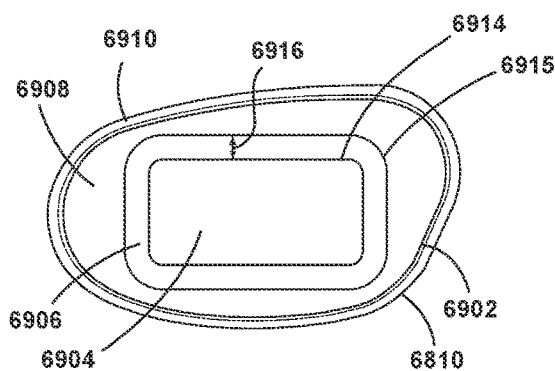
FIGS. 75, 76, 77, 78, 79, 80, 81, 82, 83, and 84 illustrate rear views of different example face portions of an example golf club head according to an embodiment of the apparatus, methods, and articles of manufacture described herein.
Figure 76:
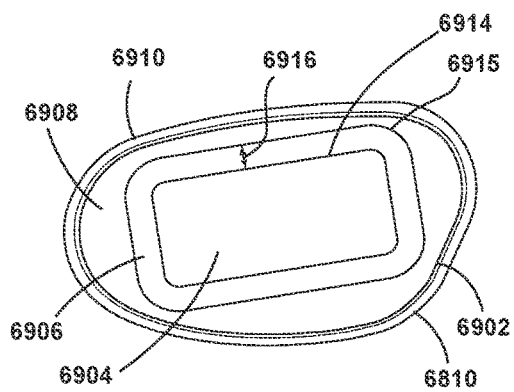

The first portion 6904, the second portion 6906, and/or the third portion 6908 may have any shape to provide certain performance characteristics or optimum performance characteristics for the golf club head 6700. In one example, as shown in FIGS. 75 and 76, the first portion 6904 and the first transition portion 6906 may have a rectangular shape having rounded corners. In one example, as shown in FIGS. 75 and 76, the first transition portion 6906 may have a constant transition portion width 6916 such that the inner perimeter 6914 and the outer perimeter 6915 have generally the same shape and the inner perimeter 6914 is centered and nested in the outer perimeter 6915. In other words, the inner perimeter 6914 may be generally parallel with the outer perimeter 6915. In another example (not shown), the transition portion width 6916 may vary at one of more locations in the first transition portion 6906. In FIG. 76, the shape of the first portion 6904 and the first transition portion 6906 may be elongated and slightly tilted upward relative to the shape and orientation of the first portion 6904 and the first transition portion 6906, respectively, that are shown in FIG. 75. Accordingly, the first portion 6904 and the first transition portion 6906 shown in the example of FIG. 76 may have larger areas than the corresponding parts, respectively, that are shown in FIG. 75. The apparatus, methods, and articles of manufacture described herein are not limited in this regard.

Figure 77:
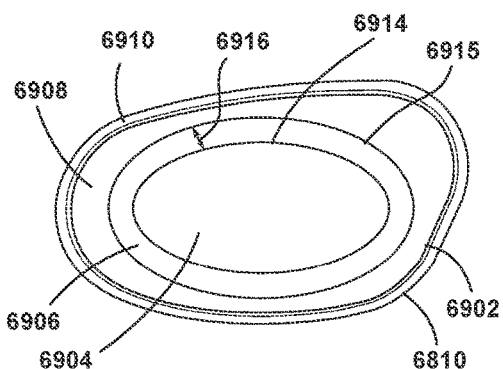
Figure 78:
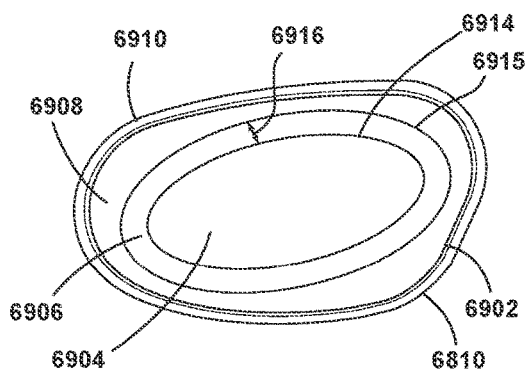

In one example, as shown in FIGS. 77 and 78, the first portion 6904 and the first transition portion 6906 may have an elliptical shape. In one example, as shown in FIGS. 77 and 78, the first transition portion 6906 may have a constant transition portion width 6916 such that the inner perimeter 6914 and the outer perimeter 6915 have generally the same shape and the inner perimeter 6914 is centered and nested in the outer perimeter 6915. In other words, the inner perimeter 6914 may be generally parallel with the outer perimeter 6915. In another example (not shown), the transition portion width 6916 may vary at one of more locations in the first transition portion 6906. In FIG. 78, the elliptical shape of the first portion 6904 and the first transition portion 6906 may be elongated and slightly tilted upward relative to the corresponding shapes, respectively, that are shown in FIG. 77. Accordingly, the first portion 6904 and the first transition portion 6906 shown in the example of FIG. 78 may have larger areas than the corresponding parts, respectively, that are shown in FIG. 77. The apparatus, methods, and articles of manufacture described herein are not limited in this regard.

Figure 79:
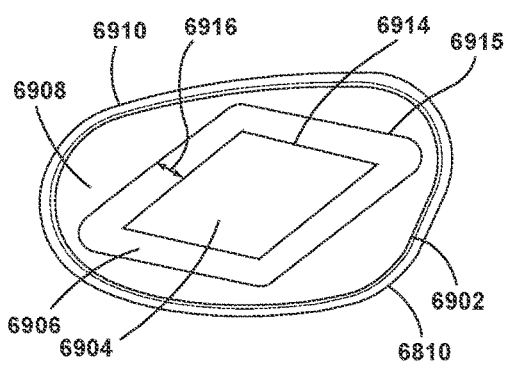

In one example, as shown in FIG. 79, the first portion 6904 and the first transition portion 6906 may have a rhombus-like shape having rounded corners. In one example, as shown in FIG. 79, the first transition portion 6906 may have a constant transition portion width 6916 such that the inner perimeter 6914 and the outer perimeter 6915 have generally the same shape and the inner perimeter 6914 is centered and nested in the outer perimeter 6915. In other words, the inner perimeter 6914 may be generally parallel with the outer perimeter 6915. In another example (not shown), the transition portion width 6916 may vary at one of more locations in the first transition portion 6906. The apparatus, methods, and articles of manufacture described herein are not limited in this regard.

Figure 80:
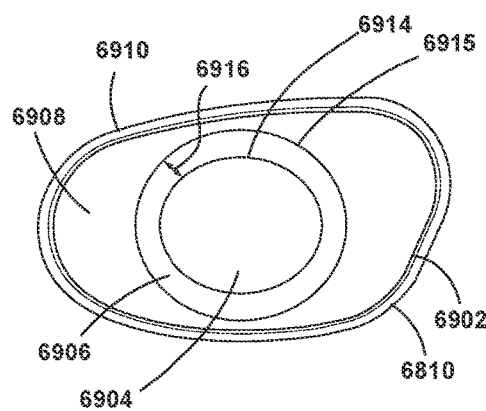

In one example, as shown in 80, the first portion 6904 and/or the first transition portion 6906 may have a circular shape. In one example, as shown in FIG. 80, the first transition portion 6906 may have a constant transition portion width 6916 such that the inner perimeter 6914 and the outer perimeter 6915 have generally the same shape and the inner perimeter 6914 is concentric with the outer perimeter 6915. In other words, the inner perimeter 6914 may be generally parallel with the outer perimeter 6915. In another example (not shown), the transition portion width 6916 may vary at one of more locations in the first transition portion 6906. The apparatus, methods, and articles of manufacture described herein are not limited in this regard.

Figure 81:
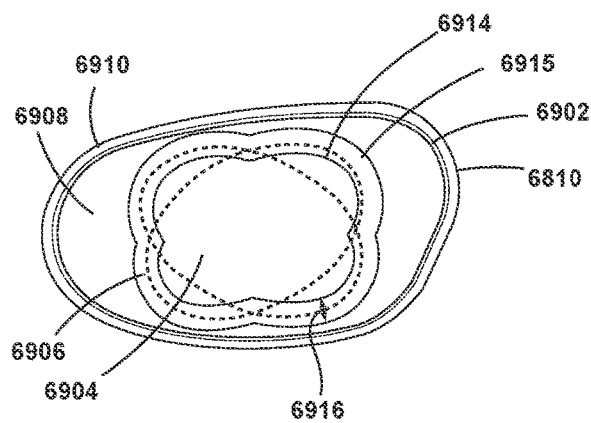
Figure 82:
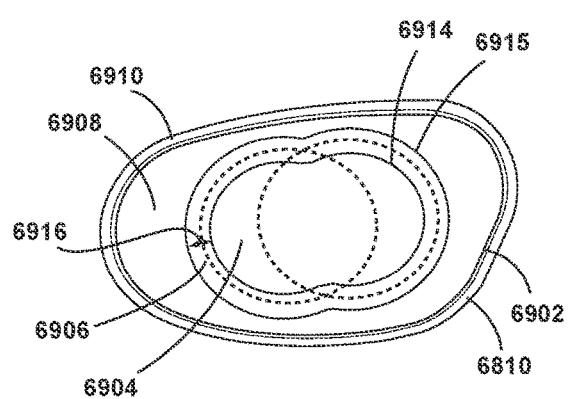

It will be understood that the first portion 6904 and the first transition portion 6906 may have any simple or complex geometric and/or non-geometric shapes. For example, the first portion 6904 and the first transition portion 6906 may have shapes that may be constructed from a combination of simple geometric shapes. In one example, as shown in FIG. 81, the first portion 6904 and the first transition portion 6906 may have a four-lobed shape that may be constructed from a combination of two transversely intersecting elliptical shapes (shown in dashed lines). In the example of FIG. 81, the first transition portion 6906 may have a constant transition portion width 6916 such that the inner perimeter 6914 and the outer perimeter 6915 have generally the same shape and the inner perimeter 6914 is concentric with the outer perimeter 6915. In another example (not shown), the transition portion width 6916 may vary at one of more locations in the first transition portion 6906. In another example, as shown in FIG. 82, the first portion 6904 and the first transition portion 6906 may have a geometric shape that may be similar to a figure eight shape and constructed from a combination of two intersecting circular shapes (shown in dashed lines). In the example of FIG. 82, the first transition portion 6906 may have a constant transition portion width 6916 such that the inner perimeter 6914 and the outer perimeter 6915 have generally the same shape and the inner perimeter 6914 is concentric with the outer perimeter 6915. In another example (not shown), the transition portion width 6916 may vary at one of more locations in the first transition portion 6906. The apparatus, methods, and articles of manufacture described herein are not limited in this regard.

Figure 83:
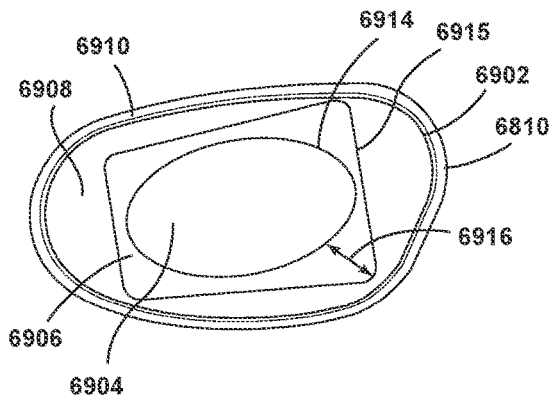
Figure 84:
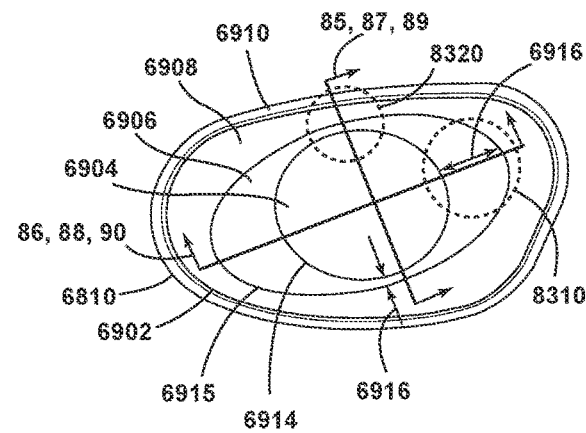

As described herein, the first transition portion 6906 may have a constant transition portion width 6916 such that the inner perimeter 6914 and the outer perimeter 6915 have generally the same shape and the inner perimeter 6914 is concentric with the outer perimeter 6915. In other words, the inner perimeter 6914 may be generally parallel with the outer perimeter 6915. However, the inner perimeter 6914 and the outer perimeter 6915 may have any shape that may result in a variable transition portion width 6916 on the face portion 6800. In one example, as shown in FIG. 83, the inner perimeter 6914 may have an elliptical shape and the outer perimeter 6915 may have a trapezoidal shape. In another example, as shown in FIG. 84, the inner perimeter 6914 may have a circular shape and the outer perimeter 6915 may have an elliptical shape. Accordingly, in the examples of FIGS. 83 and 84, the transition portion width 6916 may vary at different locations on the face portion 6800. The apparatus, methods, and articles of manufacture described herein are not limited in this regard.

Figure 89:
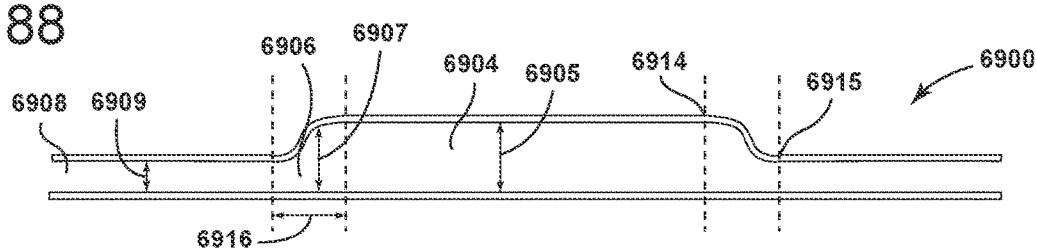
FIG. 89 illustrates a schematic cross section view of an example of the face portion of FIG. 84 taken at lines 89-89 of FIG. 84.
Figure 90:
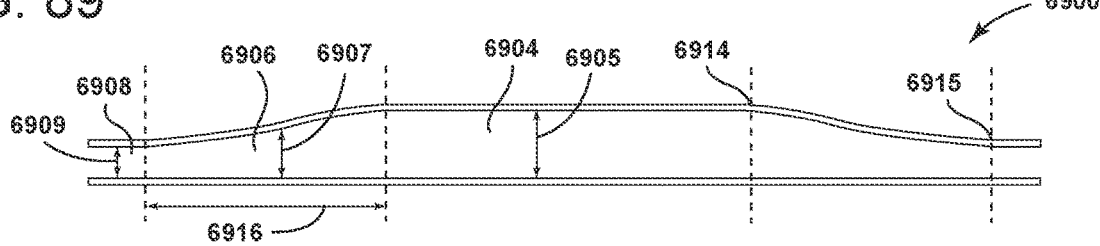
FIG. 90 illustrates a schematic cross section view of an example of the face portion of FIG. 84 taken at lines 90-90 of FIG. 84.

The transition portion thickness 6907 may also vary in profile between the inner perimeter 6914 and the outer perimeter 6915 for any of the configurations of the face insert portion 6900 described herein. For example, with reference to FIGS. 84-86, the transition portion thickness 6907 in region 8310, which has a relatively large transition portion width 6916, may have a linear profile having a smaller slope than a linear profile of the variation in the transition portion thickness 6907 in region 8320, which has a relatively small transition portion width 6916. In other words, the variation in transition portion thickness 6907 is more gradual in region 8310 than the variation in transition portion thickness 6907 in region 8320. In another example, and with reference to FIGS. 84, 87, and 88, the first transition portion 6906 may have a convex thickness profile. Accordingly, the transition portion thickness 6907 in region 8310, which has a relatively large transition portion width 6916, may have a smaller (i.e., shallower) curvature than a curvature of the variation in the transition portion thickness 6907 in region 8320, which has a small transition portion width 6916. In yet another example, as illustrated in FIGS. 84, 89, and 90, the first transition portion 6906 may have an s-shaped curvature. Accordingly, the transition portion thickness 6907 in region 8310, which has a relatively large transition portion width 6916, may have a slight and elongated s-shaped curvature, whereas the transition portion thickness 6907 in region 8320, which has a small transition portion width 6916, may have a relatively sharp and shortened s-shaped curvature. Accordingly, the variation in transition portion thickness 6907 may be more gradual in region 8310 than the variation in the transition portion thickness 6907 in region 8320. Thus, in one example, the rate of change in the transition portion thickness 6907 between the inner perimeter 6914 and the outer perimeter 6915 at any location on the first transition portion 6906 may depend on the magnitude of the transition portion width 6916 and the profile of the variation of the transition portion thickness 6907 (i.e., linear, curved, etc.). In other examples of the face portion 6800, the transition portion thickness 6907 may vary in any manner (not shown) at any location in the first transition portion 6906 to provide certain performance characteristics for the golf club head 6700. The transition portion thickness 6911 may also be configured to have any profile shape as described herein. The apparatus, methods, and articles of manufacture described herein are not limited in this regard.

In one example, the outer face portion 6806 and the face insert portion 6900 may be made from the same material. Referring to FIGS. 67-73, for example, the outer face portion 6806 may be made from titanium or titanium alloy, whereas the face insert portion 6900 may be made from steel. In another example (not shown), the outer face portion 6806 may be made from a composite material, whereas the face insert portion 6900 may be made from one or more metals or metal alloys. In yet another example, the face insert portion 6900 may be made from two or more different materials. For example, the first portion 6904 may be made from steel and the third portion 6908 may be made from titanium or a titanium alloy. The outer face portion 6806 and the face insert portion 6900 may be made from one or more materials to provide certain performance characteristics or optimum performance characteristics for the golf club head 6700. The apparatus, methods, and articles of manufacture described herein are not limited in this regard.

Figure 74:
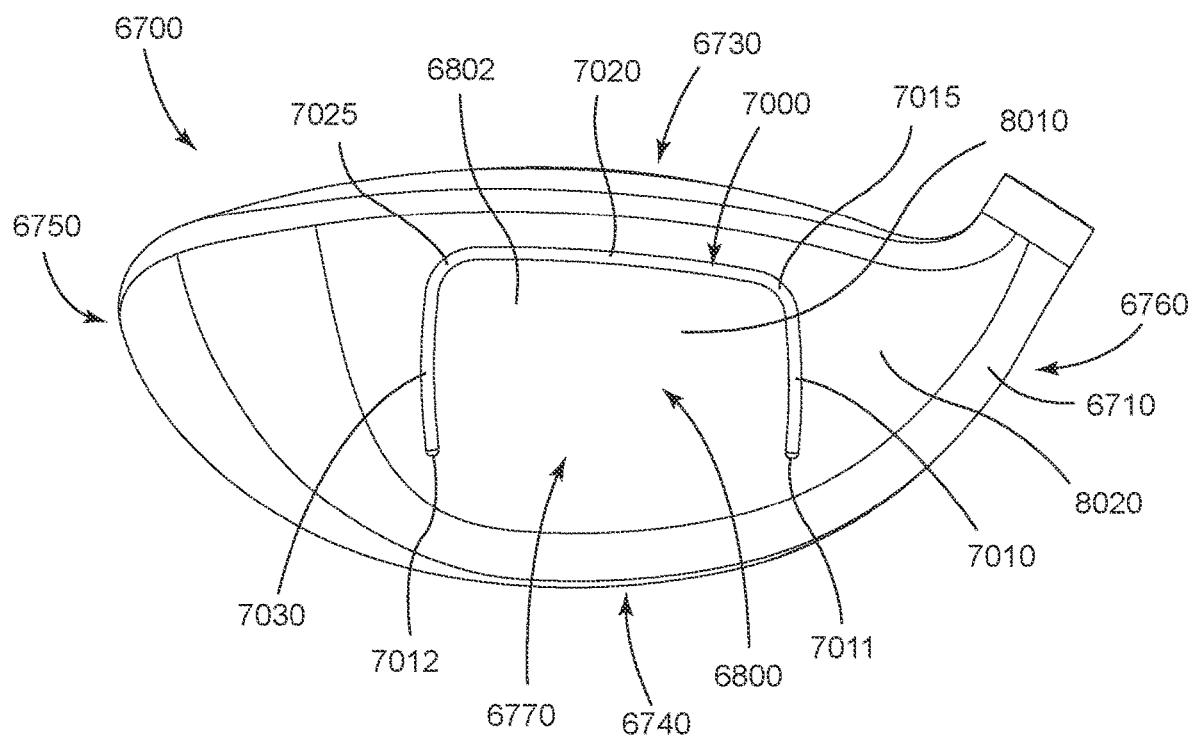
FIG. 74 depicts a front view of the golf club head of FIG. 67 showing an alternative example of a front groove.

In the example of FIGS. 67-73, the front surface 6802 of the face portion 6800 may include a front groove 7000. The front groove 7000 may be formed in the face insert portion 6900, the outer face portion 6806, or a combination thereof. The front groove 7000 may include a first portion 7010, a first transition portion 7015, a second portion 7020, a second transition portion 7025, a third portion 7030, a third transition portion 7035, a fourth portion 7040, and a fourth transition portion 7045. The first portion 7010 may be located closer to the heel portion 6760 than the toe portion 6750 and may extend vertically or substantially vertically across the front surface 6802 between the top portion 6730 and the bottom portion 6740. The second portion 7020 may be located closer to the top portion 6730 than the bottom portion 6740 and may extend horizontally or substantially horizontally across the front surface 6802 between the toe portion 6750 and the heel portion 6760. The third portion 7030 may be located closer to the toe portion 6750 than the heel portion 6760 and may extend vertically or substantially vertically across the front surface 6802 between the top portion 6730 and the bottom portion 6740. The fourth portion 7040 may be located closer to the bottom portion 6740 than the top portion 6730 and may extend horizontally or substantially horizontally between the toe portion 6750 and the heel portion 6760. The first transition portion 7015 may extend from the first portion 7010 to the second portion 7020 and may be arcuate or curved. The second transition portion 7025 may extend from the second portion 7020 to the third portion 7030 and may be arcuate or curved. The third transition portion 7035 may extend from the third portion 7030 to the fourth portion 7040 and may be arcuate or curved. The fourth transition portion 7045 may extend from the fourth portion 7040 to the first portion 7010 and may be arcuate or curved. Accordingly, the front groove 7000 may extend continuously about a central portion of the face portion 6800 (e.g., including the sweet spot) without having any sharp corners (e.g., 90 degree corners) to prevent stress concentration regions at or near any portion of the front groove 7000. In another example (not shown), the front groove 7000 may extend proximate to a perimeter of the front surface 6802 of the face portion 6800 and generally follow the contour of the perimeter of the face portion 6800. In yet another example, as illustrated in FIG. 74, the front groove 7000 may be discontinuous and is exemplarily shown without the fourth portion 7040, the third transition portion 7035, and the fourth transition portion 7045. Accordingly, the front groove 7000 may have one or more segments and one or more terminal ends. In the example of FIG. 74, the front groove 7000 is configured as a single segment and the first portion 7010 and the third portion 7030 may each include a terminal end 7011 and 7012, respectively. The apparatus, methods, and articles of manufacture described herein are not limited in this regard.

In the example of FIGS. 67-73, the front groove 7000 may define an inner area portion 8010 and an outer area portion 8020 of the face portion 6800. The inner area portion 8010 may include a portion of the face portion 6800 that generally strikes a golf ball and the outer area portion 8020 may define a peripheral portion of the face portion 6800. Accordingly, the inner area portion 8010 may include one or more of the first portion 6904, the second portion 6906, and the third portion 6908 of the face insert portion 6900 and the front groove 7000 may enclose at least the first portion 6904 of the face insert portion 6900. Further, the front groove 7000 may provide a relatively thinner part of the face portion 6800 as compared to the remaining parts of the face portion 6800. Accordingly, the front groove 7000 may provide enhanced deflection of the inner area portion 8010 relative to the outer area portion 8020 as compared to the face portion 6800 without the front groove 7000. In other words, the front groove 7000 may provide a trampoline effect for the inner area portion 8010 of the face portion 6800. The enhanced deflection of the inner area portion 8010 may provide enhanced rebounding of the inner area portion 8010 during impact with a golf ball, which may increase ball speed and/or carry distance. In the example shown in FIG. 74, the front groove 7000 may promote enhanced rebounding of an upper portion of the inner area portion 8010 during impact with a golf ball, which may create higher launch and/or lower spin. The apparatus, methods, and articles of manufacture described herein are not limited in this regard.

As described herein, to eliminate or reduce stress concentration regions in or around the front groove 7000, any portion of the front groove 7000 may be arcuate or curved when changing directions. In the example of FIGS. 67-73, the front groove 7000 may have an oblong shape with rounded corners corresponding to the first transition portion 7015, the second transition portion 7025, the third transition portion 7035, and the fourth transition portion 7045. In the example of FIG. 74, the front groove 7000 may have an inverted U-shape with rounded terminal ends 7011 and 7012 that may or may not be similar in many respects to the first end portion 3502 and the second end portion 3510 shown in FIG. 35. In yet another example, the front groove 7000 may be configured according to any of the groove examples described herein including those shown in FIGS. 35, 36, and 43-66. The apparatus, methods, and articles of manufacture described herein are not limited in this regard.

In the example of FIGS. 67-73, the rear surface 6804 of the face portion 6800 may include a back groove 7500 in lieu of, or in addition to, the front groove 7000. The back groove 7500 may be formed in the face insert portion 6900, the outer face portion 6806, or a combination thereof. The back groove 7500 may be configured similarly to the front groove 7000 shown in FIG. 67 or FIG. 74 or may be configured according to any of the groove examples described herein including those shown in FIGS. 35, 36, and 43-66. In the illustrated example, the back groove 7500 may include a first portion 7510, a first transition portion 7515, a second portion 7520, a second transition portion 7525, a third portion 7530, a third transition portion 7535, a fourth portion 7540, and a fourth transition portion 7545. The first portion 7510 may be located closer to the heel portion 6760 than the toe portion 6750 and may extend vertically or substantially vertically across the rear surface 6804 between the top portion 6730 and the bottom portion 6740. The second portion 7520 may be located closer to the top portion 6730 than the bottom portion 6740 and may extend horizontally or substantially horizontally across the rear surface 6804 between the toe portion 6750 and the heel portion 6760. The third portion 7530 may be located closer to the toe portion 6750 than the heel portion 6760 and may extend vertically or substantially vertically across the rear surface 6804 between the top portion 6730 and the bottom portion 6740. The fourth portion 7540 may be located closer to the bottom portion 6740 than the top portion 6730 and may extend horizontally or substantially horizontally across the rear surface 6804 between the toe portion 6750 and the heel portion 6760. The first transition portion 7515 may extend from the first portion 7510 to the second portion 7520 and may be arcuate or curved. The second transition portion 7525 may extend from the second portion 7520 to the third portion 7530 and may be arcuate or curved. The third transition portion 7535 may extend from the third portion 7530 to the fourth portion 7540 and may be arcuate or curved. The fourth transition portion 7545 may extend from the fourth portion 7540 to the first portion 7510 and may be arcuate or curved. Accordingly, the back groove 7500 may extend continuously about a central portion of the face portion 6800 (e.g., including the sweet spot) without having any sharp corners (e.g., 90 degree corners) to prevent stress concentration regions at or near any portion of the back groove 7500. The apparatus, methods, and articles of manufacture described herein are not limited in this regard.

The back groove 7500 may define an inner area portion 8015 and an outer area portion 8025 of the face portion 6800. The inner area portion 8015 may include a portion of the face portion 6800 that generally strikes a golf ball and may coincide with the inner area portion 8015 defined by the front groove 7000. Likewise, the outer area portion 8025 may include a peripheral portion of the face portion 6800 and may coincide with the outer area portion 8020 defined by the front groove 7000. Accordingly, the inner area portion 8015 may include one or more of the first portion 6904, the second portion 6906, and the third portion 6908 of the face insert portion 6900 and the back groove 7500 may enclose at least the first portion 6904 of the face insert portion 6900. Further, the back groove 7500 may provide a relatively thinner part of the face portion 6800 as compared to the remaining parts of the face portion 6800. Accordingly, the back groove 7500 may provide enhanced deflection of the inner area portion 8015 relative to the outer area portion 8025 as compared to the face portion 6800 without the back groove 7500. In other words, the back groove 7500 may provide a trampoline effect for the inner area portion 8015 of the face portion 6800. The enhanced deflection of the inner area portion 8015 may provide enhanced rebounding of the inner area portion 8015 during impact with a golf ball, which may increase ball speed and/or carry distance. The apparatus, methods, and articles of manufacture described herein are not limited in this regard.

In the example of FIGS. 67-73, the back groove 7500 may mirror the front groove 7000 about the face portion 6800

(i.e., shape and location symmetry about the face portion 6800), or in other words, the back groove 7500 may be superimposable with the front groove 7000. Accordingly, the back groove 7500 and the front groove 7000 may be aligned on opposing surfaces (i.e., front surface 6802 and the rear surface 6804) of the face portion 6800 such that a line (e.g., broken line 7301) extending perpendicular or near perpendicular to the face portion 6800 and extending through any portion of the front groove 7000 may also extend through a similar portion of the back groove 7500. Accordingly, the back groove 7500 may have an oblong shape with rounded corners and a groove length that is the same or about the same as a groove length of the front groove 7000. The back groove 7500 may be aligned with the front groove 7000 to define a groove substrate portion 7205 corresponding to a thin portion of the face portion 6800 separating the front groove 7000 from the back groove 7500 and in which the front groove 7000 and the back groove 7500 are located. The groove substrate portion 7205 may have a substrate thickness 7210 ($S_t$) that is less than one or more face portion 6800 thicknesses including the first thickness 6905, the second thickness 6907, the third thickness 6909, the fourth thickness 6911, and the fifth thickness 6913 ($S_t<T_1$; $S_t<T_2$; $S_t<T_3$; $S_t<T_4$; and/or $S_t<T_5$). The substrate thickness 7210 may be determined and/or optimized to provide enhanced deflection of inner area portions 8010 and 8015 without compromising the structural integrity of the face portion 6800. Inner area portions 8010 and 8015 may coincide with one another and the front groove 7000 and the back groove 7500 may provide enhanced deflection and rebounding of the inner area portions 8010 and 8015 during impact with a golf ball, which may further increase ball speed and/or carry distance compared to a golf club head employing only one of the front groove 7000 and the back groove 7500. In another example, the back groove 7500 may not be superimposable with the front groove 7000 and define an inner area 8015 that is larger than the inner area 8010 defined by the front groove 7000. In another example, the back groove 7500 may not be superimposable with the front groove 7000 and define an inner area 8015 that is smaller than the inner area 8010 defined by the front groove 7000. In yet another example, one or more portions of the back groove 7500 and the front groove 7000 may be superimposable whereas other portions of the back groove 7500 and the front groove 700 may not be superimposed. The apparatus, methods, and articles of manufacture described herein are not limited in this regard.

In the example of FIGS. 67-73, the front groove 7000 and/or the back groove 7500 may be formed in the face insert portion 6900. In one example, the front groove 7000 and/or the back groove 7500 may enclose at least the first portion 6904 of the face insert portion 6900. In one example, the front groove 7000 and/or the back groove 7500 may enclose the first portion 6904 and may partially overlap with the second portion 6906 and the third portion 6908 of the face insert portion 6900. In another example, the front groove 7000 and/or the back groove 7500 may enclose the first portion 6904 and the second portion 6906 of the face insert portion 6900 and may overlap with the third portion 6908. In yet another example, the front groove 7000 and/or the back groove 7500 may be formed in the outer face portion 6806 and may enclose the face insert portion 6900. The dimensions of the front groove 7000 and the back groove 7500 may be determined considering a thickness of the face portion 6800, material properties of the face portion 6800, the method by which the face portion 6800 is manufactured, and/or a broad range of deflections to which the face portion 6800 may be subjected with repeated golf ball strikes. In one example, the face portion 6800 may have a uniform or variable thickness greater than or equal to 0.090 inch (2.286 mm) and less than or equal to 0.150 inch (3.81 mm). The front groove 7000 and/or the back groove 7500 may have a uniform or variable groove depth (e.g., shown as groove depths 7310 and 7315, respectively) greater than or equal to 0.008 inch (0.2032 mm) and less than or equal to 0.016 inch (0.4064 mm). In one example, the front groove 7000 and/or the back groove 7500 may have a uniform or variable groove width (e.g., shown as groove widths 7320 and 7325, respectively) greater than or equal to 0.050 inch (1.27 mm) and less than or equal to 0.100 inch (2.54 mm). In another example, any of the groove depths 7310 and 7315 may be similar to the groove depth of any of the front grooves or back grooves described herein such as any of the grooves illustrated in FIGS. 13, 35-38, and 43-66. In yet another example, any of the groove widths 7320 and 7325 may be similar to the groove widths of any of the front grooves or back grooves described herein such as any of the grooves illustrated in FIGS. 13, 35-38, and 43-66. The apparatus, methods, and articles of manufacture described herein are not limited in this regard.

Figure 91:
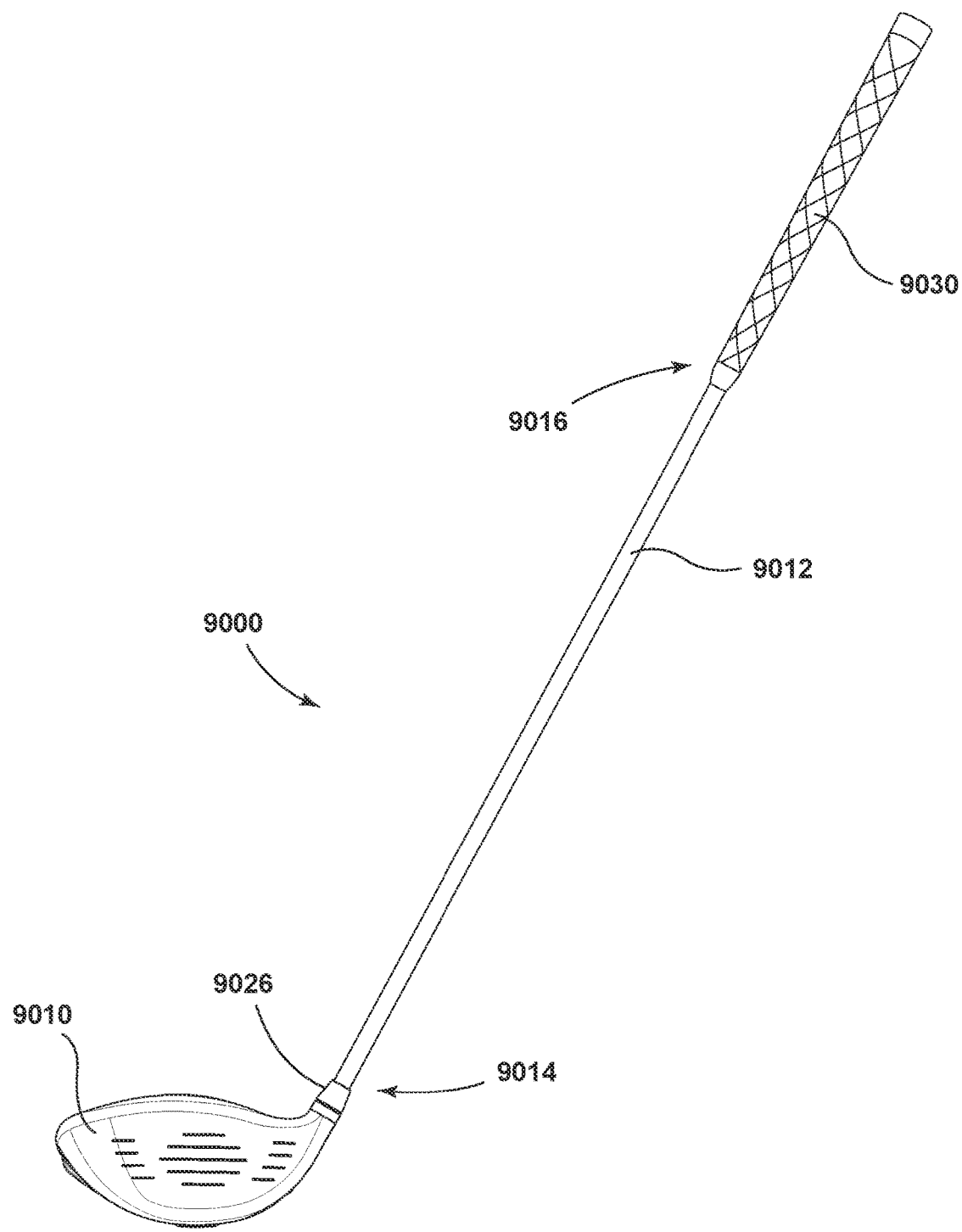
FIG. 91 illustrates a golf club including a golf club head according to any of the embodiments of the apparatuses, methods, and articles of manufacture described herein.

Any of the golf club heads described herein may be part of a golf club. In one example, as shown in FIG. 91, a golf club 9000, which may include any of the golf club heads described herein, may include a shaft 9012 extending from golf club head 9010. The shaft 9012 may have a first end 9014 or first end portion 9014 (a first end portion 9014 of the shaft is shown in FIG. 91) attached to a hosel 9026 of the golf club head 9010 and a second end 9016 or a second end portion 9016 (a second end portion 9016 of the shaft is shown in FIG. 91) opposite the first end 9014. The golf club 9000 may include a grip 9030 at or proximate to the second end 9016 of the shaft 9012. The shaft 9012 may be formed from metal material, composite material, or any other suitable material or combination of materials. The grip 9030 may be formed from rubber material, polymer material, or any other suitable material or combination of materials. The apparatus, methods, and articles of manufacture described herein are not limited in this regard.

While each of the above examples may describe a certain type of golf club head, the apparatus, methods, and articles of manufacture described herein may be applicable to other types of golf club heads (e.g., a driver-type golf club head, a fairway wood-type golf club head, a hybrid-type golf club head, an iron-type golf club head, a putter-type golf club head, etc.).

Procedures defined by golf standard organizations and/or governing bodies such as the United States Golf Association (USGA) and/or the Royal and Ancient Golf Club of St. Andrews (R&A) may be used for measuring the club head volume of any of the golf club heads described herein. For example, a club head volume may be determined by using the weighted water displacement method (i.e., Archimedes Principle). Although the figures may depict particular types of club heads (e.g., a driver-type club head or iron-type golf club head), the apparatus, methods, and articles of manufacture described herein may be applicable to other types of club head (e.g., a fairway wood-type club head, a hybrid-type club head, a putter-type club head, etc.). Accordingly, any golf club head as described herein may have a volume that is within a volume range corresponding to certain type of golf club head as defined by golf governing bodies. A driver-type golf club head may have a club head volume of greater than or equal to 300 cubic centimeters ($cm^3$ or cc). In another example, a driver-type golf club head may have a club head volume of 460 cc. A fairway wood golf club head may have a club head volume of between 100 cc and 300 cc. In one example, a fairway wood golf club head may have a club head volume of 180 cc. An iron-type golf club head may have a club head volume of between 25 cc and 100 cc. In one example, an iron-type golf club head may have a volume of 50 cc. Any of the golf clubs described herein may have the physical characteristics of a certain type of golf club (i.e., driver, fairway wood, iron, etc.), but have a volume that may fall outside of the above-described ranges. The apparatus, methods, and articles of manufacture described herein are not limited in this regard.

Any of the golf club heads and/or golf clubs described herein may include one or more sensors (e.g., accelerometers, strain gauges, etc.) for sensing linear motion (e.g., acceleration) and/or forces in all three axes of motion and/or rotational motion (e.g., angular acceleration) and rotational forces about all three axes of motion. In one example, the one or more sensors may be internal sensors that may be located inside the golf club head, the hosel, the shaft, and/or the grip. In another example, the one or more sensors may be external sensors that may be located on the grip, on the shaft, on the hosel, and/or on the golf club head. In yet another example, the one or more sensors may be external sensors that may be attached by an individual to the grip, to the shaft, to the hosel, and/or to the golf club head. In one example, data collected from the sensors may be used to determine any one or more design parameters for any of the golf club heads and/or golf clubs described herein to provide certain performance or optimum performance characteristics. In another example, data from the sensors may be collected during play to assess the performance of an individual. The apparatus, methods, and articles of manufacture described herein are not limited in this regard.

Any of the apparatus, methods, or articles of manufacture described herein may include one or more visual identifiers such as alphanumeric characters, colors, images, symbols, logos, and/or geometric shapes. For example, one or more visual identifiers may be manufactured with one or more portions of a golf club such as the golf club head (e.g., casted or molded with the golf club head), painted on the golf club head, etched on the golf club (e.g., laser etching), embossed on the golf club head, machined onto the golf club head, attached as a separate badge or a sticker on the golf club head (e.g., adhesive, welding, brazing, mechanical lock(s), any combination thereof, etc.), or any combination thereof. The visual identifier may be made from the same material as the golf club head or a different material than the golf club head (e.g., a plastic badge attached to the golf club head with an adhesive). Further, the visual identifier may be associated with manufacturing and/or brand information of the golf club head, the type of golf club head, one or more physical characteristics of the golf club head, or any combination thereof. In particular, a visual identifier may include a brand identifier associated with a manufacturer of the golf club (e.g., trademark, trade name, logo, etc.) or other information regarding the manufacturer. In addition, or alternatively, the visual identifier may include a location (e.g., country of origin), a date of manufacture of the golf club or golf club head, or both.

The visual identifier may include a serial number of the golf club or golf club head, which may be used to check the authenticity to determine whether or not the golf club or golf club head is a counterfeit product. The serial number may also include other information about the golf club that may be encoded with alphanumeric characters (e.g., country of origin, date of manufacture of the golf club, or both). In another example, the visual identifier may include the category or type of the golf club head (e.g., 5-iron, 7-iron, pitching wedge, etc.). In yet another example, the visual identifier may indicate one or more physical characteristics of the golf club head, such as one or more materials of manufacture (e.g., visual identifier of "Titanium" indicating the use of titanium in the golf club head), loft angle, face portion characteristics, mass portion characteristics (e.g., visual identifier of "Tungsten" indicating the use of tungsten mass portions in the golf club head), interior cavity and filler material characteristics (e.g., one or more abbreviations, phrases, or words indicating that the interior cavity is filled with a polymer material), any other information that may visually indicate any physical or play characteristic of the golf club head, or any combination thereof. Further, one or more visual identifiers may provide an ornamental design or contribute to the appearance of the golf club, or the golf club head.

Any of the golf club heads described herein may be manufactured by casting from metal such as steel. However, other techniques for manufacturing a golf club head as described herein may be used such as 3D printing or molding a golf club head from metal or non-metal materials such as ceramics.

All methods described herein may be performed in any suitable order unless otherwise indicated herein or otherwise clearly contradicted by context. Although a particular order of actions may be described herein with respect to one or more processes, these actions may be performed in other temporal sequences. Further, two or more actions in any of the processes described herein may be performed sequentially, concurrently, or simultaneously.

The terms "and" and "or" may have both conjunctive and disjunctive meanings. The terms "a" and "an" are defined as one or more unless this disclosure indicates otherwise. The term "coupled," and any variation thereof, refers to directly or indirectly connecting two or more elements chemically, mechanically, and/or otherwise. The phrase "removably connected" is defined such that two elements that are "removably connected" may be separated from each other without breaking or destroying the utility of either element.

The term "substantially" when used to describe a characteristic, parameter, property, or value of an element may represent deviations or variations that do not diminish the characteristic, parameter, property, or value that the element may be intended to provide. Deviations or variations in a characteristic, parameter, property, or value of an element may be based on, for example, tolerances, measurement errors, measurement accuracy limitations and other factors. The term "proximate" is synonymous with terms such as "adjacent," "close," "immediate," "nearby," "neighboring," etc., and such terms may be used interchangeably as appearing in this disclosure.

Recitation of ranges of values herein is merely intended to serve as a shorthand method of referring individually to each separate value falling within the range. Unless otherwise indicated herein, each individual value is incorporated into the specification as if it were individually recited herein. A numerical range defined using the word "between" includes numerical values at both end points of the numerical range. A spatial range defined using the word "between" includes any point within the spatial range and the boundaries of the spatial range. A location expressed relative to two spaced apart or overlapping elements using the word "between" includes (i) any space between the elements, (ii) a portion of each element, and/or (iii) the boundaries of each element.

The use of any and all examples, or exemplary language (e.g., "such as") provided herein is intended merely for clarification and does not pose a limitation on the scope of the present disclosure. No language in the specification should be construed as indicating any non-claimed element essential to the practice of any embodiments discussed herein.

Groupings of alternative elements or embodiments disclosed herein are not to be construed as limitations. Each group member may be referred to and claimed individually or in any combination with other members of the group or other elements disclosed herein. One or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

While different features or aspects of an embodiment may be described with respect to one or more features, a singular feature may comprise multiple elements, and multiple features may be combined into one element without departing from the scope of the present disclosure. Further, although methods may be disclosed as comprising one or more operations, a single operation may comprise multiple steps, and multiple operations may be combined into one step without departing from the scope of the present disclosure.

The apparatus, methods, and articles of manufacture described herein may be implemented in a variety of embodiments, and the foregoing description of some of these embodiments does not necessarily represent a complete description of all possible embodiments. Instead, the description of the drawings, and the drawings themselves, disclose at least one embodiment, and may disclosure alternative embodiments.

As the rules of golf may change from time to time (e.g., new regulations may be adopted or old rules may be eliminated or modified by golf standard organizations and/or governing bodies such as the USGA, the R&A, etc.), golf equipment related to the apparatus, methods, and articles of manufacture described herein may be conforming or non-conforming to the rules of golf at any particular time. Accordingly, golf equipment related to the apparatus, methods, and articles of manufacture described herein may be advertised, offered for sale, and/or sold as conforming or non-conforming golf equipment. The apparatus, methods, and articles of manufacture described herein are not limited in this regard.

Further, while the above examples may be described with respect to golf clubs, the apparatus, methods and articles of manufacture described herein may be applicable to other suitable types of sports equipment such as a fishing pole, a hockey stick, a ski pole, a tennis racket, etc.

Although certain example apparatus, methods, and articles of manufacture have been described herein, the scope of coverage of this disclosure is not limited thereto. On the contrary, this disclosure covers all apparatus, methods, and articles of articles of manufacture fairly falling within the scope of the appended claims either literally or under the doctrine of equivalents.

What is claimed is:

1. A golf club head comprising:
   a body portion having a toe portion, a heel portion, a top portion, a bottom portion, a front portion, and a rear portion;
   a face portion at the front portion, the face portion comprising:
      an outer face portion surrounding a face opening, the outer face portion defining a peripheral portion of the face portion;
      a face insert portion coupled to the outer face portion to close the face opening, the face insert portion comprising:
         a first portion at a center region of the face portion, the first portion having a first thickness;
         a second portion adjacent and surrounding the first portion, the second portion having a second thickness different from the first thickness; and
         a third portion adjacent and surrounding the second portion, the third portion having a third thickness different from the first thickness and the second thickness, the first, second, and third portions defining an inner area portion of the face portion for striking a golf ball;
      a front groove located at a front surface of the face insert portion, the front groove comprising:
         a first portion located toward the heel portion and extending vertically or substantially vertically across the front surface;
         a second portion located toward the top portion and extending horizontally or substantially horizontally across the front surface; and
         a third portion located toward the toe portion and extending vertically or substantially vertically across the front surface;
         a first transition portion connecting the first portion of the front groove to the second portion of the front groove; and
         a second transition portion connecting the second portion of the front groove to the third portion of the front groove; and
      a back groove located at a rear surface of the face insert portion, the back groove comprising:
         a first portion located toward the heel portion and extending vertically or substantially vertically across the rear surface;
         a second portion located toward the top portion and extending horizontally or substantially horizontally across the rear surface;
         a third portion located toward the toe portion and extending vertically or substantially vertically across the rear surface;
         a fourth portion located toward the bottom portion and extending horizontally or substantially horizontally across the rear surface;
         a first transition portion connecting the first portion of the back groove to the second portion of the back groove;
         a second transition portion connecting the second portion of the back groove to the third portion of the back groove;
         a third transition portion connecting the third portion of the back groove to the fourth portion of the back groove; and
         a fourth transition portion connecting the fourth portion of the back groove to the first portion of the back groove,
   wherein the front groove and the back groove are each formed in the face insert portion, and
   wherein the front groove partially encloses at least the first portion of the face insert portion, and
   wherein the back groove fully encloses at least the first portion of the face insert portion, and wherein the front groove and the back groove each partially overlaps with the second portion and the third portion.

2. A golf club head as defined in claim 1, wherein the first portion of the front groove and the third portion of the front groove each include a terminal end.

3. A golf club head as defined in claim 1, wherein at least a portion of the front groove is superimposable with at least a portion of the back groove.

4. A golf club head as defined in claim 1, wherein the first thickness is greater than the third thickness, and wherein the second thickness varies between the first thickness and the third thickness.

5. A golf club head as defined in claim 1, configured as a driver-type golf club head.

6. A golf club head as defined in claim 1, wherein an area of the first portion is greater than or equal to 25% of an area of the face insert portion and less than or equal to 40% of the area of the face insert portion, wherein an area of the second portion is greater than or equal to 35% of the area of the face insert portion and less than or equal to 55% of the area of the face insert portion, and wherein an area of the third portion is greater than or equal to 15% of the area of the face insert portion and less than or equal to 30% of the area of the face insert portion.

7. A golf club head as defined in claim 1, the face portion further comprising a fourth portion having a fourth thickness, the fourth portion defining a connective portion between a perimeter edge of the face insert portion and a perimeter edge of the face opening, wherein the outer face portion has a fifth thickness, wherein the fourth thickness is different from the fifth thickness, and wherein the first, second, and third thicknesses are greater than the fifth thickness.

8. A golf club head comprising:
a front portion including a face portion, the face portion comprising:
an outer face portion surrounding a face opening, the outer face portion defining a peripheral portion of the face portion;
a face insert portion coupled to the outer face portion to close the face opening, the face insert portion comprising:
a first portion at a center region of the face portion, the first portion having a first thickness;
a second portion adjacent and surrounding the first portion, the second portion having a second thickness different from the first thickness; and
a third portion adjacent and surrounding the second portion, the third portion having a third thickness different from the first thickness and the second thickness, the first, second, and third portions defining an inner area portion of the face portion for striking a golf ball;
a front groove located at a front surface of the face insert portion and partially enclosing the first portion of the face insert portion; and
a back groove located at a rear surface of the face insert portion and fully enclosing the first portion of the face insert portion,
wherein the first thickness is greater than the third thickness,
wherein the second thickness varies between the first thickness and the third thickness,
wherein the front groove has a first shape,
wherein the back groove has a second shape different from the first shape, and
wherein the front groove and the back groove each partially overlaps with the second portion of the face insert portion and the third portion of the face insert portion.

9. A golf club head as defined in claim 8, wherein at least a portion of the front groove is superimposable with at least a portion of the back groove.

10. A golf club head as defined in claim 8, wherein the front groove includes at least one discontinuity.

11. A golf club head as defined in claim 8, wherein the back groove extends continuously.

12. A golf club head as defined in claim 8, wherein a face portion thickness between the front groove and the back groove is less than each of the first thickness, the second thickness, and the third thickness.

13. A golf club head as defined in claim 8, wherein the front groove has a uniform groove depth and a uniform groove width.

14. A golf club head as defined in claim 8, wherein the back groove has a uniform groove depth and a uniform groove width.

15. A golf club head comprising:
a front portion including a face portion, the face portion comprising:
an inner area portion for striking a golf ball, the inner area portion comprising:
a first portion at a sweet spot region of the face portion, the first portion having a first thickness;
a second portion adjacent and surrounding the first portion, the second portion having a second thickness different from the first thickness; and
a third portion adjacent and surrounding the second portion, the third portion having a third thickness different from the first thickness and the second thickness;
an outer area portion enclosing the inner area portion, the outer area portion defining a peripheral portion of the face portion;
a front groove having an inverted U-shape located at a front surface of the inner area portion; and
a back groove having an oblong shape located at a rear surface of the inner area portion,
wherein the front groove and the back groove each at least partially enclose the first portion of the face portion, and
wherein the front groove and the back groove each partially overlaps with at least the third portion of the face portion.

16. A golf club head as defined in claim 15, wherein at least a portion of the front groove is superimposable with at least a portion of the back groove.

17. A golf club head as defined in claim 15, wherein the front groove partially overlaps with the second portion of the face portion.

18. A golf club head as defined in claim 15, wherein the back groove partially overlaps with the second portion of the face portion.

19. A golf club head as defined in claim 15, wherein the front groove has a uniform groove depth and a uniform groove width, and wherein the back groove has a uniform groove depth and a uniform groove width.

20. A golf club head as defined in claim 15, wherein a face portion thickness between the front groove and the back groove is less than each of the first thickness, the second thickness, and the third thickness.

* * * * *

UNITED STATES PATENT AND TRADEMARK OFFICE
CERTIFICATE OF CORRECTION

PATENT NO. : 12,453,911 B2  
APPLICATION NO. : 18/385960  
DATED : October 28, 2025  
INVENTOR(S) : Kroloff et al.

Page 1 of 1

It is certified that error appears in the above-identified patent and that said Letters Patent is hereby corrected as shown below:

In the Claims

In Column 60, Line 63, in Claim 1, after "portion,", delete "and"

In Column 60, Line 65, in Claim 1, after "portion,", delete "and"

Signed and Sealed this  
Third Day of February, 2026

John A. Squires  
*Director of the United States Patent and Trademark Office*